(12) United States Patent
Kihara et al.

(10) Patent No.: US 6,236,475 B1
(45) Date of Patent: May 22, 2001

(54) IMAGE RECORDING METHOD AND APPARATUS AND IMAGE REPRODUCING METHOD AND APPARATUS

(75) Inventors: Nobuhiro Kihara; Akira Shirakura, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/874,665

(22) Filed: Jun. 13, 1997

(30) Foreign Application Priority Data

Jun. 21, 1996 (JP) .................................................. 8-162139
Jun. 28, 1996 (JP) .................................................. 8-170020
Mar. 28, 1997 (JP) .................................................. 9-078611

(51) Int. Cl.[7] .............................. G03H 1/26; G03H 1/28; G03H 1/00
(52) U.S. Cl. .............................. 359/23; 359/24; 359/25; 359/26; 359/22; 359/30
(58) Field of Search ................................ 359/1, 2, 3, 10, 359/15, 19, 26, 23, 28, 22, 12, 24, 25; 430/1, 2

(56) References Cited

U.S. PATENT DOCUMENTS

| | | | |
|---|---|---|---|
| 4,643,515 | * 2/1987 | Upatnieks | 359/10 |
| 4,834,476 | * 5/1989 | Benton | 359/23 |
| 5,016,950 | * 5/1991 | Smith | 359/19 |
| 5,121,229 | 6/1992 | Benton et al. | 359/32 |
| 5,504,593 | 4/1996 | Hotta et al. | 359/1 |
| 5,663,815 | * 9/1997 | Molteni et al. | 359/13 |
| 5,798,850 | * 8/1998 | Ishikawa et al. | 359/1 |

FOREIGN PATENT DOCUMENTS

| | | |
|---|---|---|
| 0 349 947 | 1/1990 | (EP) . |
| 0 435 510 | 7/1991 | (EP) . |
| 0 560 310 | 9/1993 | (EP) . |

* cited by examiner

Primary Examiner—Audrey Chang
(74) Attorney, Agent, or Firm—Rader, Fishman & Grauer; Ronald P. Kananen

(57) ABSTRACT

An image recording method and apparatus for recording an image on a holographic stereogram in such a manner as to generate an optimum reproduced image, and an image reproducing method and apparatus capable of generating an optimum reproduced image from the holographic stereogram. A parallax image string is recorded as a series of strip- or dot-shaped hologram elements by having an object light beam and a reference light beam fall on one and the other surfaces of a recording medium for hologram 130. On the reference light incident side, a light inlet block 52 is arranged for having contact with the recording medium for hologram 130 so that no significant change in the refractive index will be produced on an interface with the recording medium for hologram 130. The reference light beam is illuminated via this light inlet block 52 on the recording medium for hologram.

15 Claims, 25 Drawing Sheets

IMAGE RECORDING METHOD AND APPARATUS AND IMAGE REPRODUCING METHOD AND APPARATUS

BACKGROUND OF THE INVENTION

1. Field of the Invention

This invention relates to an image recording method and apparatus for recording a stereographic image on a holographic stereogram and an image reproducing method and apparatus for reproducing a stereographic image from the holographic stereogram.

2. Description of the Related Art

A holographic stereogram is produced by sequentially recording a large number of images, obtained on sequentially shooting an object from different viewing points, as original images, as strip- or dot-shaped hologram elements, on a sole recording medium.

For example, in a holographic stereogram having the parallax information only in the transverse direction, plural original images 301a to 301e, obtained on sequentially imaging an object 300 from plural viewing points in the transverse direction, are sequentially exposed to light and recorded on a recording medium for hologram 302 as strip-shaped hologram elements.

With the present holographic stereogram, since the picture information obtained on sequentially imaging an object from plural viewing points in the horizontal direction is sequentially recorded in the transverse direction as strip-shaped hologram elements, the two-dimensional pictures as viewed by left and right eyes of a viewer if the holographic stereogram is viewed by the viewer with both eyes. This the observer feels the parallax so that a three-dimensional image is reproduced.

However, with the conventional holographic stereogram, an optimum reproduced picture cannot be produced. Specifically, with the conventional holographic stereogram, a reproduced image is unclear, dark and poor in contrast, while the reproduced image has a narrow angle of visibility.

For enabling an optimum picture to be produced from a holographic stereogram, it is necessary to completely fix a recording medium for hologram during light exposure of the recoding image to prevent minute vibrations even of the order of the light wavelength. During production of the holographic stereogram, the recording medium for hologram is moved little by little for sequentially recording an extremely large number of hologram elements. For providing a practically useful picture recording device used for producing a holographic stereogram, the recording medium for hologram needs to be transferred quickly during fabrication of the holographic stereogram. Therefore, means for holding and transferring the recording medium for hologram needs to be such a device in which not only the recording medium for hologram can be transferred quickly, but also no vibrations of the recording medium for hologram are allowed after completion and halting of the recording medium for hologram.

For example, if the recording medium for hologram is transferred using an ordinary electrically driven sliding stage, the time of the order of 2 seconds is required until the vibrations of the recording medium for hologram are attenuated, after transfer of the recording medium for hologram, to the extent that the hologram elements can be formed. Therefore, if the recording medium for hologram is transferred each time the hologram element is formed using the electrically driven stage, an extremely long time is consumed until completion of a sole holographic stereogram.

The present inventors have conducted searches into holding and transfer means capable of suppressing the vibrations of the recording medium for hologram more quickly. Thus it has been found that, by loading an elongated recording medium for hologram between two parallel rolls, holding the recording medium for hologram by a torsion coil spring for producing a pre-set tensile force and by causing an object light to fall on the recording medium for hologram placed between the two parallel rolls, the vibrations of the recording medium for hologram can be suppressed more promptly. By employing this method, the time until attenuation of the vibrations after transfer of the recording medium for hologram has been reduced to less than one fourth that when the electrically driven sliding stage is used. However, if this method is employed, the vibrations cannot be suppressed completely. Thus, it has been desired to develop a method and apparatus capable of further suppressing vibrations of the recording medium for hologram.

In a usual hologram, an illuminating light source for reproducing a three-dimensional picture and a hologram are spatially separated from each other. Thus, in a usual hologram, a broad spacing is required for reproduction. On the other hand, for reproduction under an optimum condition, the relative positions of the hologram and the illuminating light source need to be set under a pre-set condition. This applies for a holographic stereogram made up of plural hologram elements.

If the illuminating light source and the hologram are unified with each other, the spacing for illumination becomes unnecessary to make it possible to reduce the size of the apparatus. Moreover, since the relative positions of the hologram and the illuminating light become always constant, reproduction can be performed at all times under optimum conditions. As a hologram for realizing this, there is known an edge-lit system hologram in which recording and/or reproduction is carried out with a recording medium bonded to a transparent light-inlet block.

With such edge-lit system hologram, the optical system for reproduction can be reduced in size and reproduction can be performed at all times under optimum conditions by unifying the light source for the reproducing illuminating light and a light inlet block. Also, since the angle of incidence of the reproducing illuminating light is increased with the edge-lit type hologram, an image is not reproduced by the light incident from outside the light inlet block. Thus the edge lit type hologram is in use in a field in which it is not desirable for an image to be reproduced with, for example, the sunlight, such as in a head-up display device.

For producing a transmission type hologram in which a three-dimensional image is reproduced by the light transmitted through the recording medium, a recording medium for hologram 311 is bonded to a surface 310a of a light inlet block 310 formed of a glass plate or a synthetic resin plate of a suitable thickness, as shown in FIG. 2. At this time, the recording medium for hologram 311 is bonded via an index matching liquid 312 to the light inlet block 310. An object light beam 314 from an object 313 is illuminated from an other surface 310b of the light inlet block 310 towards the recording medium for hologram 311, while a reference light beam 315 is illuminated from an end face 310c of the light inlet block 310 towards the recording medium for hologram 311. This completes a transmission type edge-lit hologram.

For reproducing the thus produced transmission type edge-lit hologram, the hologram 321 is bonded on an end face 320a of the light inlet block 320 via an index matching liquid 322 and a reproducing illuminating light beam 323 is illuminated from the end face 320b of the light inlet block 320 towards the hologram 321. The light transmitted through the hologram 321 is diffracted at this time by the hologram 321. A reproduced image 325 is generated by a diffracted light beam 324 so as to be viewed by a viewer 326.

For producing a reflection type hologram in which a three-dimensional image is reproduced by the light reflected by the recording medium, by the edge-lit system, a recording medium 332 is bonded via an index matching liquid 331 on one surface 330a of a light inlet block 330, as in the case of producing a transmission type edge-lit hologram, as shown in FIG. 4. For the reflection type hologram, an object light beam 334 from an object 333 is illuminated from the side of bonding the recording medium 332 towards the recording medium 332, while a reference light beam 335 is illuminated from an end face 330b of the light inlet block 330. This completes the edge-lit reflection type hologram.

For reproducing the edge-lit reflection type hologram, thus produced, usually a hologram 341 is bonded via an index matching liquid 342 to a surface 340a of a light inlet block 340, as shown in FIG. 5, and a reproducing illuminating light beam 343 is illuminated towards the hologram 341 from an end face 340b of the light inlet block 340. The light reflected at this time by the hologram 341 is diffracted by the hologram 341. A reproduced image is generated by this diffracted light 344 so as to be viewed by a viewer 346.

If such edge-lit system is applied to a holographic stereogram, and an image is generated as if there were an object behind the light inlet block, the reproduced image is difficult to view and lowered in stereographic feeling to detract from the display effect. It is therefore desirable that an image can be reproduced so that an object will be as close to the view as possible. However, with the edge-lit system holographic stereogram, an image is reproduced as if the object as viewed by the viewer were at back of the light inlet block, as shown in FIG. 5.

For producing the image as though the object were as close to the viewer as possible, a transmission type edge-lit system holographic stereogram is preferably employed. However, if the stereogram is recorded by the transmission type hologram, both the object light beam and the reference light beam need to be incident on one side of the recording medium for hologram. This lowers the degree of freedom in arranging the optical system to raise difficulties in constituting an optimum optical system.

Moreover, if desired to assure a broad angle of visibility angle in the up-and-down direction in reproducing a holographic stereogram, a one-dimensional diffusion plate for diffusing the object light beam in a one-dimensional in-plane direction is desirably provided in the vicinity of the recording medium for hologram on the object light beam incident side. However, with the transmission type recording in which a light incident block needs to be arranged towards the object light beam incident side, it becomes impossible to array this one-dimensional diffusion plate. Consequently, it has hitherto not been practiced to produce the edge-lit system holographic stereogram as a transmission type stereogram.

SUMMARY OF THE INVENTION

It is therefore an object of the present invention to provide an image recording method and apparatus in which an image is recorded on a holographic stereogram so as to produce a better reproduced image.

It is another object of the present invention to provide an image reproducing method and apparatus which renders it possible produce a better reproduced image from the holographic stereogram.

In a first image recording method for sequentially recording images corresponding to image data of a parallax image string as strip- or dot-shaped hologram elements, by causing an object light beam to fall on one of the surfaces of a recording medium for hologram and by causing a reference light beam to fall on the opposite surface thereof, according to the present invention, an optical component is contacted with at least one surface of the recording medium for hologram, and a liquid is interposed between the recording medium for hologram and the optical component.

If a liquid is interposed between the recording medium for hologram and the optical component, the optical component can be tightly contacted with the recording medium for hologram without producing a void therebetween, so that vibrations of the recording medium for hologram during image recording can be suppressed sufficiently.

It may be contemplated to have the recording medium for hologram and the optical component arranged in a liquid for having the liquid interposed between the recording medium for hologram and the optical component. Herein, however, the recording medium for hologram and the optical component are arranged in air and the liquid is held by surface tension between the recording medium for hologram and the optical component.

For maintaining the liquid charged at all times in the space between the recording medium for hologram and the optical component, it is preferred that the liquid be continuously supplied to the space between the recording medium for hologram and the optical component.

The optical component contacted with the recording medium for hologram via liquid is preferably a set of a one-dimensional diffusion plate and a louver film arranged on the object light incident side. For example, the optical component, comprised of the set of the one-dimensional diffusion plate and the louver film, is thrust, during recording on the recording medium for hologram, against the recording medium for hologram placed under pre-set tensile tension. The one-dimensional diffusion plate performs the role of slightly diffusing the object light during recording in a one-dimensional direction for maintaining a broad angle of visibility in the up-and-down direction for scattering noise components ascribable to, for example, the optical system. On the other hand, the louver film prevents the reference light from being reflected by, for example, the abovementioned one-dimensional diffusion plate to be re-incident on the recording medium for hologram after passing through the recording medium for hologram.

The hologram of the edge-lit system has many merits, as described above. Thus the edge-lit system may be applied to the above-mentioned first image recording method. In such case, the images corresponding to respective image data of the parallax image series are sequentially recorded as hologram elements by the edge-lit system.

In the edge-lit system, a recording medium for hologram is bonded to a transparent light inlet block, which then causes the reference light beam or the illuminating light beam to fall at an acute angle on the surface of the recording medium for hologram for recording or reproduction. If the edge-lit system is applied to the holographic stereogram, the illuminating light source can be integrated to the holographic stereogram, thus eliminating the necessity for providing an illuminating space. Moreover, since the relative position between the holographic stereogram and the illuminating light source becomes perpetually constant, reproduction can be done perpetually under optimum conditions.

For recording by the edge-lit system, the light inlet block can be contacted with the recording medium for hologram from the object light incident side or from the reference light incident side. However, even in case of recording by the edge-lit system, the one-dimensional diffusion plate and the louver film are preferably arranged in a contact area with the recording medium for hologram. In this case, the one-dimensional diffusion plate and the louver film are arranged on the object light inlet side, while the light inlet block is arranged on the reference light incident side of the recording medium for hologram. The light. inlet block and the recording medium for hologram are contacted with each other via a liquid. If, in the following description, it is necessary to clarify the fact that the light inlet block is arranged on the reference light incident side, the light inlet block is termed a reference light inlet block. If the reference light inlet block is contacted with the recording medium for hologram, the liquid interposed therebetween is preferably an index matching liquid responsible for index matching between the recording medium for hologram and the reference light inlet block.

If, during recording by the edge-lit system, the refractive index is changed drastically between the recording medium for hologram and the light inlet block, the reference light beam, incident at an acute angle on the surface of the recording medium for hologram, is reflected by total reflection on an interface between the light inlet block and the recording medium for hologram, or surface irregularities of the image recording layer of the recording medium for hologram are presented as non-uniformities like wood grains in the recorded image. For overcoming these difficulties, light exposure may be carried out in a liquid capable of achieving index matching between the recording medium for hologram and the reference light inlet block. However, if the light exposure is carried out in a liquid, the image recording device becomes complex in structure and larger in size, while being in need for frequent maintenance, thus making it difficult to automate the fabrication of the holographic stereogram.

Conversely, should the index matching liquid be interposed only between the recording medium for hologram and the reference light inlet block, the reference light inlet block can be contacted completely intimately with the recording medium for hologram, while there is no risk of complicating the structure or increasing the size of the image recording device. In addition, since there is no necessity of transferring the reference light inlet block in a direction towards and away from the recording medium for hologram each time the recording medium for hologram is transferred, thus even simplifying the structure of the image recording device.

For enabling index matching between the recording medium for hologram and the reference light inlet block by the index matching liquid, it is necessary to set a condition in which no total reflection occurs on an interface between the reference light inlet block and the index matching liquid, as well as on an interface between the index matching liquid and the recording medium for hologram, and in which the intensity reflectance (s-component) on each interface is reduced.

If the liquid interposed between the reference light inlet block and the recording medium reference light inlet block and the recording medium for hologram meets the above condition, the reference light passed through the reference light inlet block and the recording medium to fall on the recording medium for hologram can be prevented to occur total reflection, while non-uniformities may be prevented from being produced in the image, thus improving the image quality of the fabricated holographic stereogram.

For implementing the above-described first image recording method, the following first image recording apparatus is used.

The first image recording apparatus for sequentially recording images corresponding to image data of a parallax image series as strip- or dot-shaped hologram elements by causing an object light beam to fall on one of the surfaces of a recording medium for hologram and by causing a reference light beam to fall on the opposite surface thereof, according to the present invention, includes an optical component contacted with at least one of the surfaces of the recording medium for hologram, and liquid supplying means for supplying a liquid to a space between the recording medium for hologram and the optical component.

Since the first image recording apparatus includes liquid supplying means, them liquid can be interposed between the recording medium for hologram and the optical component, and hence the optical component can be tightly contacted with the recording medium for hologram without voids in-between to suppress vibrations of the recording medium for hologram sufficiently.

The liquid supplying means is preferably capable of continuously supplying the liquid to a space between the recording medium for hologram and the optical component. Although any known means for supplying the liquid to the space between two members can be used as such liquid supplying means, a foamed member, such as sponge, impregnated with a liquid, is preferred. That is, by arranging a foamed member, such as a liquid-impregnated sponge, may be placed in the vicinity of the interface between the recording medium for hologram and the optical component for continuously supplying the liquid to a space between the recording medium for hologram and the optical component.

In the above-described image recording apparatus, the optical component contacted with the recording medium for hologram via the liquid may be a set of the one-dimensional diffusion plate and the louver film on the object light incident side. Alternatively, the optical component may be a reference light inlet block on the reference light incident side if recording is done by the edge-lit system. If the recording is by the edge-lit system, the index matching liquid may be used as the liquid interposed between the recording medium for hologram and the reference light inlet block, as explained previously.

For raising the light exploitation efficiency for reducing image non-uniformities, a smaller interface passed through by the reference light is desirable. Thus, if the edge-lit system is used, the recording medium for hologram and the reference light inlet block may be directly intimately contacted with each other, that is without interposition of a liquid. Above all, if the recording medium for hologram used is relatively soft and adhesive, such as photopolymer, the recording medium for hologram and the reference light inlet block can be contacted relatively easily with each other. In such case, since the reference light inlet block and the recording medium for hologram can be intimately contacted with each other, without voids in-between, oscillations of the recording medium for hologram can be suppressed sufficiently.

In light of the above, a second image recording method includes causing an object light beam to fall on one of the surfaces of a recording medium for hologram, the opposite surface of which is optically contacted with a light inlet block, and causing a reference light beam to fall on an end of the light inlet block for fabricating a holographic stereogram of the edge-lit system.

A second image recording apparatus includes a light inlet block optically contacted with at least one surface of a recording medium for hologram and is designed so that, for fabricating a holographic stereogram of an edge-lit system, an object light beam is caused to fall on one of the surfaces of the recording medium for hologram and a reference light beam is caused to fall on the opposite surface via a light inlet block.

Preferably, the light inlet block includes a light absorbing member operating for preventing the object light and the reference light incident on the light inlet block and reaching the recording medium for hologram from undergoing needless reflection within the light inlet block.

In the second image recording apparatus, a film-shaped medium is used as the above-mentioned recording medium for hologram. Although the index matching liquid may be interposed between the recording medium for hologram and the reference light inlet block, as described above, image recording may also be performed with the recording medium for hologram being kept in direct contact with the light inlet block.

Also, in the second image recording apparatus, the light inlet block is substantially cylindrical in shape and is designed to rotate with movement of the recording medium for hologram. Preferably, the light inlet block is designed to rotate with the recording medium for hologram being kept in direct contact with the light inlet block. Also preferably, the light inlet block has an internal hollow portion within which is arranged a light absorbing member-designed for preventing the object light and the reference light incident on the light inlet block and reaching the recording medium for hologram from undergoing needless reflection in the light inlet block.

Preferably, the second image recording apparatus includes thrusting means for thrusting the light inlet block against the recording medium for hologram.

In the second image recording apparatus, a recording medium for hologram having a cover sheet for protecting a photosensitive portion may be used as the recording medium for hologram. Preferably, cover sheet removal means for peeling off the cover sheet from the recording medium for hologram is preferably provided before contacting the recording medium for hologram with the light inlet block.

Preferably, the second image recording apparatus includes cleaning means for removing contamination of the light inlet block. Also preferably, the second image recording apparatus includes a one-dimensional diffusion plate on the object light incident side in the vicinity of the recording medium for hologram.

An image reproducing method for reproducing a three-dimensional image recorded on a holographic stereogram of an edge-lit system by causing an object light beam and a reference light beam to fall on one and the other surfaces of a recording medium, respectively, according to the present invention, includes arranging a holographic stereogram on a surface of the light inlet block towards a viewer, illuminating a reproducing illuminating light beam on the holographic stereogram via the light inlet block, and reproducing the three-dimensional image by light diffracted when the reproducing illuminating light beam is transmitted through the holographic stereogram.

With the above image producing method, a holographic stereogram of the edge-lit system, recorded with the reflection type stylized optical system having high flexibility of layout, is reproduced with the transmission type hologram in which the holographic stereogram transmits the reproducing illuminating light beam. In this manner, a reproduced three-dimensional image appears as if the object were closer to the viewer, instead of being backwardly of the holographic stereogram.

An image reproducing apparatus for reproducing a three-dimensional image recorded on a holographic stereogram of an edge-lit system by causing an object light beam and a reference light beam to fall on one and the other surfaces of a recording medium, respectively, according to the present invention, includes a light inlet block having a holographic stereogram on its surface towards a viewer and a light source for illuminating a reproducing illuminating light beam via the light inlet bock on the holographic stereogram. The reproducing illuminating light beam from the light source is diffracted at the time of transmission through the holographic stereogram for reproducing the three-dimensional image.

With the above image producing apparatus, a holographic stereogram of the edge-lit system, recorded with the reflection type stylized optical system having high flexibility of layout, is reproduced with the transmission type hologram in which the holographic stereogram transmits the reproducing illuminating light beam. In this manner, a reproduced three-dimensional image appears as if the object were closer-to the viewer, instead of being at back of the holographic stereogram.

DESCRIPTION OF THE PREFERRED EMBODIMENTS

Figure 1:
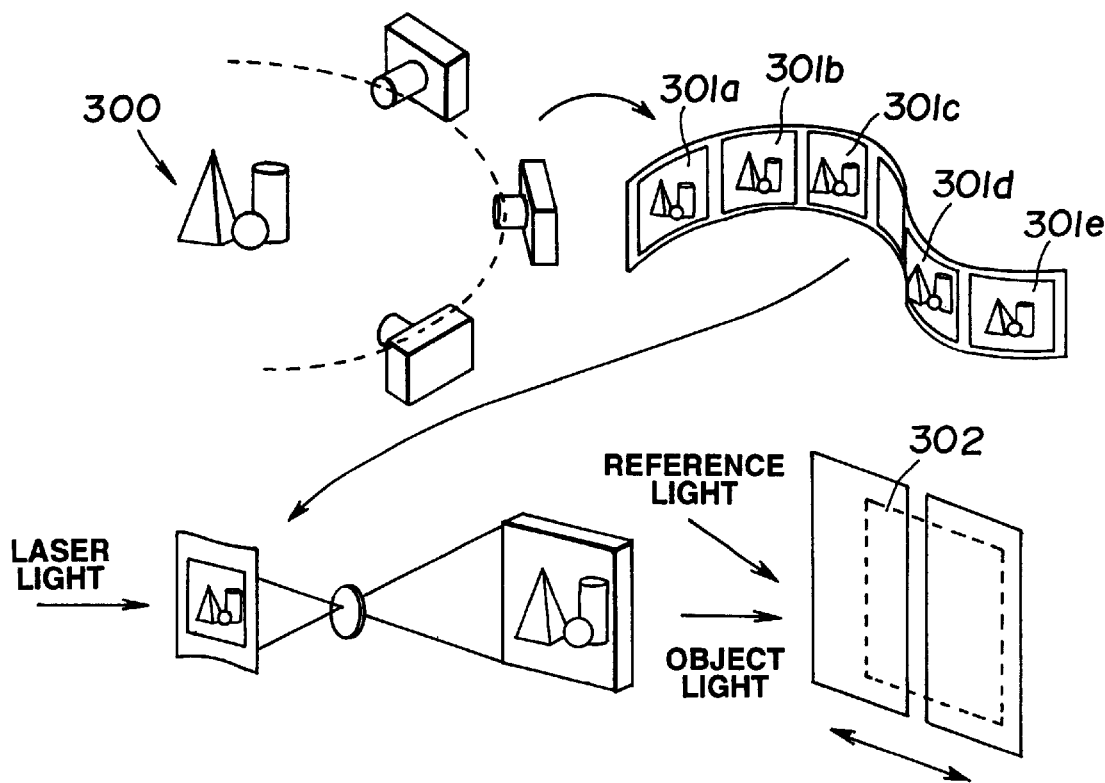
FIG. 1 is a schematic view showing a method for producing a holographic stereogram.
Figure 2:
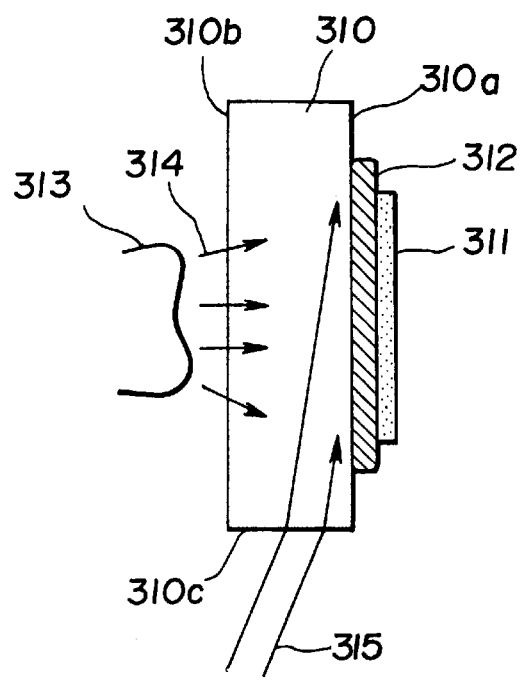
FIG. 2 is a schematic view showing a method for producing a transmission type edge-lit hologram.
Figure 3:
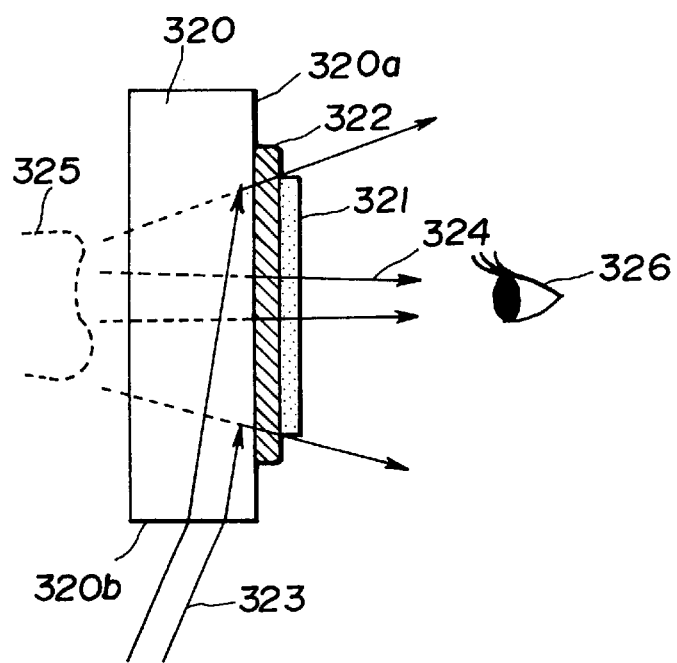
FIG. 3 is a schematic view showing the reproducing method for reproducing a transmission type edge-lit hologram with a transmission type hologram.
Figure 4:
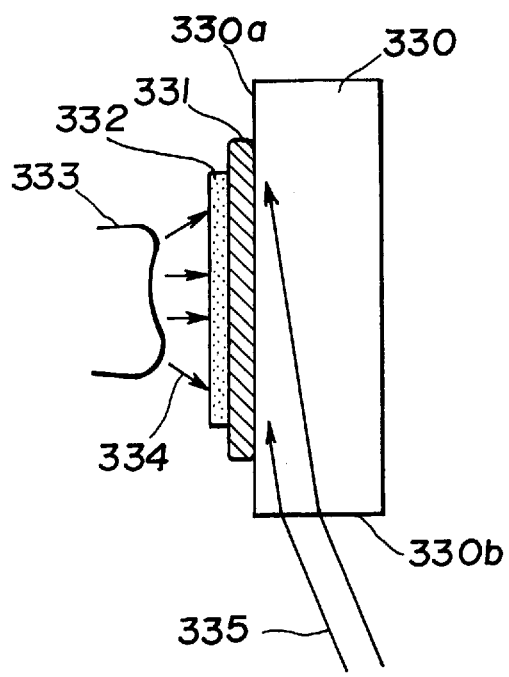
FIG. 4 is a schematic view showing a method for producing a reflection type edge-lit hologram.
Figure 5:
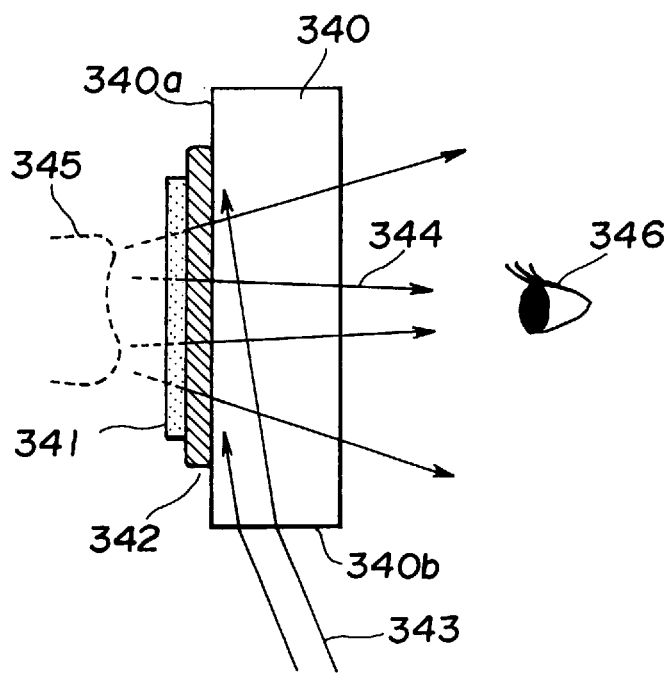
FIG. 5 is a schematic view showing the reproducing method for reproducing a reflection type edge-lit hologram with a reflection type hologram.

Referring to the drawings, preferred embodiments a first image recording method and an image recording device of the present invention will be explained in detail.

1. First Age Recording Method and Image Recording Device

A first embodiment of an image recording method and image recording device according to the present invention will be hereinafter explained.

1-1 Schematics of an Image Recording Device

The schematics of a holographic stereogram printer system of a first image recording device embodying the present invention will be explained.

Figure 6:
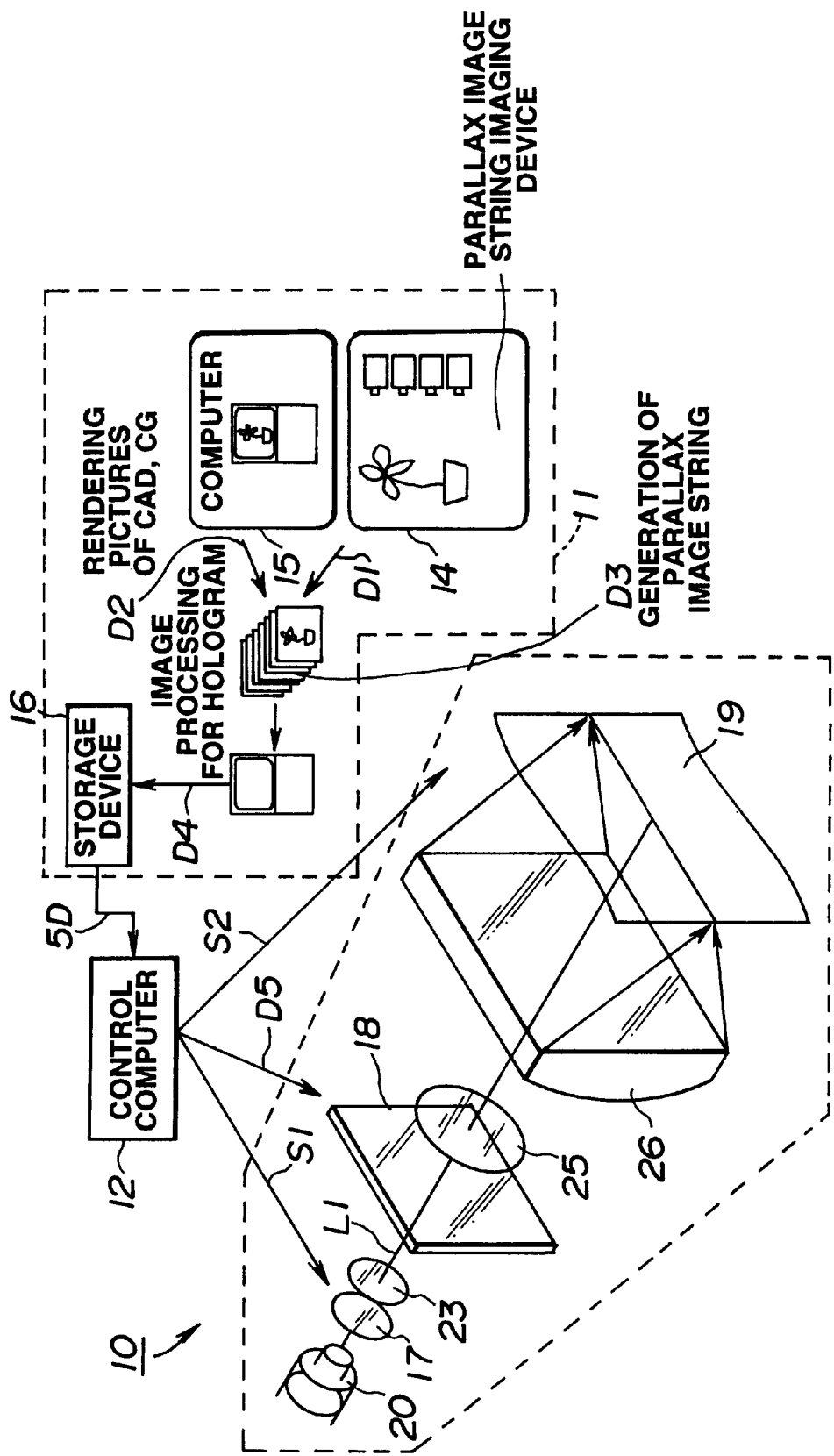
FIG. 6 is a schematic view showing an illustrative structure of a holographic stereogram printer system.

FIG. 6 shows a structure of this holographic stereogram printer system 10. The holographic stereogram printer system 10 is made up of a data processor 11, a control computer 12 and a holographic stereogram printer device 13.

The data processor 11 generates a parallax image series based on image data D1 for plural image data D2 of an rendering image (image resulting from rendering). The image data D1, outputted by a parallax image string imaging device 14, is obtained by imaging an object from plural viewing points in the transverse direction, such as by simultaneously imaging by a multi-eye camera or by continuous imaging with a moving camera, while the image data D2 of a rendering image, outputted by a computer 15, are formed by sequentially according the parallax in the transverse direction. The data processor 11 then performs pre-set image processing for hologram on each image data D3 of the parallax image string for transiently recording the processed image data D3 on a recording medium 16, such as a memory or a hard disc.

During the subsequent light exposure operation, the data processor 11 sequentially reads out the image data D4 of the parallax image string recorded on the recording medium 16 and sends out the read-out image data D5 sequentially to the control computer 12.

During the light exposure, the control computer 12 controls the driving of a shutter 17 of the holographic stereogram printer device 13, a liquid crystal display device (LCD) 18 and a printer head, as later explained, based on the image data D5 of the parallax image string sent from the data processor 11.

Figure 7:
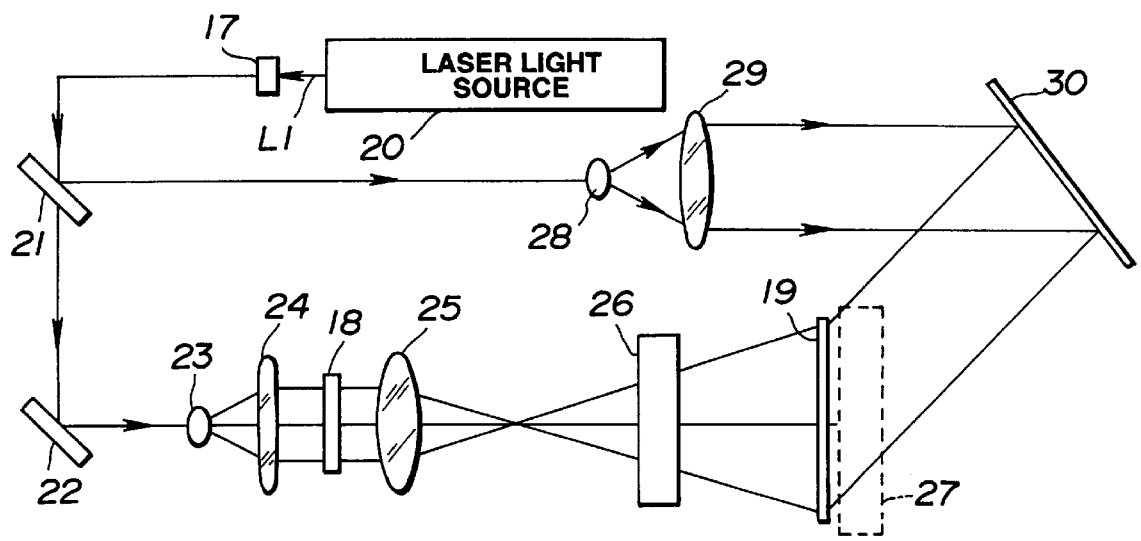
FIGS. 7A and 7B are schematic views showing an example of an optical system of a holographic stereogram printer system.
Figure 7:
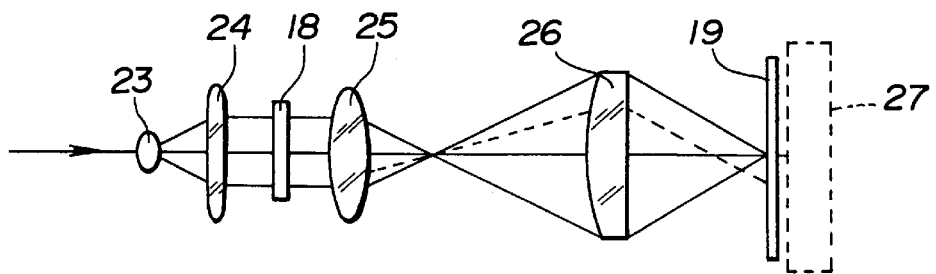

The holographic stereogram printer device 13 has a structure as shown in FIGS. 7A and 7B in which parts or components similar to those of FIG. 6 are depicted by the same reference numerals as those used in FIG. 6. The holographic stereogram printer device 13 is configured for driving the LCD 18 based on the image data D5 supplied from the control computer 12 for sequentially recording the images corresponding to the image data D5 as hologram elements on a recording medium for hologram 19 for producing a holographic stereogram.

Specifically, the LCD 18 is driven based on one of image data of image data D5 supplied for the control computer 12 for displaying an image corresponding to the image data D5 on the LCD 18, while the control signal S1 is sent from the control computer 12 to the shutter 17 for opening it for causing a laser light beam L1 outgoing from a laser light source 20 via shutter 17, half mirror 21 and mirror 22 to a spatial filter 23.

The laser light beam L1 is enlarged by the spatial filter 23 and a collimator 24 and transmitted through the LCD 18 so as to be converted into a projected light beam corresponding to the image displayed on the LCD 18. The projecting light is incident on the collimator lens 26 via condenser lens 25 so as to be thereby converged in the transverse direction by the collimator lens 26 to fall on the recording medium for hologram 19 held by a printer head 27.

The laser light beam L1 reflected by the half mirror 21 is incident at an incident position on the recording medium for hologram 19 via a cylindrical lens 28, a collimator lens 29 and a mirror 30 in this order as a beam at a pre-set angle from the back side of the recording medium for hologram 19 as a reference light.

The light path length for the reference light beam is selected to be equal to the light path length of the laser light beam L1 transmitted through the half mirror 21 and incident via mirror 22 on the recording medium for hologram 19. This laser light beam L1 is referred to herein as an object light beam.

Thus, with the present holographic stereogram printer device 13, this object light beam (projecting light beam) can be caused to interfere with the reference light beam on a recording surface of the recording medium for hologram 19 whereby the image displayed on the LCD 18 can be recorded as strip-shaped interference fringes on the recording medium for hologram 19.

Moreover, with the present holographic stereogram printer device 13, when later the recording of the image comes to a close, the shutter 17 is driven by the control computer 12 to interrupt the laser light beam L1 outgoing from the laser light source 20, as the same time as the LCD 18 ceases to be driven. In addition, the printer head 27 is driven under control by the control computer 12 to feed the recording medium for hologram 19 by a length equal to the transverse width of a sole hologram element.

The LCD 18 is then driven under control by the control computer 12 for displaying an image corresponding to the next following portions of the image data D5. The shutter 17 then is opened under control by the control computer 12 for recording the image displayed on the LCD 18 in a strip shape on the recording medium for hologram 19. The above sequence of operations is repeated in succession.

Thus, with the holographic stereogram printer device 13, the images corresponding to the image data of the supplied parallax image string can be sequentially recorded in a strip-like pattern on the recording medium for hologram 19 to produce a desired holographic stereogram.

The recording medium for hologram 19, used in the present holographic stereogram printer system, is now explained.

Figure 8:
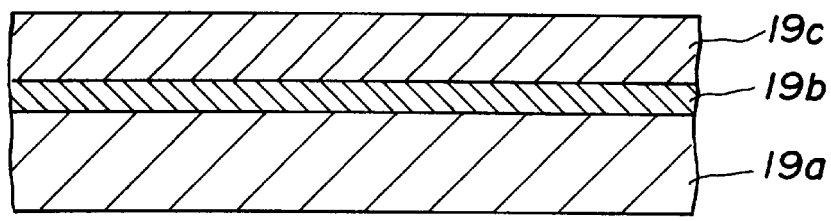
FIG. 8 is a cross-sectional view showing an example of a recording medium for hologram.

The recording medium for hologram 19 is a so-called film coating type recording medium in which a photopolymer layer 19b formed of a photopolymerizable photopolymer is formed on a tape-shaped film base material 19a and a cover sheet 19c is deposited on the photopolymer layer 19b, as shown in FIG. 8. In the present embodiment, a photopolymer layer of 'OMNI-DEX', with a refractive index before light exposure of 1.487, manufactured by DU PONT Inc. as a photopolymer layer 19b as a photosensitive portion to a thickness of approximately 20 µm.

Figure 9A:
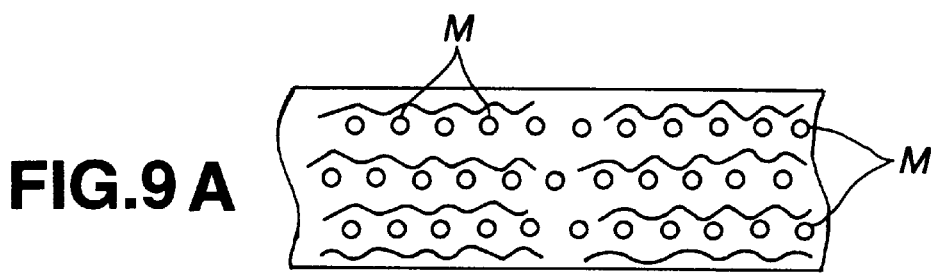
FIGS. 9A, 9B and 9C are schematic views showing a photosensitive process of a light polymerization type photopolymer.
Figure 9B:
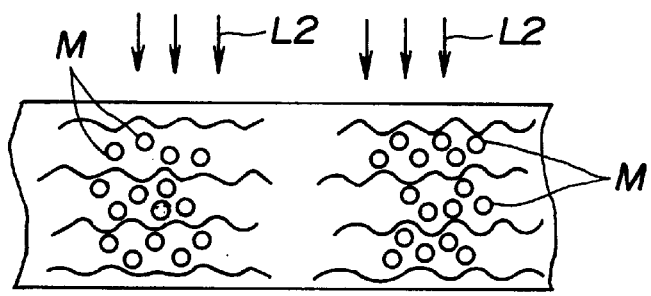
Figure 9C:
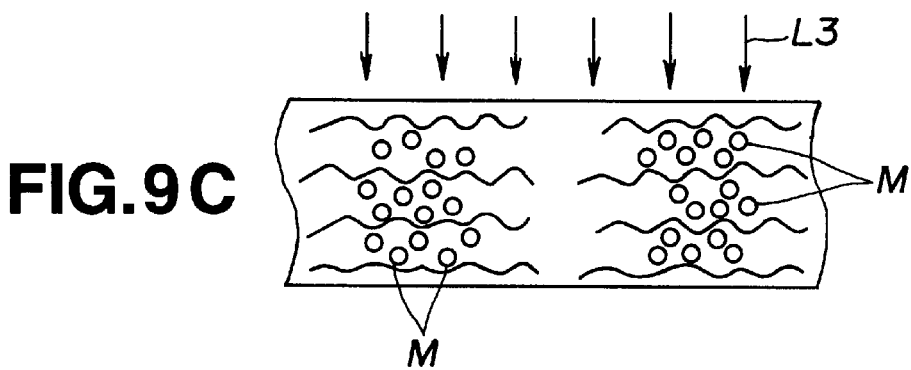

In the initial state of the photopolymerizable photopolymer, a monomer M is uniformly dispersed in a matrix polymer, as shown in FIG. 9A. If a light beam L2 of the power of, for example, 10 to 400 mJ/cm² is illuminated, the monomer M is polymerized in a light-exposed portion, as shown in FIG. 9B. With progress in polymerization, the monomer M is migrated from ambient portions to cause local variation in the concentration in the monomer M to produce refractive index modulation. The polymerization of the monomer M then comes to a close by illuminating the UV light or the visible light L3 with the power on the order of 1000 mJ/cm² as shown in FIG. 9C. Since the photopolymerizable photopolymer has its refractive index varied with the incident light beam, the interference fringes, brought about by interference between the reference light beam and the object light beam, can be recorded as changes in the refractive index.

The recording medium for hologram 19, employing the photopolymerizable photopolymer, need not be processed with particular development operations after light exposure. Thus the holographic stereogram printer device 13 employing the recording medium for hologram 19 having its photosensitive portion formed of a photopolymerizable photopolymer can be simplified in structure.

Meanwhile, the first image recording device according to the present invention sequentially records images corresponding to image data of a parallax image string sequentially as strip- or dot-shaped hologram elements by having the object light beam and the reference light beam fall on one and the other surfaces of the recording medium for hologram, respectively. The first image recording device according to the present invention includes an optical component contacted with at least one surface of the recording medium for hologram and liquid supplying means for supplying the liquid to a space between the recording medium for hologram and the optical component.

Thus, with the above-described holographic stereogram printer system 10, the main point of the present invention resides in a portion of the holographic stereogram printer device 13, especially a portion thereof in the vicinity of the printer head 27. Therefore, an illustrative structure of the vicinity of the printer head 27 is explained in detail herein below by way of illustrating an embodiment of the first image recording device according to the present invention. Since the image recording method according to the present invention is characterized in that, during recording on the recording medium for hologram, an optical component is contacted with at least one surface of the recording medium for hologram, and in that a liquid is interposed between the recording medium for hologram and the optical component, an embodiment of the method of the present invention is explained in connection with the explanation of the operation of the vicinity of the printer head 27.

1-2 First Embodiment

With the image recording device according to the present invention, optical components made up of the one-dimensional diffusion plate and the louver film are contacted via a liquid with the object light incident side of the recording medium for hologram 19. The image recording method according to the present invention produces a holographic stereogram using the above-described image recording device.

Figure 10:
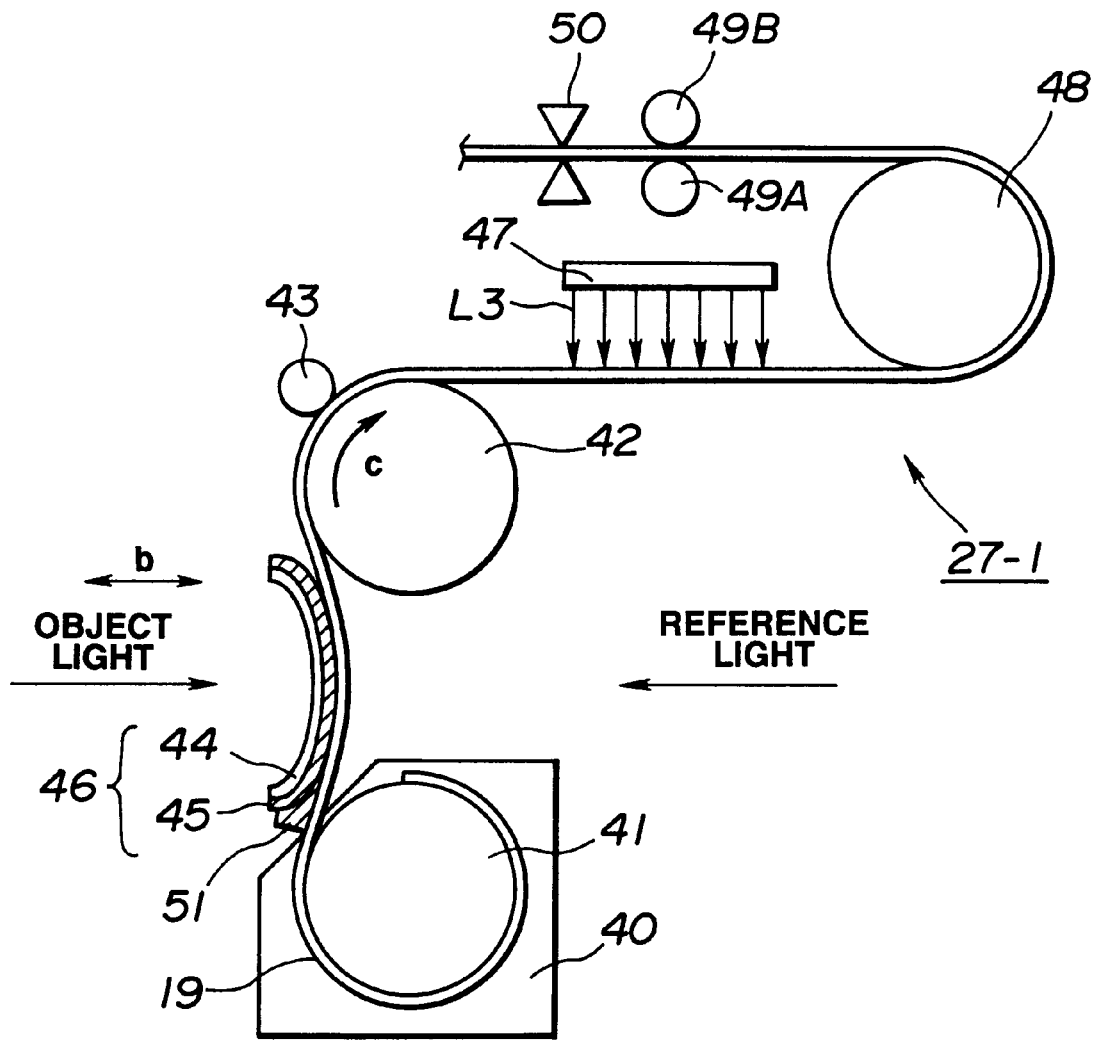
FIG. 10 is a schematic view showing an illustrative structure of the vicinity of a printer head.

For explaining the image recording device according to the present invention, the structure of the vicinity of the printer head 27 of the holographic printer device 13 in the above-described holographic stereogram printer system 10 is explained in detail. In the present embodiment, the printer head 27 is constructed as a printer head 27-1, as shown in FIG. 10.

The printer head 27-1 has a mechanism for holding and transporting the recording medium for hologram 19.

Specifically, the printer head 27-1 is configured for rotatably holding a roll 41 with a pre-set torque within a film cartridge 40 loaded in position and for holding the recording medium for hologram 19 drawn out from the film cartridge 40 between the intermittent feed rolls 42 and 43 for thereby positioning the recording medium for hologram 19 between the roll 41 and the intermittent feed roll 42 in a vertical position relative to the object light (laser light beam L1).

The roll 41 and the intermittent feed roll 42 are biased by a torsion coil spring, not shown, in a direction away from each other, whereby a pre-set tensile force is applied on the recording medium for hologram 19 loaded so as to lie across the roll 41 and the intermittent feed roll 42.

Between the roll 41 and the intermittent feed roll 42 is arranged an optical component 46, as a rigid member made up of a one-dimensional diffusion plate 44 and a louver film 45, unified together in a bent state, in meeting with the point of incidence of the object light beam. The optical component 46 is held for movement in a direction towards and away from the recording medium for hologram 19, as indicate by arrow b by an optical component driving mechanism, not shown.

Before starting the light exposure operation, the optical component driving mechanism drives the optical component 46 based on a control signal S2 supplied from the control computer 12 for displacing the optical component 46 in a direction towards the recording medium for hologram 19 for pressing the bent distal end of the optical component 46 against the point of incidence of the object light beam on the recording medium for hologram 19 loaded between the roll 41 and the intermittent feed roll 42.

Thus, with the holographic stereogram printer device 13, the optical component 46 operates for suppressing micro-sized vibrations of the recording medium for hologram 19 between the roll 41 and the intermittent feed roll 42, whereby a bright holographic stereogram, that is a holographic stereogram with a higher diffraction efficiency, is produced.

The distal end of the optical component 46 contacted with the recording medium for hologram 19 is curved in a crown shape for protruding both end portions and a center portion thereof, whereby the distal end of the optical component 46 is contacted uniformly with both width-wise ends and with the center portion of the recording medium for hologram 19 for reliably uniformly suppressing micro-sized vibrations of the recording medium for hologram 19 between the roll 41 and the intermittent feed roll 42 along the direction of width of the recording medium for hologram 19.

In the present embodiment, a sponge 51 impregnated with a liquid is arranged as liquid supplying means upstream of the optical component 46 so as to be in contact with both the optical component 46 and with the recording medium for hologram 19. The liquid supplied from the sponge 51 is supplied to a cover sheet 19c sheathing the photopolymer layer 19b so that it is not directly contacted with the photopolymer layer 19b.

Meanwhile, the sponge 51 is narrower in width than the recording medium for hologram 19 for preventing the liquid from flowing round the back side of the recording medium for hologram 19. The liquid used for impregnating the sponge 51 is o-xylene.

By arranging the sponge 51, it becomes possible to supply the liquid to a spacing between the recording medium for hologram 19 and optical component 46 at all times and to have the liquid interposed in the spacing. Since this enables the optical component 46 and the recording medium for hologram 19 to be contacted intimately with each other without void in-between, vibrations of the recording medium for hologram 19 can be suppressed sufficiently.

Moreover, if the liquid is interposed between the recording medium for hologram 19 and the optical component 46, the recording medium for hologram 19 can be fed intermittently without the necessity of moving the optical component 46 in an opposite direction. This renders it possible to omit the above-mentioned optical component driving mechanism to simplify the structure of the image recording device.

For having the liquid interposed between the recording medium for hologram 19 and the optical component 46, it is also possible to arrange the recording medium for hologram 19 and the optical component 46 in a liquid. However, since the recording medium for hologram 19 and the optical component 46 are both arranged in air, and the liquid is held by surface tension, it becomes possible to simplify the image recording device in structure, while facilitating the maintenance.

On the other hand, the intermittent feed roll 42 is configured for being rotated in a direction indicated by arrow c based on the force of rotation outputted by a stepping motor, not shown. The stepping motor is configured for rotating the intermittent feed roll 42 a pre-set angle, based on the control signal S2 supplied from the control computer 12, each time the light exposure for one image comes to a close. This feeds the recording medium for hologram 19 by one hologram element.

Downstream of the intermittent feed roll 42 in the travel passage of the recording medium for hologram 19 is arranged a UV lamp 47 for extending along the travel passage whereby a UV light beam L3 of a pre-set power for terminating the diffusion of the monomer M can be illuminated with a pre-set power to the light-exposed portion of the recording medium for hologram 19 forwarded by the intermittent feed roll 42.

Downstream of the UV lamp 47 in the travel passage of the recording medium for hologram 19 are arranged a rotatably fulcrumed heat roll 48, a pair of feed-out rolls 49A, 49B and a cutter 50, in this order. The feed-out rolls 49A, 49B are arranged for holding the recording medium for hologram 19 in a state of being placed in tight contact by 180° around the outer periphery of the heat roll 48.

The heat roll 48 is provided with internal heating means, not shown, for maintaining the peripheral surface of the roll at approximately 120° C.

This setting is based on an experiment by which it has been found that, by having an as-exposed photopolymerizable photopolymer (OMNI-DEX) sandwiched between a heating plate temperature-controlled for maintaining a constant temperature of 120° C. and a glass plate pressed from above by a spring pressure and by heating the resulting assembly for five minutes, the refractive index modulation of the same order of magnitude as that obtained in case the assembly is atmosphere-heated at 120° C. for two hours is achieved.

For this reason, the outer diameter of the heat roll 48 is selected so that the time since the recording medium for hologram 19 starts to be contacted with the outer peripheral surface of the heat roll 48 until it is detached therefrom is substantially equal to the time required for the recorded image to become fixed for thereby assuring positive fixation of the image recorded on the recording medium for hologram 19.

The driving mechanism for the feed-out rolls 49A, 49B, referred to hereinafter as a feed-out roll driving mechanism, is configured for rotating the feed-out rolls 49A, 49B in synchronism with the intermittent feed roll 42 based on the control signal S2 outputted by the control computer 12. This enables the recording medium for hologram 19 to be kept tightly contacted with the peripheral surface of the heat roll 48 without becoming slacked between the intermittent feed roll 42 and the feed-out rolls 49A, 49B.

A driving mechanism for the cutter 50 (cutter driving mechanism), not shown, drives the cutter 50 after a desired image is recorded on the hologram recording medium 19 based on the control signal S2 supplied from the control computer 12 and entire areas of the hologram recording medium 19 having the image recorded therein are subsequently discharged to outside for severing the discharged portion from the remaining portion of the hologram recording medium 19. This enables the image-baring portion of the hologram recording medium 19 to be discharged to outside as a sole holographic stereogram.

For explaining the image recording method embodying the present invention, the operation of the holographic stereogram printer device 13 inclusive of the printer head 27-1 is explained in detail.

For producing a holographic stereogram, using the above-described holographic stereogram printer device 13, the hologram recording medium 19 configured as shown in FIG. 8 is coiled around the roll 41 and the resulting assembly is housed within the film cartridge 40.

The hologram recording medium 19 is then loaded between the roll 41 and the intermittent feed roll 42 and the optical component 46 is set so that its curved distal end will be pressed against the recording medium for hologram 19 with a pre-set pressure. The sponge 51 as liquid supplying means is sufficiently impregnated with a liquid.

Before actually recording the image on the recording medium for hologram 19, the control signal S2 is issued from the control computer 12 to the stepping motor of the printer head 27-1 and to the feed-out roll mechanism for driving the stepping motor and the feed-out roll mechanism for feeding the recording medium for hologram 19 a distance necessary for establishing the contact between the recording medium for hologram 19 and the optical component 46.

Since the liquid is supplied to the recording medium for hologram 19 at a position at which the recording medium for hologram 19 starts to be contacted with the recording medium for hologram 19 and the optical component 46 is contacted with the recording medium for hologram 19 already holding the liquid, the liquid can be interposed between the recording medium for hologram 19 and the optical component 46.

The control computer 12 then sends the image data D5 corresponding to the respective images of the parallax image string to the LCD 18 for driving the LCD 18 for displaying an image corresponding to the image data D5.

The control computer 12 also sends out the control signal S1 to the shutter 17 for opening it in order to have the laser light L1 emitted by the laser light source 20 fall on the recording medium for hologram 19 via LCD 18. The laser light beam L1, outgoing from the laser light source 20, is passed through the shutter 27, half mirror 22, spatial filter 23 and the collimator lens 24, as explained previously, so as to fall on the recording medium for hologram 19 as object light (projecting light). One-half of the laser light beam L1 radiated from the laser light source 20 to fall on the half-mirror 21 via shutter 17 is reflected to fall as reference light beam on the back side of the recording medium for hologram 19 via cylindrical lens 28, collimator lens 29 and mirror 30.

By having the object light beam interfere with the reference light beam on the recording medium for hologram 19 so as to be used for light exposure, an image displayed on the LCD 18 is recorded in a strip shape as interference fringes on the recording medium for hologram 19.

When the recording of this image comes to a close, the shutter 17 is closed under control by the control computer 12 to interrupt the laser light beam L1 radiated from the laser light source 20 to stop the driving of the LCD 18. By sending out the control signal S2 from the control computer 12 to the stepping motor of the printer head 27-1 and to the feed-out roll driving mechanism for driving these two components, the recording medium for hologram 19 is fed by one hologram element. For intermittent feeding of the recording medium for hologram 19, there is no necessity of spacing the optical component 46 away from the recording medium for hologram 19.

By repeating the operations of displaying an image corresponding to the image data D5 on the LCD 18, opening the shutter 17 for having the object light beam interfere with the reference light beam on the recording medium for hologram 19 for light exposure and feeding the recording medium for hologram 19 by the stepping motor and the feed-out roll driving mechanism by one hologram element, the image data D5 corresponding to the respective images on the parallax image string supplied from the data processor 11 are sequentially recorded in a strip-like form on the recording medium for hologram 19.

Downstream of the portion of the printer head 27-1 where the recording medium for hologram 19 is exposed to the object light and the reference light, the entire surface of the intermittently fed recording medium for hologram 19 is illuminated by the light beam L3 from the UV lamp 47. This completes polymerization of the monomer M in the exposed portion of the photopolymer layer 19b of the recording medium for hologram 19, as shown in FIGS. 9A, 9B and 9C.

Downstream of the UV lamp 47, the recording medium for hologram 19 is heated by the heat roll 48. This increases the refractive index modulation factor of the photopolymer layer 19b for fixing the recorded image.

Downstream of the heat roll 48, the cutter driving mechanism is driven based on the control signal S2 supplied from the control computer 12 so that the completed holographic stereogram is cut to a desired size by the cutter 50 so as to be discharged to outside.

By continuously supplying the liquid to a space between the recording medium for hologram 19 and the optical component 46 for having the liquid interposed therebetween at all times, for recording a desired image on the recording medium for hologram 19, the optical component 46 and the recording medium for hologram 19 can be tightly contacted with each other without producing an intervening space thus sufficiently suppressing vibrations of the recording medium for hologram 19.

By having the liquid interposed between the recording medium for hologram 19 and the optical component 46, as described above, the recording medium for hologram 19 can be intermittently fed without the necessity of moving the optical component 46 in the opposite direction.

Moreover, the recording medium for hologram 19 and the optical component 46 are arrayed in air and the liquid is held under surface tension, thus facilitating the maintenance.

1-3 Second Embodiment

In the image recording device of the instant embodiment, in which recording is performed by the edge-lit system, an optical component comprised of a reference light inlet block is contacted via liquid with a reference light incident side of the recording medium for hologram 19. With the image recording method embodying the present invention, a holographic stereogram is produced using the above-described image recording device.

In carrying out the recording by the edge-lit system, the structure of the holographic stereogram printer system is as explained by referring to FIG. 6, while that of the holographic stereogram printer device is also as explained by referring to FIGS. 7A and 7B except that the angle of incidence of the reference light, for example, is changed from the arrangement shown in FIG. 6.

For illustrating the image recording method embodying the present invention, the structure of the vicinity of the printer head 27 in the holographic stereogram printer device 13 is explained in detail. In the present embodiment, the printer head 27 is constructed as a printer head 27-2 shown in FIG. 11.

With the printer head 27-2, similarly to the printer head 27-1 shown in FIG. 10, the recording medium for hologram 19 is loaded thereon. The parts and components common to those of the printer head 27-1 shown in FIG. 10 are indicated by the same numerals and the corresponding description is omitted for avoiding redundancy.

In the printer head 27-2, the optical component 46 made up of the one-dimensional diffusion plate 44 is arranged at a spacing from the recording medium for hologram 19. That is, the present one-dimensional diffusion plate 44, while having the same optical function as that of the printer head 27-1 shown in FIG. 10, has no function of retaining the recording medium for hologram 19.

Meanwhile, with the printer head 27-2, the reference light beam, incident on the recording medium for hologram 19 via a reference light inlet block 52 as later explained, is totally reflected on an interface with air without reaching the one-dimensional diffusion plate 44. Thus, with the present printer head 27-2, there is no necessity of providing a louver film between the recording medium for hologram 19 and the one-dimensional diffusion plate 44.

Also, with the present printer head 27-2, the reference light inlet block 52 formed of transparent glass is arranged in register with the point of incidence of the reference light so as to be in contact with the recording medium for hologram 19. In carrying out the recording by the edge-lit system, the reference light beam falls on an end of the reference light inlet block 52 in order to fall at an acute angle on the surface of the recording medium for hologram 19. The reference light inlet block 52 herein is formed of glass BK7 having a refractive index of 1.51.

In the present printer head 27-2, interference fringes are formed on the recording medium for hologram 19 by the object light beam incident substantially at a right angle on the surface of the recording medium for hologram 19 and the reference light beam incident substantially at an acute angle on the surface of the recording medium for hologram 19.

Moreover, since the reference light inlet block 52 is provided in contact with the recording medium for hologram 19, micro-sized vibrations of the recording medium for hologram 19 between the roll 41 and the intermittent feed roll 42 can be suppressed for forming a bright holographic stereogram, that is a holographic stereogram having a high diffraction efficiency.

Also, with the present embodiment, a liquid-impregnated sponge 53 is arranged as liquid supply means upstream of the above-mentioned reference light inlet block 52 so as to be in contact with both the reference light inlet block 52 and the recording medium for hologram 19. Meanwhile, the sponge 53 is narrower in width than the recording medium for hologram 19 for preventing the liquid from flowing round the back side of the recording medium for hologram 19.

The liquid with which to impregnate the sponge 53 herein is o-xylene having a refractive index enabling index matching of the recording medium for hologram 19 with the reference light inlet block 52. The conditions for the refractive index enabling index matching will be explained later.

By arranging the sponge 53, it becomes possible to supply the liquid continuously to a space between the recording medium for hologram 19 and the reference light inlet block 52 in order to have the liquid interposed at all times between the recording medium for hologram 19 and the reference light inlet block 52. Since this achieves tight contact free of voids between the recording medium for hologram 19 and the reference light inlet block 52, oscillations of the recording medium for hologram 19 can be suppressed sufficiently.

Since the recording medium for hologram 19 and the reference light inlet block 52 realizes index matching, there is no risk that the reference light passed through the reference light inlet block 52 and incident on the recording medium for hologram 19 be totally reflected within the interior of the reference light inlet block 52. Thus it becomes possible to fabricate a holographic stereogram of superior image quality.

Moreover, if the liquid is interposed between the recording medium for hologram 19 and the reference light inlet block 52 the recording medium for hologram 19 can be fed intermittently without the necessity of moving the reference light inlet block 52 in an opposite direction. This renders it possible to omit the above-mentioned optical component driving mechanism for displacing the reference light inlet block towards or away from the recording medium for hologram 19 to simplify the structure of the image recording device.

Moreover, if the liquid is interposed between the recording medium for hologram 19 and the reference light inlet block 52, as described above, the recording medium for hologram 19 and the reference light inlet block 52 may be immersed in a liquid. However, the recording medium for hologram 19 and the optical component 46 are arrayed in air and the liquid is held under surface tension, thus simplifying the structure of the image recording device and facilitating the maintenance.

In the present printer head 27-2, since the structure downstream of the intermittent feed roll 42 is similar to that of the printer head 27-1 shown in FIG. 10, the corresponding description is omitted for simplicity.

For explaining the image recording method embodying the present invention, the operation of the holographic stereogram printer device 13 inclusive of the printer head 27 is explained in detail.

For producing a holographic stereogram, using the above-described holographic stereogram printer device 13, the hologram recording medium 19 configured as shown in FIG. 8 is coiled around the roll 41 and the resulting assembly is housed within the film cartridge 40.

The hologram recording medium 19 is then loaded between the roll 41 and the intermittent feed roll 42 and the reference light inlet block 52 will be contacted with the recording medium for hologram 19. The sponge 53 as liquid supplying means is sufficiently impregnated with a liquid.

Before actually recording the image on the recording medium for hologram 19, the control signal S2 is issued from the control computer 12 to the stepping motor of the printer head 27-2 and to the feed-out roll mechanism for driving the stepping motor and the feed-out roll mechanism for feeding the recording medium for hologram 19 a distance corresponding to the contact between the recording medium for hologram 19 and the reference light inlet block 52.

Since the liquid is supplied to the recording medium for hologram 19 at a position at which the recording medium for hologram 19 starts to be contacted with the reference light inlet block 52 and the recording medium for hologram 19 is contacted with the recording medium for hologram 19 already holding the liquid, the liquid can be interposed between the recording medium for hologram 19 and the reference light inlet block 52.

The control computer 12 then sends the image data D5 corresponding to the respective images of the parallax image string for driving the LCD 18 for displaying an image corresponding to the image data D5.

The control computer 12 also sends out the control signal S1 to the shutter 17 for opening it in order to have the laser light L1 emitted by the laser light source 20 fall on the recording medium for hologram 19 via LCD 18. The laser light beam L1, outgoing from the laser light source 20, is passed through the shutter 17, half mirror 21, spatial filter 23 and the collimator lens 24, as explained previously, to fall on the recording medium for hologram 19 as object light (projecting light). One-half of the laser light beam L1 radiated from the laser light source 20 to fall on the half-mirror 21 via shutter 17 is reflected to fall as reference light beam on the back side of the recording medium for hologram 19 via cylindrical lens 28, collimator lens 29 and mirror 30.

By having the object lightbeam interfere with the reference light beam on the recording medium for hologram 19 so as to be used for light exposure, an image displayed on the LCD 18 is recorded in a strip-shape as interference fringes on the recording medium for hologram 19.

When the recording of this image comes to a close, the shutter 17 is closed under control by the control computer 12 to interrupt the laser light beam L1 radiated from the laser light source 20 to stop the driving of the LCD 18. By sending out the control signal S2 from the control computer 12 to the stepping motor of the printer head 27-2 and to the feed-out roll driving mechanism for driving the two components, the recording medium for hologram 19 is fed by one hologram element. For intermittent feeding of the recording medium for hologram 19, there is no necessity of spacing the reference light inlet block 52 away from the recording medium for hologram 19.

By repeating the operations of displaying an image corresponding to the image data D5 on the LCD 18, opening the shutter 17 for having the object light beam interfere with the reference light beam on the recording medium for hologram 19 for light exposure and feeding the recording medium for hologram 19 by the stepping motor and the feed-out roll driving mechanism by one hologram element, the image data D5 corresponding to the respective images of the parallax image string supplied from the data processor 11 are sequentially recorded in a strip-like form on the recording medium for hologram 19.

Downstream of the portion of the printer head 27-2 where the recording medium for hologram 19 is exposed to the object light and the reference light, the entire surface of the intermittently fed recording medium for hologram 19 is illuminated by the light beam L3 from the UV lamp 47. This completes polymerization of the monomer M in the exposed portion of the photopolymer layer 19*b* of the recording medium for hologram 19, as shown in FIGS. 9A, 9B and 9C.

Downstream of the UV lamp 47, the recording medium for hologram 19 is heated by the heat roll 48. This increases the refractive index modulation factor of the photopolymer layer 19*b* for fixing the recorded image.

Downstream of the heat roll 48, the cutter driving mechanism is driven based on the control signal S2 supplied from the control computer 12 so that the completed holographic stereogram is cut to a desired size by the cutter 50 so as to be discharged to outside.

By continuously supplying the liquid to a space between the recording medium for hologram 19 and the reference light inlet block 52 for having the liquid interposed therebetween at all times, for recording a desired image on the recording medium for hologram 19, the reference light inlet block 52 and the recording medium for hologram 19 can be tightly contacted with each other without producing an intervening space thus sufficiently suppressing vibrations of the recording medium for hologram 19.

Moreover, since the liquid supplied to the space between the recording medium for hologram 19 and the reference light inlet block 52 realizes index matching, the reference light beam passed through the reference light inlet block 52 so as to fall on the recording medium for hologram 19 is not totally reflected within the reference light inlet block 52, thus achieving a holographic stereogram of superior image quality.

By having the liquid interposed between the recording medium for hologram 19 and the optical component 46, as described above, the recording medium for hologram 19 can be intermittently fed without the necessity of moving the reference light inlet block 52 in the opposite direction.

Moreover, the recording medium for hologram 19 and the optical component 46 are arrayed in air and the liquid is held under surface tension, thus facilitating the maintenance.

Meanwhile, if, in carrying out reproduction by the edge-lit system, an illuminating light inlet block having optical properties similar to those of the reference light inlet block 52 is contacted with the holographic stereogram, and the illuminating light beam is incident on this illuminating light inlet block at the same angle as the angle of incidence of the reference light to the surface of the recording medium for hologram 19, the illuminating light is diffracted by interference fringes formed on the recording medium for hologram 19, thus producing the diffracted light similar to the object light for producing a reproduced image.

Thus, for fabricating a transmission type holographic stereogram by the edge-lit system, the reference light beam needs to fall from the object light incident side on the recording medium for hologram. Thus the reference light inlet block is arrayed between the cylindrical lens for collecting the object light and the recording medium for hologram. However, because of spatial constraints, it is extremely difficult to arrange the reference light inlet block between the cylindrical lens and the recording medium for hologram.

Figure 11:
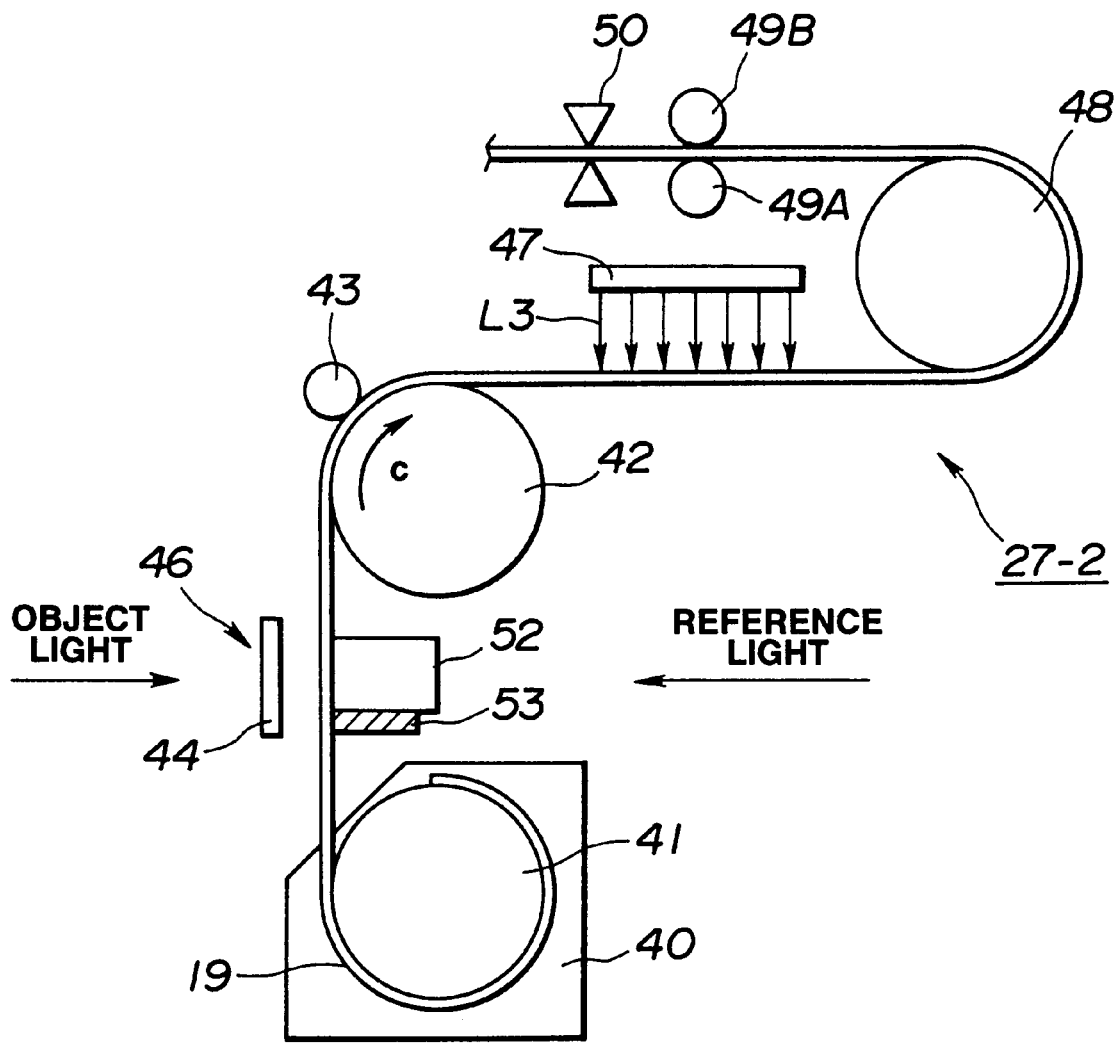
FIG. 11 is a schematic view showing an illustrative structure of the vicinity of the printer head in case of recording by an edge-lit system.

On the other hand, with a holographic stereogram printer device 13 having the printer head 27-2, as shown in FIG. 11, since the holographic stereogram of the edge-lit system is fabricated as a reflection type hologram, it is sufficient if the object light is caused to fall on one of the surfaces of the recording medium for hologram 19 and if the reference light is caused to fall on the its opposite surface. Thus it suffices if the cylindrical lens 20 for condensing the object light is arranged on one side of the recording medium for hologram 19 and the reference light inlet block 52 is arranged on the other side thereof in order to construct the optical system with ease in a manner free from spatial limitations.

Meanwhile, the holographic stereogram fabricated as the reflection type hologram reproduces the three-dimensional image by the reflection type hologram. For reproducing the three-dimensional image as the reflection type hologram, a holographic stereogram 62 is bonded to an illuminating light inlet block 61 via liquid 60 and, under this condition, a reproducing illuminating light beam 63 is caused to fall from an end 61a of the illuminating light inlet block 61 towards the holographic stereogram 62. The holographic stereogram 62 is bonded to a surface 61*b* of the illuminating light inlet block 61 remote from a viewer 64.

In this case, a reproduced image 66 generated by a diffracted light beam 65 diffracted from the holographic stereogram 62 by the reflection mode is observed by the viewer 64. Thus, when a three-dimensional image is reproduced, a reproduced image 66 appears as if the object were behind the illuminating light inlet block 61 as viewed by the viewer 64.

It is also possible for the holographic stereogram, fabricated as the reflection type hologram as described above, to reproduce a three-dimensional image as a transmission type hologram.

That is, with a holographic stereogram 72 bonded via a liquid 70 to an illuminating light inlet block 71, a reproducing illuminating light beam 73 is caused to fall at an end 71a of the illuminating light inlet block 71 towards the holographic stereogram 72. It is noted that the holographic stereogram 72 is bonded to a surface 71c of the reproducing light inlet block 71 closer to a viewer 74.

Figure 12:
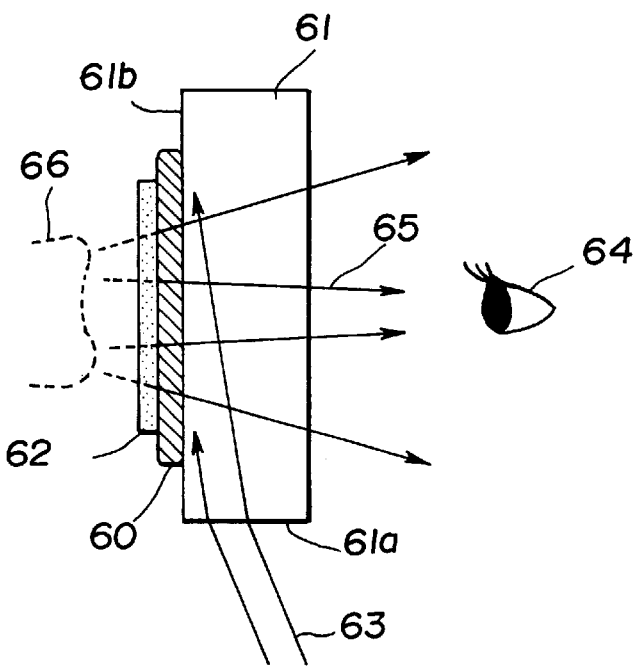
FIG. 12 is a schematic view showing a reproducing method of a holographic system with a reflection type hologram.
Figure 13:
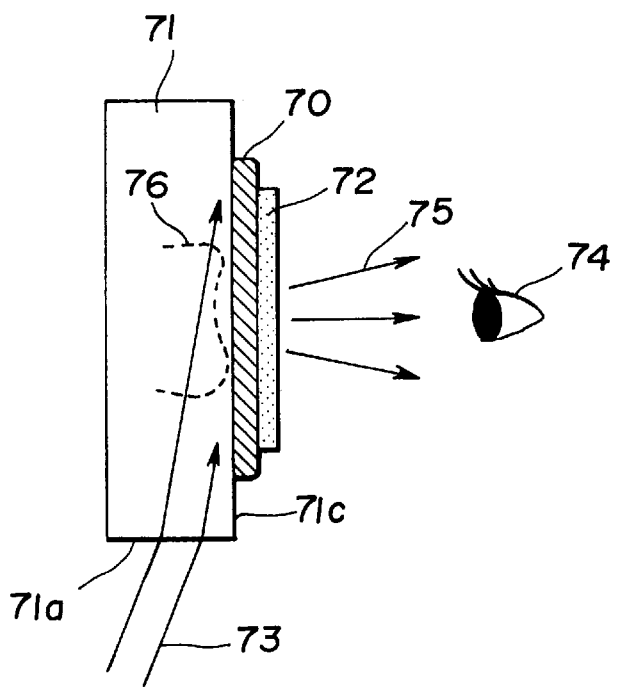
FIG. 13 is a schematic view showing a reproducing method of a holographic system with a transmission type hologram.

At this time, a reproduced image 76 generated by a diffracted light beam 75 diffracted from the holographic stereogram 72 with the transmission mode is viewed by the viewer 74. Thus, if a three-dimensional image is reproduced, a reproduced image 76 appears as if it were located closer to the viewer than if a three-dimensional image is reproduced with the reproducing method shown in FIG. 12. Thus, by reproducing the three-dimensional image shown in FIG. 13, the stereoscopic feeling can be emphasized thus realizing a higher display effect.

Meanwhile, the shape of the illuminating light inlet block 71 need not be parallelepipedic and may be optionally selected on the condition that the angle of incidence of the illuminating reproducing light 73 with respect to the holographic stereogram 72 is coincident with that of the reference light beam incident on the recording medium for hologram 19.

In the present embodiment, the wavelength of the laser light used for fabricating the holographic stereogram is approximately 532 nm, while the angle the reference light makes with the object light is approximately 75°. The film thickness of a photosensitive portion of the recording medium for hologram 19 is approximately 20 μm, with its refractive index being approximately 1.5. Therefore, the allowance of selection of the wavelength of the holographic stereogram is approximately 50 nm. Thus, for reproducing the holographic stereogram, an LED emitting a light beam having a center wavelength of approximately 525 nm and the wavelength width of approximately 50 nm is desirable as the light source of the reproducing illuminating light 73. Since the LED has an extremely high light emitting efficiency, it becomes possible to obtain the driving power of the image reproducing device from, for example, a battery, thereby enabling the size and the cost of the device to be lowered.

For reproducing a holographic stereogram as the reflection type, a reproduced image can be usually obtained even if the white light is used as the reproducing illumination because the stereogram has higher wavelength selectivity. Conversely, for regenerating a holographic stereogram as the reflection type, it becomes difficult to reproduce the holographic stereogram with the white light because the wavelength selectivity becomes weaker than if the holographic stereogram is reproduced as the reflection type. Therefore, if a holographic stereogram is reproduced as the transmission type, a light source with a higher color purity is preferably used as a reproducing light source. Specifically, if a LED emitting the light of high color purity is used as a reproducing light source, it becomes possible to obtain a clear reproduced image. The LED also has merits that it is closer in nature to a point light source and hence is effective to prevent blurring of the reproduced image due to spreading of the light source, and that it scarcely generates heat.

However, the light source for the reproducing illuminating light is not limited to LEDs. If a light source capable of emitting the light of high color purity, such as a semiconductor laser, a reproduced image can be produced in similar manner. The light raised in color purity by a wavelength selective filter or a narrow band reflection mirror may also be used as the reproducing illuminating light.

1-4 Condition for Liquid Interposed Between Recording Medium for Hologram and Optical Component In the above-described first and second embodiments, the optical component 46 made up of a set of the one-dimensional diffusion plate 44 and the louver film 45 is contacted with the recording medium for hologram 19 via liquid and the reference light inlet block 52 is contacted with the recording medium for hologram 19 via liquid, respectively. The conditions for the liquid interposed between the reference light inlet block 52 and the recording medium for hologram 19 are hereinafter explained.

First, the conditions for a liquid interposed between the reference light inlet block 52 and the recording medium for hologram 19 in case of recording by the edge-lit system are explained.

During recording by the edge-lit system, the reference light beam falls at an acute angle on the surface of the recording medium for hologram 19. Thus it is a frequent occurrence that this reference light beam be totally reflected on an interface between the reference light inlet block 52 and the recording medium for hologram 19 or surface irregularities on the surface of the recording photopolymer layer 19b of the recording medium for hologram 19 be presented on the image as stripes looking like wooden grains. It is therefore required of the liquid interposed between the recording medium for hologram 19 and the reference light inlet block 52 to achieve index matching between the recording medium for hologram 19 and the reference light inlet block 52. That is, the above conditions need to be selected so that no total reflection occurs on the interface between the reference light inlet block 52 and the recording medium for hologram 19 and so that the intensity reflectance (s-components) on each interface is reduced.

Figure 14:
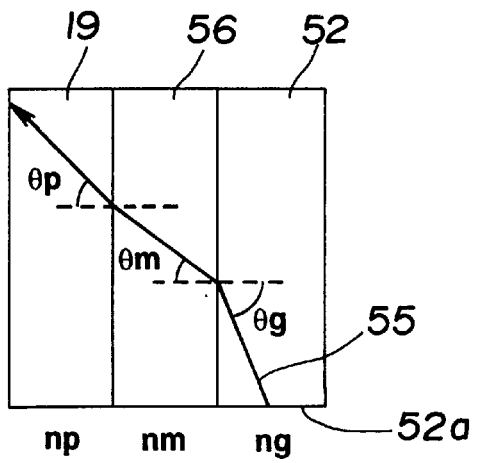
FIG. 14 illustrates an incident path of the reference light beam for finding a condition of refractive index of a liquid.

Referring to FIG. 14, if a reference light beam 55 falls on an end 52a of the reference light inlet block 52 having a refractive index $n_g$ and is transmitted through a liquid 56 having a refractive index $n_m$ to reach the recording medium for hologram 19, the following equation (1):

$$n_g \sin \theta_g = n_m \sin \theta_m = n_p \sin \theta_p \tag{1}$$

where $\theta_g$, $\theta_m$ and $\theta_p$ are angles of the light beam on the respective interfaces. The conditions under which no total reflection occurs on the respective interfaces are given by the following equations (2) and (3):

$$n_m > n_g \sin \theta_g \tag{2}$$

$$n_p > n_m \sin \theta_m (= n_g \sin \theta_g) \tag{3}$$

Meanwhile, if the photopolymer layer 19b of the recording medium for hologram 19 having the refractive index of 1.487, as described above, is used, $n_p = 1.487$ is substituted into equation (3) to give $n_g$ by the following equation (4):

$$n_g < 1.487/\sin \theta_g \tag{4}$$

If $\theta_g = 75°$ or $\theta_g = 78°$, $n_g$ is given by the following equations (5) and (6):

$$\theta_g < 1.539 \text{ for } \theta_g = 75° \tag{5}$$

$$\theta_g < 1.520 \text{ for } \theta_g = 78° \tag{6}$$

Among materials satisfying the above equations (5) and (6) is the glass BK7 having the refractive index of 1.51. If the glass BK7 is used as this reference light inlet block 52, then $n_m$ can be found by substituting $n_g=1.51$ in the above equation (2).

Therefore, if $\theta_g=75°$ or $\theta_g=78°$, $n_m$ is found by the following equations (7) and (8):

$$n_m > 1.458 \text{ for } \theta_g = 75° \qquad (7)$$

$$n_m > 1.477 \text{ for } \theta_g = 78° \qquad (8)$$

That is, for preventing total reflection of the reference light beam 55 on the interface between the reference light inlet block 52 and the recording medium for hologram 19, it suffices to use a liquid having the refractive index $n_m$ satisfying the above equations (7) and (8) as the liquid 56 interposed between the reference light inlet block 52 and the recording medium for hologram 19.

However, for fabricating the holographic stereogram, it is necessary not only to satisfy the above conditions but also to reduce the intensity reflectance (s-component) on each interface because stronger reflectance on the interface leads to increased light loss and to formation of excess hologram by the reflected light to lower the diffraction efficiency. The conditions for preventing the above-mentioned total reflection applies only for a case in which each interface is planar. With the actual recording medium for hologram 19, the surface of the photopolymer layer 19 presents inundations to a more or less extent, such that, even if the above conditions are met, total reflection occurs locally to produce uneven portions in the form of wooden grains.

The intensity reflectance (s-components) $Rs_{(g-m)}$ on the interface between the light inlet block 52 and the liquid 56 and the intensity reflectance (s-components) $Rs_{(m-p)}$ on the interface between the liquid 56 and the recording medium for hologram 19 are represented by the following equations (9) and (10):

$$Rs_{(g-m)} = \sin^2(\theta_g - \theta_m)/\sin^2(\theta_g + \theta_m) \qquad (9)$$

$$Rs_{(m-p)} = \sin^2(\theta_m - \theta_p)/\sin^2(\theta_m + \theta_p) \qquad (10)$$

Since both $Rs_{(g-m)}$ and $Rs_{(m-p)}$ as close to zero as possible are desired, the value obtained by the following equation (11):

$$(1-Rs_{(g-m)}) \times (1+Rs_{(m-p)}) \qquad (11)$$

is desirably as close to unity as possible.

Figure 15:
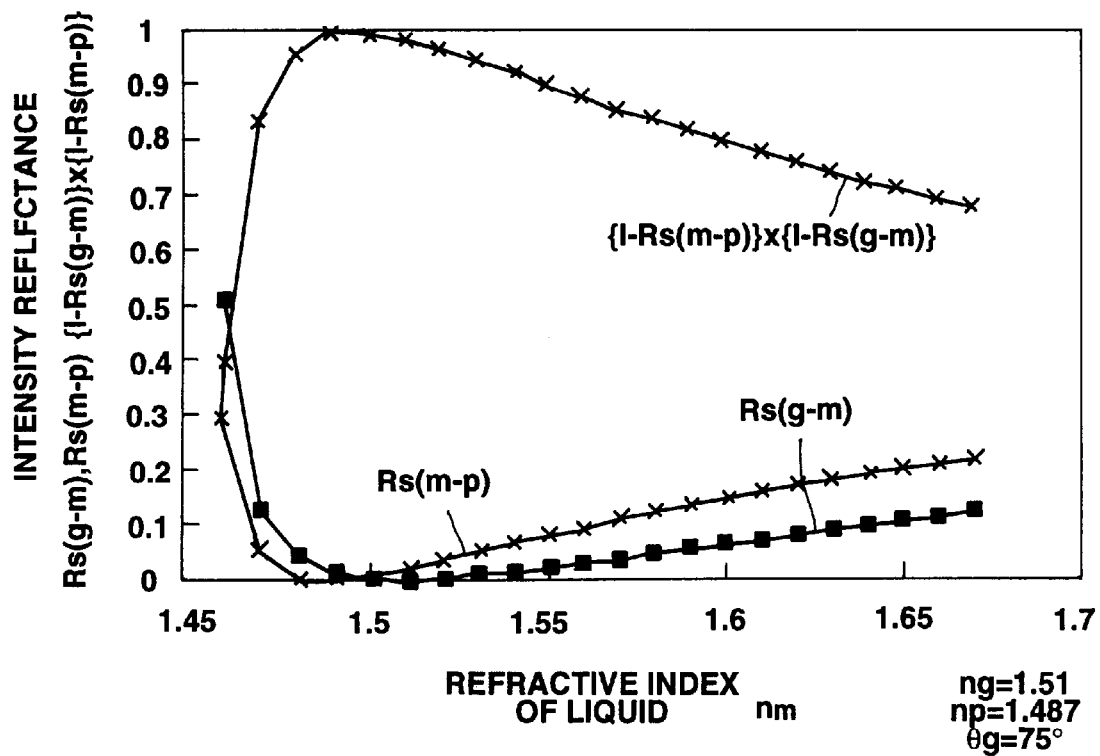
FIG. 15 shows the relation between the refractive index of a liquid and the intensity reflectance for $\theta_g = 75°$.
Figure 16:
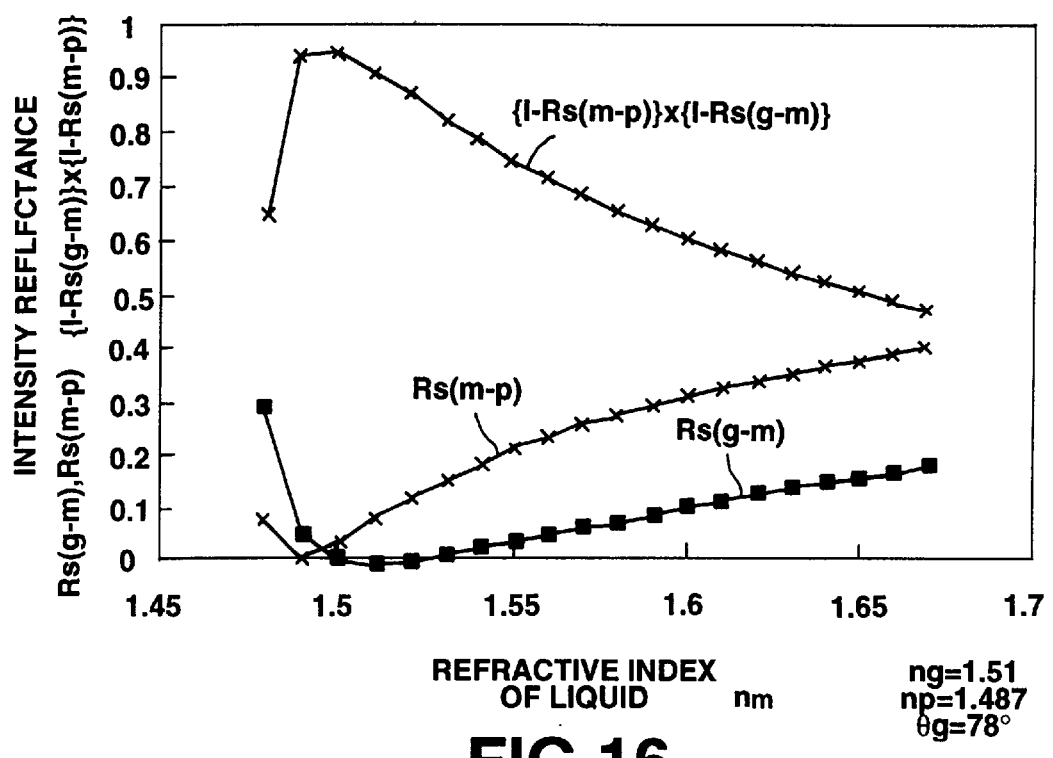
FIG. 16 shows the relation between the refractive index of a liquid and the intensity reflectance for $\theta_g=78°$.

The values of $Rs_{(g-m)}$, $Rs_{(m-p)}$ and $(1-Rs_{(g-m)}) \times (1-Rs_{(m-p)})$ for $n_p=1.487$, $n_g=1.51$, $\theta_g=75°$ or $\theta_g=78°$ and for various values of $n_m$ have been found by simulation. The results of the simulation are shown in FIGS. 15 and 16.

The range for which the value of $(1-Rs_{(g-m)}) \times (1-Rs_{(m-p)})$ becomes 0.9 or larger has been found. The following equations (12), (13) were obtained:

$$1.475 < n_m < 1.549 \text{ for } \theta_g = 75° \qquad (12)$$

$$1.486 < n_m < 1.514 \text{ for } \theta_g = 78° \qquad (13)$$

It may be said that, for preventing total reflection on the respective interfaces and for sufficiently reducing the intensity reflectance for satisfying the condition for prevention of total reflection given by the above equations (7) and (8), it suffices to have the liquid 56 with the refractive index $n_m$ satisfying the above equations (12) and (13) interposed between the reference light inlet block 52 and the recording medium for hologram 19.

Among the liquids 56 satisfying these conditions, there are, for example, ethyl benzene, o-xylene, tetrachloro ethylene, toluene, pyridine, pyrrole and mesitylene.

An instance in which there is no necessity for the reference light beam 55 to fall at an acute angle on the surface of the recording medium for hologram 19 is explained.

In order to prevent total reflection on the interface between the reference light inlet block 52 and the liquid 56 and on the interface between the liquid 56 and the recording medium for hologram 19, for $n_p=1.487$ and $\theta_g=45°$, $n_g$ is given by the following equation (14):

$$n_g > 2.103 \qquad (14)$$

from the above equation (4).

If $n_g=1.51$ and $n_g=1.51$ and $n_g=45°$ are substituted in the above equation (2), $n_m$ is given by the following equation (15):

$$n_m > 1.068 \qquad (15)$$

Figure 17:
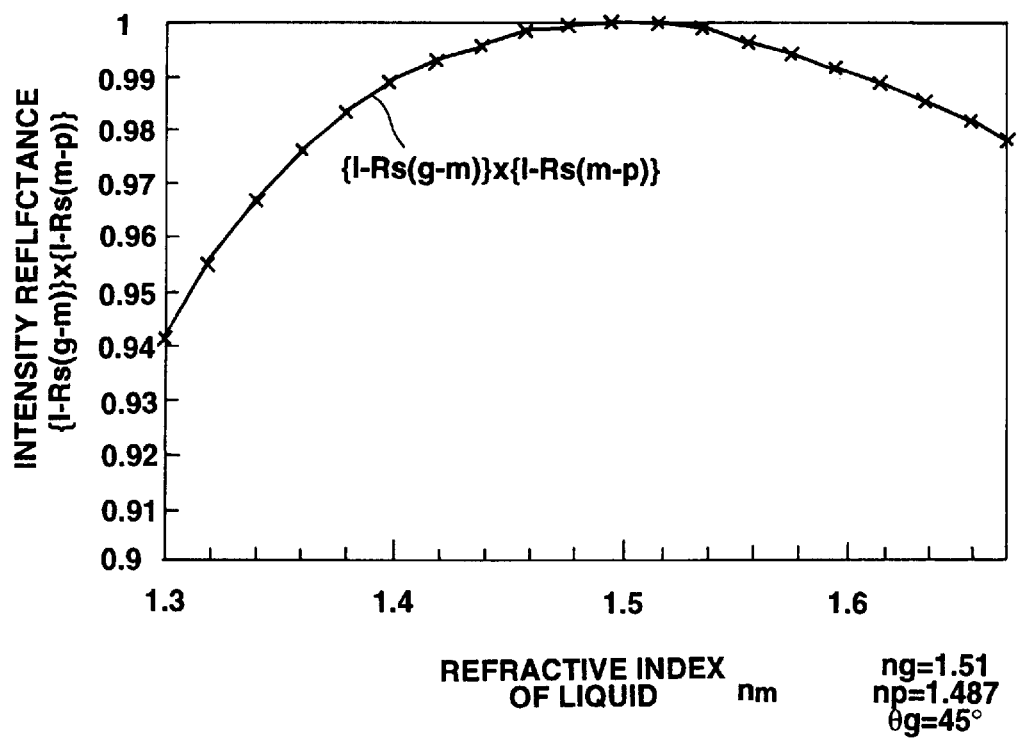
FIG. 17 shows the relation between the refractive index of a liquid and the intensity reflectance for $\theta_g=45°$.

For finding the condition for suppressing the intensity reflectance to a smaller value, the values of $Rs_{(g-m)}$ and $Rs_{(m-p)}$ for various values of $n_m$ with $n_p=1.487$, $n_g=1.51$ and $\theta_g=45°$ were found by simulation. The results are shown in FIG. 17.

The range of $n_m$ for which the value of $(1-Rs_{(g-m)}) \times (1-Rs_{(m-p)})$ is 0.9 or larger was found. The range was found to have an extremely large width as given by the following equation (16):

$$1.26 < n_m < 1.97 \qquad (16)$$

If the value of $(1-Rs_{(g-m)}) \times (1-Rs_{(m-p)})$ is set to 0.98 or larger, the range of $n_m$ was found to have a broad width as indicated by the equation (17):

$$1.38 < n_m < 1.67. \qquad (17)$$

Since the above equation (17) satisfies the above equation (15) which is the condition for preventing total reflection, it becomes possible to prevent total reflection occurring on the interfaces to suppress the intensity reflectance to a sufficiently small value if a liquid having the refractive index $n_m$ in meeting with the equation (17) is used as the liquid 56 interposed between the reference light inlet block 52 and the recording medium for hologram 19.

If the reference light beam 55 is not incident at an acute angle on the surface of the recording medium for hologram 19, total reflection inherently is less liable to occur, while the intensity reflectance is also small, so that the condition required of the liquid 56 interposed between the reference light inlet block 52 and the recording medium for hologram 19 become extremely moderate. Therefore, most of known organic solvents become usable as the liquid 56 satisfying the conditions for the refractive index 56.

In the foregoing, it is assumed that the reference light inlet block 52 is contacted via liquid 56 with the recording medium for hologram 19, as shown in FIG. 14, even in cases wherein the reference light beam 55 need not fall at an acute angle to the surface of the recording medium for hologram 19. However, in the first embodiment, since it is not only the reference light inlet block 52 but also the optical component 46, made up of the one-dimensional diffusion plate 44 and the louver film 45, that are contacted via liquid 56 with the recording medium for hologram 19, there is produced certain deviation in the range of $n_m$ due to the difference in refractive index between the reference light inlet block 52 and the optical component 46.

Also, the refractive index of the photopolymer layer 19b is adopted as the refractive index $n_p$ of the recording medium for hologram 19. However, in the recording medium for hologram 19, actually in use, the photopolymer layer 19b is sandwiched between the film base 19a and the cover sheet 19c, without the photopolymer layer 19b being in contact with the liquid 56. If the refractive index of the film base 19a or the cover sheet 19c is not equal to that of the photopolymer layer 19b or of the liquid 56, there is produced certain deviation in the above range of $n_m$.

1-5 Modification

Although the first embodiment of the image recording method and apparatus according to the present invention has been described above, the present invention is not limited to these particular embodiments. For example, although sponges 51 or 53 have been used as liquid supplying means, liquid supplying means may be of any suitable structure if it can supply liquid to a space between the recording medium for hologram 19 and the optical component 46 or the reference light inlet block 52. The liquid supplying means may be designed as a coater employing a die coater or a coater employing a roll for applying a liquid to the recording medium for hologram 19.

In the second embodiment, since the reference light inlet block 52 is contacted with the recording medium for hologram 19, the optical component 46 made up of the one-dimensional diffusion plate 44 and the louver film 45 is arranged at a spacing from the recording medium for hologram 19, both the reference light inlet block 52 and the optical component 46 may be contacted via liquid with the recording medium for hologram 19.

In the above-described embodiments, the present invention is applied to fabrication of a holographic stereogram having the parallax information only in the transverse direction. The present invention is, however, not limited to these embodiments, but may also be applied to fabrication of a holographic stereogram having the parallax information only in the longitudinal direction or to a holographic stereogram having the parallax information in both the transverse direction and the longitudinal direction.

In addition, although the above embodiments are directed to fabrication of a monochromatic holographic stereogram, the present invention may similarly be applied to fabrication of a colored holographic stereogram. For producing of the colored holographic stereogram, three light beams corresponding to the three prime colors of light may be used as the recording light. For reproducing a colored holographic stereogram recorded using three light beams corresponding to the three prime colors of light, three light sources are provided in an image reproducing device for emitting three prime colors of light so that light beams from the light sources will be illuminated simultaneously on the holographic stereogram as reproducing illuminating light beams. However, if such plural light sources are used, the optical system needs to be constructed so that light beams from the light sources will be parallel to one another. For reproducing the white holographic stereogram, light sources with high color purity are preferably used as the light sources because reproduction with the transmission type hologram suffers from weak wavelength selectivity. This renders it possible to reproduce the colored holographic stereogram clearly even with the transmission type.

In addition, the direction of incidence of the reference light beam, number or types of lenses or the combination thereof may be suitably modified from je above-described arrangement.

2. Second Image Recording Method and Apparatus

The schematics of a holographic stereogram printer system 100, as an embodiment of the second image recording device according to the present invention, is hereinafter explained.

2-1 Schematics of Image Recording Device

The schematics of the holographic stereogram printer system, as an embodiment of the second image recording device according to the present invention, are hereinafter explained.

Figure 18:
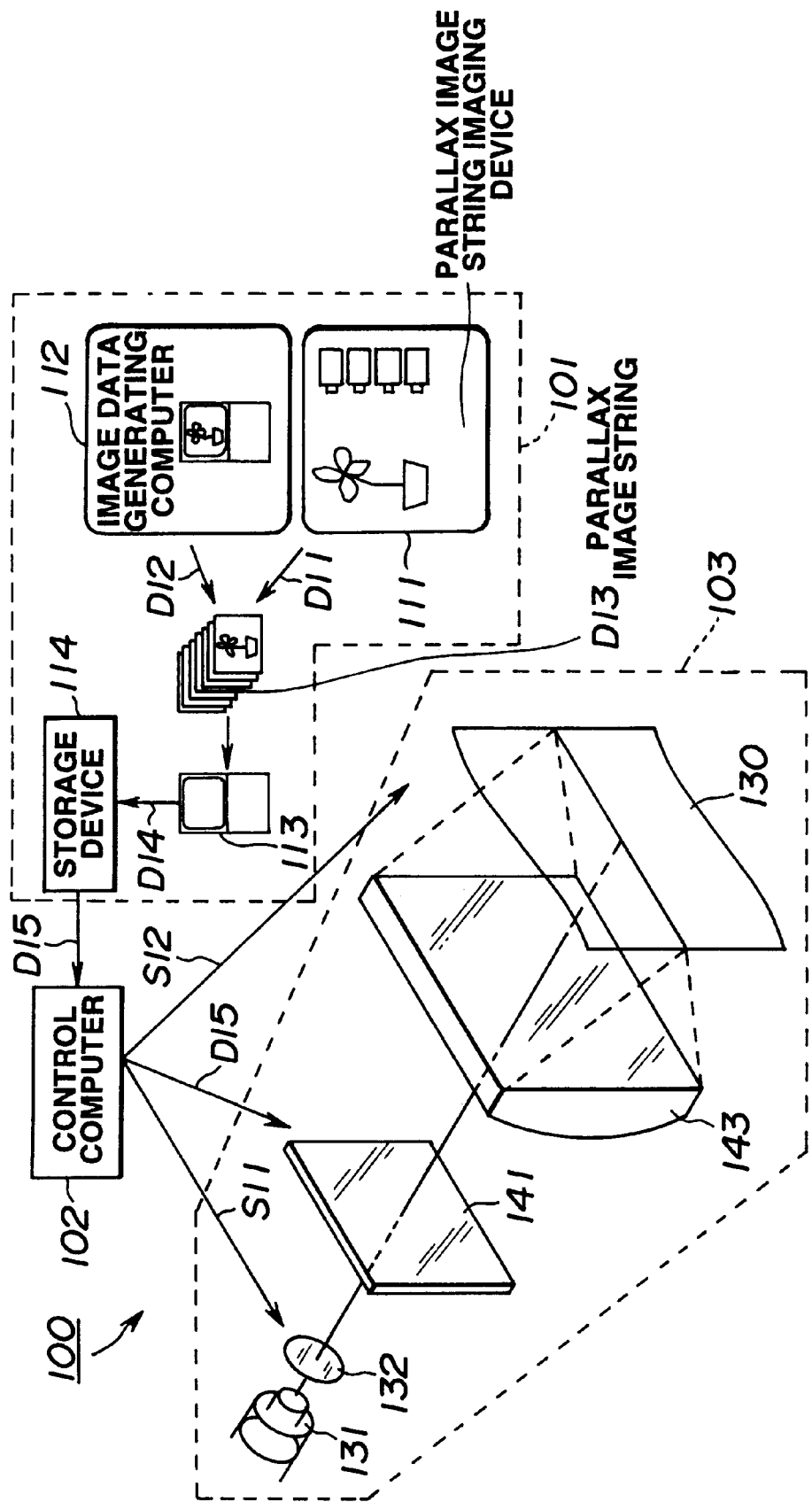
FIG. 18 is a schematic relation showing an illustrative structure of a holographic stereogram printer system.

FIG. 18 shows a structure of the holographic stereogram printer system 100 made up of a data processor 101, a control computer 102 and a holographic stereogram printer device 103.

The data processor 101 generates a parallax image string, based on image data D11 or plural images of image data D12 for plural rendering images, performs pre-set image processing for hologram on image data D13 of the parallax image string to produce image data for hologram D14 and transiently records the image data for hologram D14 on a recording medium 114, such as a hard disc. The image data D11 of plural images are obtained on imaging an object from plural viewing points in the transverse direction, such as on simultaneous imaging by a multi-eye camera or on continuous imaging by a moving camera, while the image data D12 is produced on sequentially according the parallax in the transverse direction and is outputted by the image data generating computer 112.

During the subsequent light exposure operation, the data processor 101 sequentially reads out the image data D14 of the parallax image string recorded on the recording medium 114 to send the read-out image data D15 sequentially to the control computer 102.

During light exposure, the control computer 102 driving-controls the shutter 132, LCD 141 and the printer head, as later explained, of the holographic stereogram printer device 103, based on the image data D15 of the parallax image string supplied from the data processor 101.

Figure 19A:
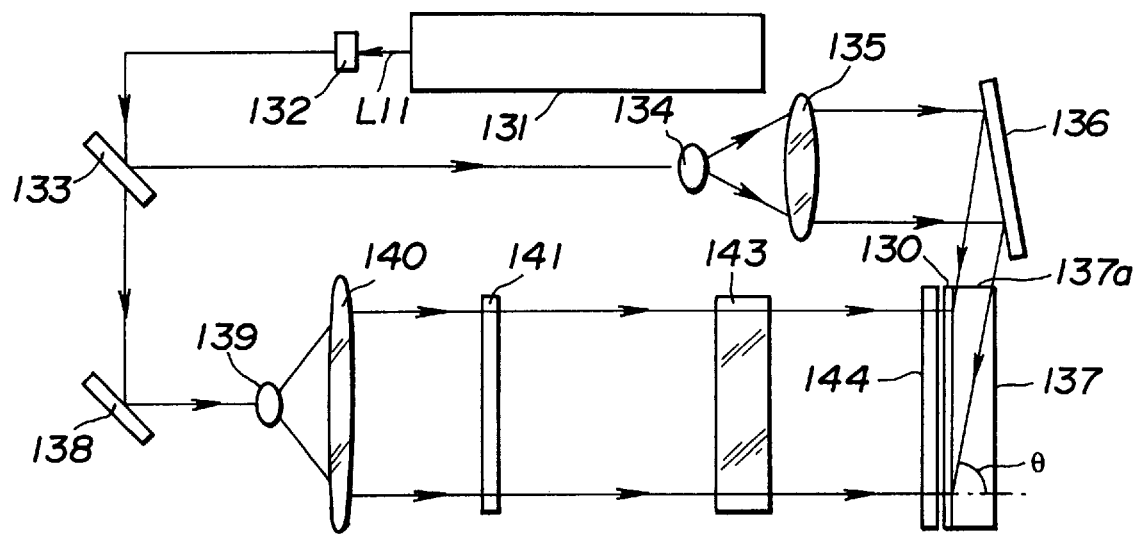
FIGS. 19A and 19B are schematic views showing an example of an optical system of a holographic stereogram printer device.
Figure 19B:
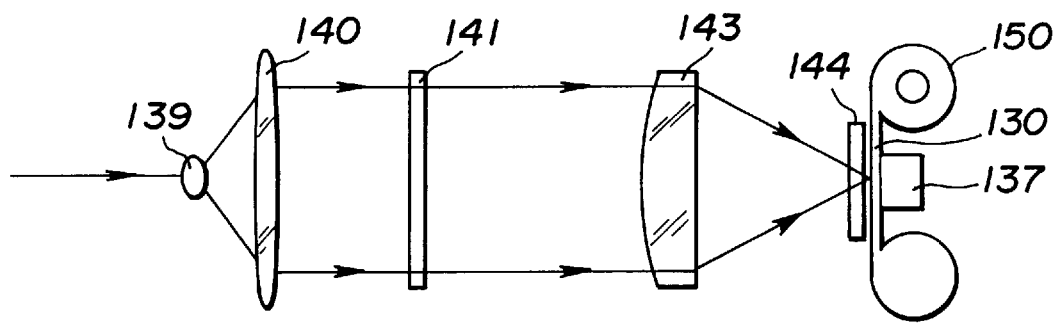

The holographic stereogram printer device 103 has the structure shown in FIGS. 19A, 19B in which corresponding parts to those shown in FIG. 18 are denoted by the same reference numerals. Specifically, the holographic stereogram printer device 103 drives the LCD 141 based on the image data D15 supplied from the above-described control computer 102 for sequentially recording respective images corresponding to the image data D15 as strip-shaped hologram elements on a recording medium for hologram 130 for fabricating the holographic stereogram. The recording medium for hologram 130 used may be similar to that explained above in connection with the first image recording method and device.

With the present holographic stereogram printer device 103, the LCD 141 is driven based on one of the image data D15 supplied from the control computer 102 for displaying an image corresponding to the image data D15 on the LCD 141. In addition, a control signal S11 is sent from the control computer 102 to the shutter 132 for opening the shutter 132 for causing a laser light beam L11 radiated from the laser light source 131 to fall via shutter 132, half mirror 133 and mirror 138 on a spatial filter 139.

This laser light beam L11 is enlarged in width by a spatial filter 139 so as to be then collimated by a collimator lens 140. The collimated light beam is transmitted through a LCD 141 so as to be converted into projecting light corresponding to an image displayed on the LCD 141. The projecting light is then incident on a cylindrical lens 143 so as to be thereby converged in the transverse direction. The converged light beam is then incident on the recording medium for hologram 130 held by a printer head 150.

At a position directly before incidence of the object light and out of contact with the recording medium for hologram 130 is arranged a one-dimensional diffusion plate 144 exhibiting diffusion characteristics only in the longitudinal direction. This one-dimensional diffusion plate 144 has the function of securing the angle of visibility in an up-and-down direction when the holographic stereogram is reproduced for viewing.

The laser light beam 111, reflected by the half-mirror 133, is transmitted through a cylindrical lens 134, a collimator lens 135 and a mirror 136 in this order so as to fall at a pre-set angle on the reverse surface of the recording medium for hologram 130. In this case, if the angle of incidence of the reference light beam is increased, surface reflection on the surface of the recording medium for hologram 130 is increased. Thus, a light inlet block 137 is used and the reference light beam is allowed to fall at an end of the block 137. The light path length of the reference light beam is selected to be substantially equal to that of a laser light beam L11 transmitted through the half mirror 133 and the mirror 138 to fall on the recording medium for hologram 130. This laser light beam L11 is referred to herein as an object light beam.

With the holographic stereogram printer device 103, this object light beam can be caused to interfere with the reference light beam on a recording surface of the recording medium for hologram 130 so that the image displayed on the LCD141 can be recorded as strip-shaped interference fringes on the recording medium for hologram 130.

With the holographic stereogram printer device 103, the shutter 132 is driven, after the end of recording the image, under control by the control computer 102, for interrupting the laser light L11 radiated by the laser light source 131. The LCD 141 then ceases to be driven and the printer head 150 is driven, under control by the control computer 102, for feeding the recording medium for hologram 130 by a length equal to the width of a sole hologram element.

The LCD 141 is further driven, under control by the control computer 102, for displaying an image corresponding to the next following image data D15. The shutter 132 is then opened, under control by the control computer 102, for recording an image displayed on the LCD 141 on the recording medium for hologram 130. The similar operations are then sequentially carried out in succession.

Thus, in the present holographic stereogram printer device 103, the images of the respective image data of the supplied parallax image string can be sequentially recorded in the form of strips on the recording medium for hologram 130, thus producing a desired holographic stereogram.

Figure 20:
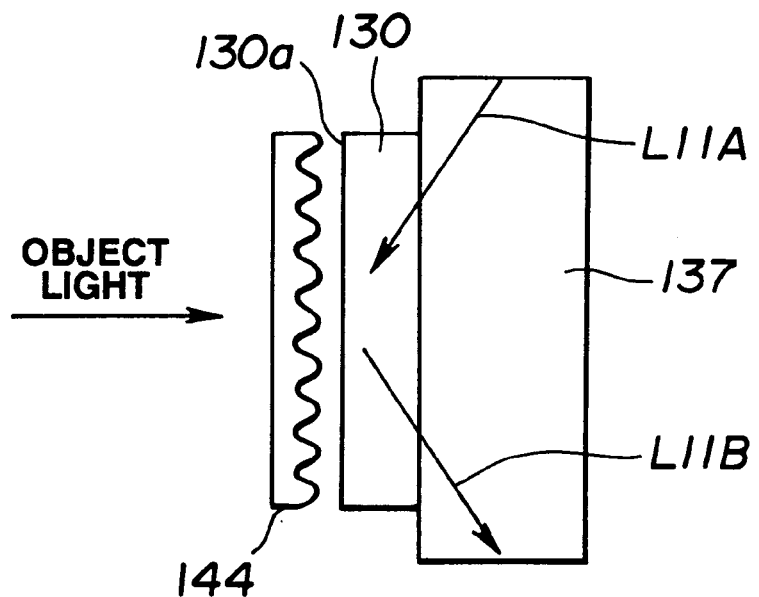
FIG. 20 is a schematic view showing the manner of total reflection of a reference light beam on an interface of a recording medium for hologram.

For recording an image on the recording medium for hologram 130, two holograms, namely a hologram reproducible as the reflection type and a hologram reproducible as the transmission type, are produced simultaneously. This mechanism is explained by referring to FIG. 20. For simplicity of explanation, it is assumed that the refractive index of the light inlet block 137 is equal to that of the recording medium for hologram 130.

Referring to FIG. 20A, a light beam L11A, incident via light inlet block 137 as reference light beam on the recording medium for hologram 130, proceeds straightly within the recording medium for hologram 130 so as to be reflected by total reflection on an interface 130a with air. A light beam L11B returned after total reflection is also used as a reference light beam. The result is that the recording medium for hologram is illuminated by two reference light beams of different proceeding directions. Therefore, if an illuminating light beam corresponding to the light beam L11A prior to total reflection is used as the reproducing illuminating light beam for the holographic stereogram, fabricated as described above, the recorded image can be reproduced as the reflection type whereas, if the illuminating light corresponding to the lightbeam L11B subsequent to total reflection is used as an illuminating light beam, the recorded image can be reproduced as the transmission type.

Meanwhile, it depends on the refractive index of the recording medium for hologram 130 and on the angle of incidence of the reference light beam whether or not the reference light beam undergoes total reflection on the interface 130a between the recording medium for hologram 130 and air. Thus, in the present embodiment, the refractive index of the recording medium for hologram 130 and the angle of incidence of the reference light beam are set in such a manner that the reference light beam undergoes total reflection.

Conversely, if, when the reference light beam is not reflected by total reflection on the interface 130a between the recording medium for hologram 130 and air, that is when the reference light beam is transmitted through the recording medium for hologram 130, the reference light beam is transmitted through the recording medium for hologram 130 falls on the one-dimensional diffusion plate 144 arranged on the object light incident side for the purpose of diffusing the object light beam, the reference light beam is reflected by the one-dimensional diffusion plate 144 so as to be again incident on the recording medium for hologram 130. Thus the light beam reflected by the one-dimensional diffusion plate 144 so as to be re-incident on the recording medium for hologram 130 represents a noisy component in image recording.

Figure 21:
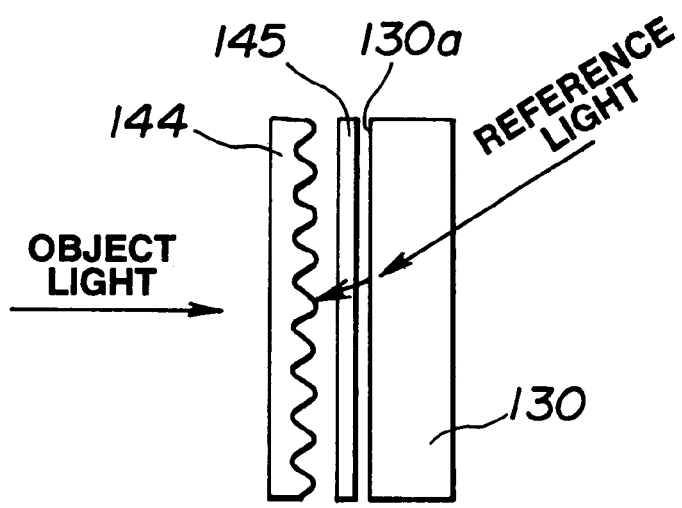
FIG. 21 is a schematic view showing the manner of preventing the reference light beam from re-entering a recording medium for hologram by a louver film.

Thus, if the reference light beam is not reflected by total reflection on the interface 130a between the recording medium for hologram 130 and air, a louver film 145 needs to be arranged between the one-dimensional diffusion plate 144 and the recording medium for hologram 130 for preventing such re-incidence, as shown in FIG. 21. Thus it becomes possible to prevent the reference light beam from being reflected by the one-dimensional diffusion plate 144 to be re-incident on the recording medium for hologram 130.

However, since such louver film 145 is arranged in the light path of the object light beam, the object light beam tends to be thereby disturbed to detract from image uniformity or brightness. Conversely, if the reference light beam is reflected by total reflection on the interface 130a between the recording medium for hologram 130 and air, the reference light beam is not transmitted through the recording medium for hologram 130, so that the louver film 145 may be eliminated. Moreover, the optical system may be correspondingly simplified in structure.

For improving sharpness of the recorded image, the one-dimensional diffusion plate 144 is preferably arranged at a position as close to the recording medium for hologram 130 as possible. However, a void is provided between the recording medium for hologram 130 and the one-dimensional diffusion plate 144 for permitting total reflection of the reference light beam on the interface 130a between the recording medium for hologram 130 and air. That is, total reflection of the reference light is allowed to occur on the interface 130a between the recording medium for hologram 130 and air which is interposed between the one-dimensional diffusion plate 144 and recording medium for hologram 130.

Meanwhile, a material having the refractive index satisfying the condition of total reflection of the reference light on the interface to the recording medium for hologram 130 may be interposed, in place of air, between the one-dimensional diffusion plate 144 and the recording medium for hologram 130. That is, the recording medium for hologram 130, a spacer having a refractive index satisfying the condition for total reflection of the reference light beam and the one-dimensional diffusion plate 144 may be arranged in superposition.

Meanwhile, the second image recording device according to the present invention sequentially records images corresponding to image data of the parallax image string as strip- or dot-shaped hologram elements by causing the object light and the reference light to fall on one and the other surfaces of the recording medium for hologram 130. To this end, the second image recording device includes an optical component contacted with the reference light incident surface of the recording medium for hologram.

Thus, in the above-described holographic stereogram printer system 100, the feature of the present invention resides in the structure of the holographic stereogram printer device 103, in particular the vicinity of the printer head 150. Thus, an illustrative structure of the vicinity of the printer head 150 is now explained in detail by way of illustrating an embodiment of the image recording device of the present invention.

2-2 First Embodiment

The image recording device of the present embodiment is configured so that the optical component is contacted in a void-free fashion on the reference light inlet side of the recording medium for hologram 130. The image recording device of the instant embodiment fabricates a holographic stereogram using the above-described image recording device.

Figure 22:
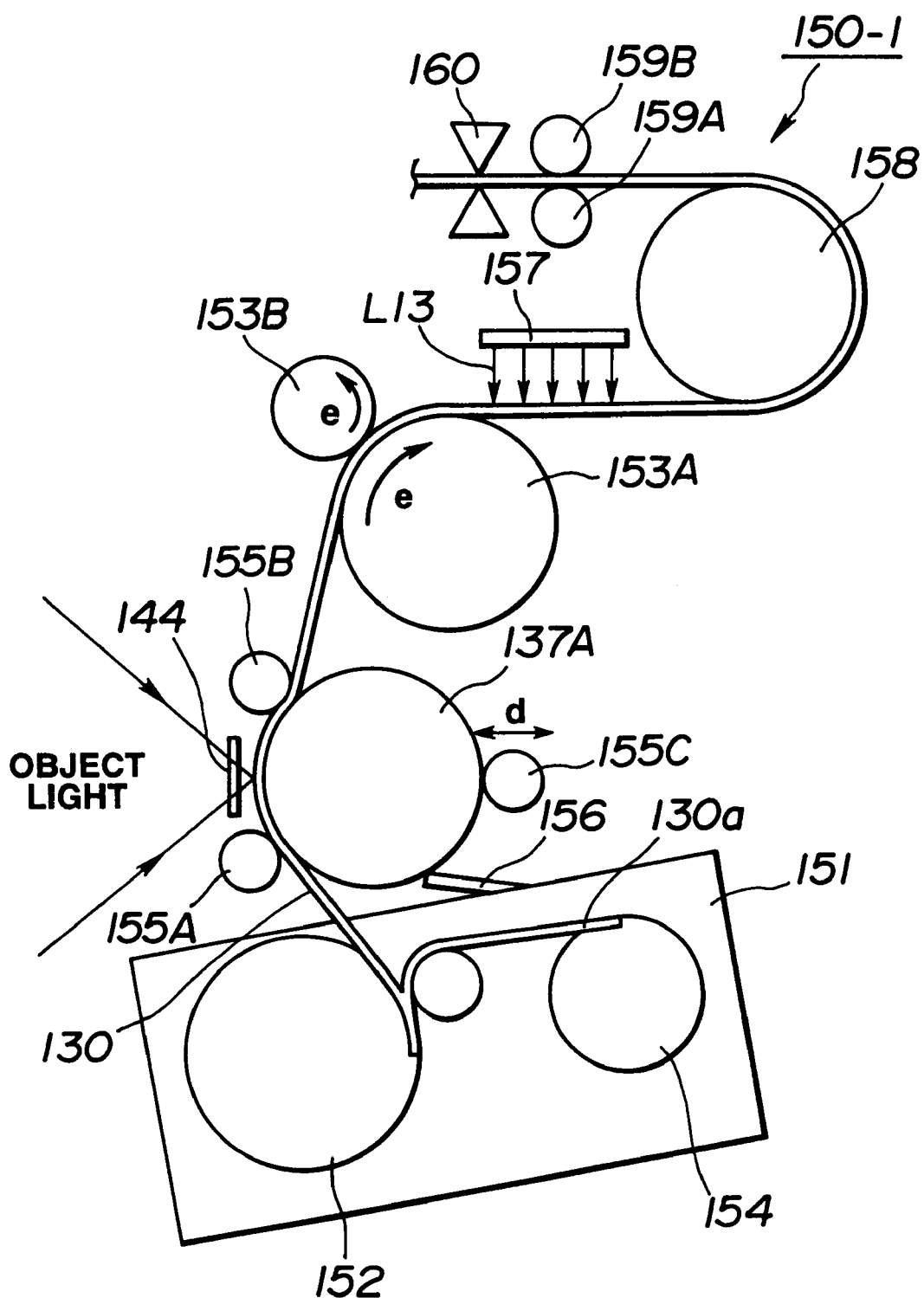
FIG. 22 is a schematic view showing an illustrative structure of the vicinity of a printer head of a holographic stereogram printer device of the type in which a recording medium for hologram is intimately contacted with a light inlet block.

For illustrating the image recording device of the instant embodiment, the structure of the vicinity of the printer head 150 of the holographic stereogram printer device 103 of the above-described holographic stereogram printer system 100 is explained in detail. In the present embodiment, the printer head 150 is configured as a printer head 150-1 as shown in FIG. 22.

The printer head 150-1 is configured for holding and transporting the recording medium for hologram 130.

That is, the printer head 150-1 is configured for rotatably fulcruming a roll 152 in a film cartridge 151 loaded in position with a pre-set torque and for holding the recording medium for hologram 130 drawn out from the film cartridge 151 between a first intermittent feed roll 153A and a second intermittent feed roll 153B.

Between the roll 152 and the intermittent feed rolls 153A and 153B, a light inlet block 137A formed of a transparent rigid material, such as glass, is arranged in contact with the recording medium for hologram 130 on the object light inlet side on the opposite surface to the object light incident side. The light inlet block 137A is columnar-shaped and is held by a holding mechanism, not-shown, for rotation about the shaft as center.

The recording medium for hologram 130 is adapted for being contacted with the light inlet block 137A between the roll 152 and the intermittent fed rolls 153A, 153B. The object light beam is adapted to fall at a right angle on the recording medium for hologram 130 in an area thereof in contact with the light inlet block 137A.

The recording medium for hologram 130 enclosed within the film cartridge 151 has a cover sheet for protecting the photosensitive portion. That is, the recording medium for hologram 130 is of a sandwiched structure in which the photopolymer layer as the photosensitive portion is sandwiched in an initial state between the base film material and the cover film and is coiled about the roll 152 within the film cartridge 151. In the printer head 150-1, the cover sheet 130a is peeled from the recording medium for hologram 130 so as to be taken up on another roll 154 before the recording medium for hologram 130 led out from the film cartridge 151 is contacted with the light inlet block 137A, as shown in FIG. 22. The recording medium for hologram 130, from which the cover sheet 130a has been peeled off, is led out towards the light inlet block 137A, so that the object light incident side and the reference light incident side prove to be a base film material and the photopolymer layer, respectively.

Figure 23:
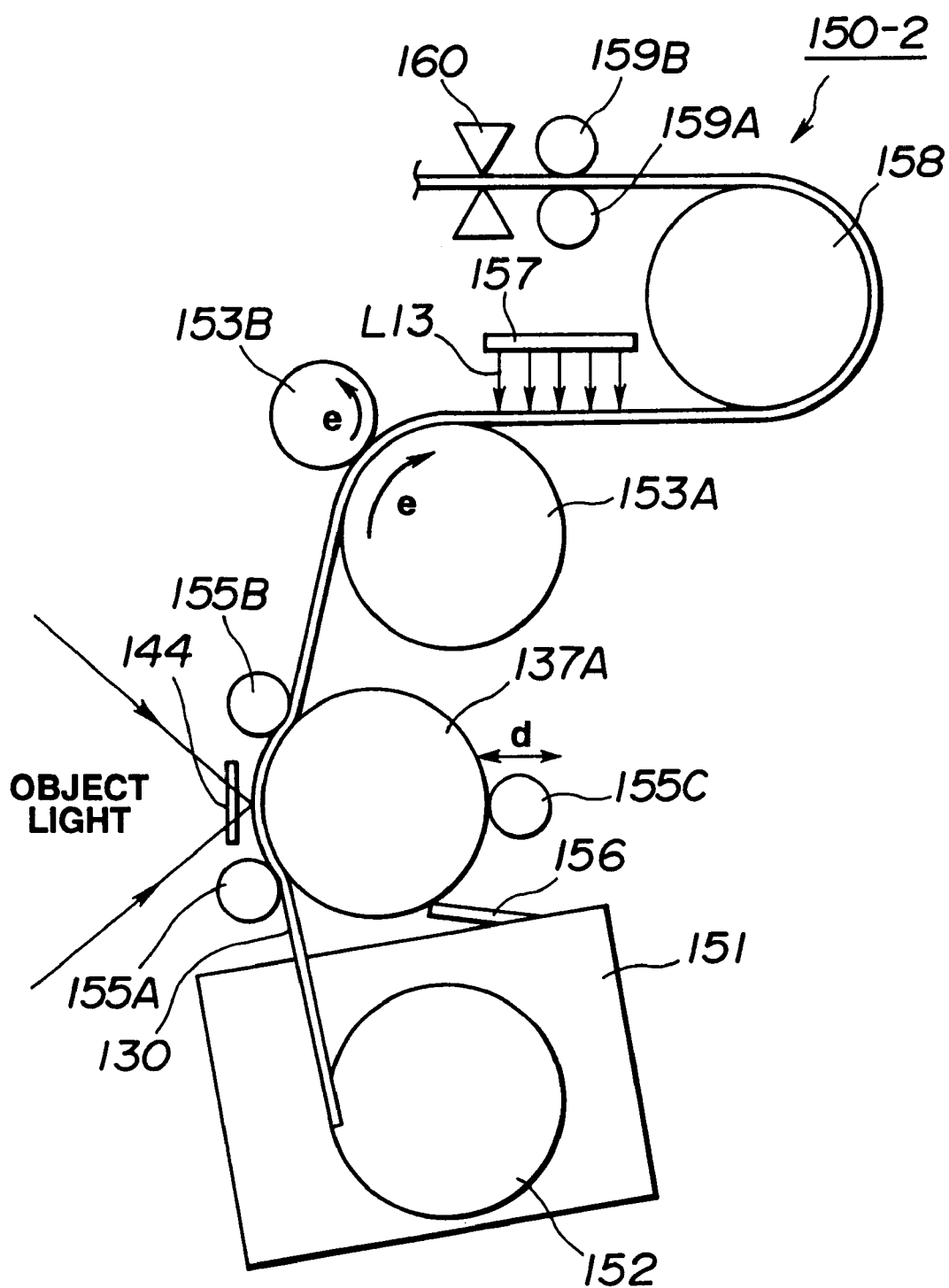
FIG. 23 is a schematic view showing another illustrative structure of the vicinity of a printer head of a holographic stereogram printer device of the type in which a recording medium for hologram is intimately contacted with a light inlet block.

If the recording medium for hologram 130 devoid of the cover sheet is used, it is unnecessary to peel the cover sheet off in order to take up the cover sheet on another roll. That is, the recording medium for hologram 130 having the photopolymer layer formed on the base film material may directly be routed to the light inlet block 137A without peeling the cover film from the recording medium for hologram 130. Meanwhile, the printer head 150-2 shown in FIG. 23 is similar to the printer head 150-1 shown in FIG. 22 except the slight difference in the structure of the film cartridge 151.

The light inlet block 137A light inlet block 137A is used for routing the reference light to the recording medium for hologram 130. The reference light is incident one ne end face of the light inlet block 137A. This light inlet block is supported by a first thrusting roll 155A and a second thrusting roll 155B arranged on the object light incident side and by a third thrusting roll 155C arranged on the reference light incident side. The first thrusting roll 115A and the second thrusting roll 115B are fixed while the third thrusting roll 155C is movable in the fore-and-aft direction as indicated by arrow d in FIG. 22. The recording medium for hologram 130 is passed through a space between the first thrusting roll 155A and the light inlet block 130 and into a space between the second thrusting roll 155B and the light inlet block 130. In this state, the third thrusting roll 155C is moved as indicated by arrow d in FIG. 22 and exerts a pressure against the light inlet block 137A in a direction of thrusting the light inlet block 137A against the first thrusting roll 155A and the second thrusting roll 155B. In this manner, the recording medium for hologram 130 and the light inlet block 137A are supported with the recording medium for hologram 130 being pressed against the light inlet block 137A.

That is, the recording medium for hologram 130 is led out of the film cartridge 151 so that the object light inlet side proves to be the base film material and the reference light inlet side, that is the side of the light inlet block 137A, proves to be the photopolymer layer. The recording medium for hologram 130 is kept in a state in which the photopolymer layer is contacted tightly with the light inlet block 137A so that there is left no gap between the photopolymer layer and the light inlet block 137A.

With the printer head 150-1, having the light inlet block 137A, the light inlet block 137A is a rigid member, and is positioned by a bearing, not shown, micro-sized vibrations of the light-exposed portions of the recording medium for hologram 130 can be suppressed extremely efficiently. This produces a holographic stereogram of increased brightness, that is of high diffraction efficiency.

The printer head 150-1 is provided with a cleaning member 156 in a portion of the light inlet block 137A not in contact with the recording medium for hologram 130. The function of this cleaning member 156 is to remove dust and dirt affixed to the lateral side of the rotating light inlet block 137A. To this end, the cleaning member 156 is formed by s plate member of, for example, urethane rubber, or s soft cloth, and is supported in contact with the lateral side of the light inlet block 137A.

When the recording medium for hologram 130 is peeled off from the light inlet block 137A, as when the dust and dirt in air has become affixed to the light inlet block 137A or recording of the hologram elements has come to a close, part of the recording medium for hologram 130 is occasionally left on the light inlet block 137A. The cleaning member 156 removes part of the recording medium for hologram 130 left on the light inlet block 137A or dust and dirt in air out of the light inlet block 137A. Thus, the light inlet block 137A is completely cleaned before coming into contact with the recording medium for hologram 130. That is, with the present printer head 150-1, the light inlet block 137A and the recording medium for hologram 130 are brought into tight contact with each other after cleaning of the light inlet block 137A.

The cleaning member 156 is built into the film cartridge 151 so that, when the film cartridge 151 is built into the printer head 150-1, the cleaning member 156 is contacted with the lateral side of the light inlet block 137A. Thus, when exchanging the film cartridge 151 having enclosed therein the recording medium for hologram 130, the cleaning member 156 can be exchanged simultaneously to facilitate maintenance.

The first and second intermittent feed rolls 153A, 153B are configured for being rotated in a direction shown by arrow e under the force of rotation outputted by a stepping motor, not shown. This stepping motor sequentially rotates the intermittent feed rolls 153A, 153B a pre-set angle, under control by a control signal S12 furnished from the control computer 102 each time light exposure for one image comes to a close. Thus the recording medium for hologram 130 is fed by one hologram element each time light exposure for one image comes to a close.

Downstream of the intermittent feed rolls 153A, 153B in the travel passage of the recording medium for hologram 130 is arranged a UV lamp 157 for extending along the travel passage whereby a UV light beam L13 of a pre-set power for terminating the diffusion of the monomer M is illuminated on the light-exposed portion of the recording medium for hologram 130 forwarded by the intermittent feed rolls 153A, 153B.

Downstream of the UV lamp 157 in the travel passage of the recording medium for hologram 130 are arranged a rotatably fulcrumed heat roll 158, a pair of feed-out rolls 159A, 159B and a cutter 160, in this order. The feed-out rolls 159A, 159B are arranged for holding the recording medium for hologram 130 in a state of being tightly placed 180° around the outer periphery of the heat roll 158.

The heat roll 158 is provided with internal heating means, not shown, for maintaining the peripheral surface of the roll at approximately 120° C. This setting is based on an experiment by which it has been found that, by having as-exposed photopolymerizable photopolymer (OMNI-DEX) sandwiched between a heating plate temperature-controlled for maintaining a constant temperature of 120° and a glass plate pressed from above by a spring pressure and by heating the resulting assembly for five minutes, the refractive index modulation of the same order of magnitude as that obtained in case the assembly is atmosphere-heated at 120° C. for two hours can be achieved.

The outer diameter of the heat roll 158 is selected so that the time since the recording medium for hologram 130 starts to be abutted against the outer peripheral surface of the heat roll 158 until it is detached therefrom is substantially equal to the time required for the recorded image to become fixed for thereby assuring positive fixation of the image recorded on the recording medium for hologram 130 passed through the heat roll 158.

The driving mechanism for the feed-out rolls 49A, 49B, referred to hereinafter as a feed-out roll driving mechanism, is configured for rotating the feed-out rolls 153A, 153B in synchronism with the intermittent feed rolls 153A, 153B based on the control signal S12 outputted by the control computer 102 during intermittent feed of the recording medium for hologram 130. This enables the recording medium for hologram 130 to be kept tightly contacted with the peripheral surface of the heat roll without becoming slacked between the intermittent feed rolls 153A and 153B and the feed-out rolls 159A, 159B.

A driving mechanism for the cutter 160 (cutter driving mechanism), not shown, drives the cutter 160, after a desired image is recorded on the hologram recording medium 130 based on the control signal S12 supplied from the control computer 102 and entire areas of the hologram recording medium 130 having the image recorded therein are subsequently discharged to outside, for severing the discharged portion from the remaining portion of the hologram recording medium 130. This enables the image-bearing portion of the hologram recording medium 130 to be discharged to outside as a sole holographic stereogram.

For explaining the image recording method embodying the present invention, the operation of the holographic stereogram printer device 103 inclusive of the printer head 150-1 is explained in detail.

For producing a holographic stereogram, using the above-described holographic stereogram printer device 13, the hologram recording medium 130 is coiled around the roll 152 and the resulting assembly is housed within the film cartridge 151.

The cover film 130a is peeled off from the hologram recording medium 130. The cover film 130a, thus peeled off, is taken up on the roll 154. The portion of the hologram recording medium 130, from which the cover film 130a has been peeled off, that is which has the photopolymer layer formed on a base film thereof, is loaded up to the intermittent feed rolls 155A, 155B in a state in which the recording medium 130 is thrust by the first and second rolls 155A, 155B in a gap-free manner against the light inlet block 137A.

The control computer 102 then sends the image data D15 corresponding to the respective images of the parallax image string for driving the LCD 141 for displaying an image corresponding to the image data D15. The control computer 102 also sends out the control signal S11 to the shutter 132 for opening it in order to cause the laser light L11 emitted by the laser light source 131 to fall on the recording medium for hologram 130 via LCD 141. The laser light beam L11, outgoing from the laser light source 131, is passed through the shutter 132, half mirror 133, mirror 138, spatial filter 139 and the collimator lens 140, as explained previously, to fall on the recording medium for hologram 130 as object light (projecting light). One-half of the laser light beam L11 radiated from the laser light source 131 to fall on the half-mirror 133 via shutter 132 is reflected by the half mirror 133 to fall as reference light beam on the back side of the recording medium for hologram 130 via cylindrical lens 134, collimator lens 135 and mirror 136.

By having the object light beam interfere with the reference light beam on the recording medium for hologram 130 so as to be used for light exposure, an image displayed on the LCD 141 is recorded in a strip-shape as interference fringes on the recording medium for hologram 130.

When the recording of this image comes to a close, the shutter 132 is closed under control by the control computer 102 to interrupt the laser light beam L11 radiated from the laser light source 131 to stop the driving of the LCD 141. By sending out the control signal S12 from the control computer 102 to the stepping motor of the printer head 150-1 and to the feed-out roll driving mechanism for driving these two components, the recording medium for hologram 130 is fed by one hologram element.

The recording medium for hologram 130 is fed without displacing the light inlet block 137A from the recording medium for hologram 130, with the recording medium for hologram 130 being kept in tight contact with the light inlet block 137A. The light inlet block 137A, while not having its own driving mechanism, can be rotated freely. Thus, if the recording medium for hologram 130 is fed without being displaced away from the light inlet block 137A, the latter is also rotated with movement of the recording medium for hologram 130. That is, with the present printer head 150-1, the light inlet block 137A can be rotated while the recording medium for hologram 130 and the light inlet block 137A are kept in contact with each other.

By repeating the operations of displaying an image corresponding to the image data D15 on the LCD 141, opening the shutter 132 for having the object light beam interfere with the reference light beam on the recording medium for hologram 130 for light exposure and feeding the recording medium for hologram 130 by the stepping motor and the feed-out roll driving mechanism a distance corresponding to one hologram element, the image data D15 corresponding to the respective images on the parallax image string supplied from the data processor 101 are sequentially recorded in a strip-like form on the recording medium for hologram 130.

Downstream of the portion of the printer head 150-1 where the recording medium for hologram 130 is exposed to the object light and the reference light, the entire surface of the intermittently fed recording medium for hologram 130 is illuminated by the UV light beam L13 from the UV lamp 157. This completes polymerization of the monomer M in the exposed portion of the photopolymer layer 19b of the recording medium for hologram 130.

Downstream of the UV lamp 157, the recording medium for hologram 130 is heated by the heat toll 48. This increases the refractive index modulation degree of the photopolymer layer for fixing the recorded image. Downstream of the heat roll 158, the cutter driving mechanism is driven based on the control signal S12 supplied from the control computer 102 so that the completed holographic stereogram is cut to a desired size by the cutter 160 so as to be discharged to outside.

For recording a desired image on the recording medium for hologram 130, the recording medium for hologram 130 is contacted with the light inlet block 137A at the same time as the air is expelled continuously by the thrusting rolls 155A, 155B for eliminating voids between the recording medium for hologram 130 and the light inlet block 137A, for enabling the reference light beam to fall at an acute angle without interposition of, for example, an index matching liquid. Meanwhile, the light inlet block 137A is a rigid member and has its relative position rigidly fixed with respect to, for example, a casing. Thus, the vibrations of the recording medium for hologram 130, held in tight contact with the light inlet block 137A, can be suppressed sufficiently.

Meanwhile, it depends on characteristics of the recording medium for hologram 130, in particular its hardness or thickness, whether or not the recording medium for hologram 130 can be tightly contacted with the light inlet block 137A without voids. However, since the photopolymer, as a material for the recording medium for hologram 130, usually exhibits moderate pliability, the recording medium for hologram 130 can be brought easily into tight contact with the light inlet block 137A without voids. If 'OMNI-DEX' manufactured by DU PONT Inc. is used as a material for a photopolymer layer for the recording medium for hologram 130 and its film thickness is set to approximately 20 $\mu$m, the recording medium for hologram 130 could be bonded tightly with the light inlet block 137A without voids.

2-3 Second Embodiment

The image recording device of the present embodiment performs edge-lit recording via an index matching liquid and is configured so that a light inlet block is contacted via liquid with the reference light incident side of the recording medium for hologram 130. The image recording method of the present embodiment fabricates a holographic stereogram using the above image recording device.

Meanwhile, in performing edge-lit recording via an index matching liquid, the structure of the holographic stereogram printer system is as explained with reference to FIG. 18, while the structure of the holographic stereogram printer device is as explained with reference to FIGS. 19A and 19B except for the partially modified light inlet block.

For illustrating an image recording device of the instant embodiment, the structure of the vicinity of the printer head 150 of the holographic stereogram printer device 103 is explained in detail. In the instant embodiment, the printer head 150 is constructed as a printer head 150-3 shown in FIG. 24.

The printer head 150-3 is designed to load the recording medium for hologram 130 in the same manner as the printer head 150-2 shown in FIG. 23. The parts or components similar to those of the printer head 150-1 or 150-2 are denoted by common numerals and are not described for avoiding redundancy.

With the printer head 150-3, the one-dimensional diffusion plate 144 is arranged at a position spaced away from the recording medium for hologram 130. Also, with the printer head 150-3, a light inlet block 137B, formed of transparent glass, is arranged in register with the reference light incident position in contact with the recording medium for hologram 130. In carrying out recording by the edge-lit system, the reference light beam is caused to fall at an edge portion of the light inlet block 137B so as to fall at an acute angle on the surface of the recording medium for hologram 130. For the light inlet block 137B, glass BK7 having the refractive index of 1.51 was used.

Thus, on the recording medium for hologram 130, interference fringes are formed by the object light incident at a right angle on the surface of the recording medium for hologram 130 and the reference light incident thereon at an acute angle.

Since the light inlet block 137B is arranged in contact with the recording medium for hologram 130, micro-sized vibrations of the recording medium for hologram 130 between the film cartridge and the intermittent feed rolls 153A, 153B can be suppressed for producing a holographic stereogram of higher brightness, that is of higher diffraction efficiency.

In the present embodiment, a sponge 161 impregnated with a liquid is arranged as liquid supplying means upstream of the light inlet block 137B so as to be in contact with both the light inlet block 137B and with the recording medium for hologram 130. The sponge 51 is narrower in width than the recording medium for hologram 130 for preventing the liquid from flowing round the back side of the recording medium for hologram 130.

The liquid used for impregnating the sponge 51 is o-xylene having the refractive index enabling index matching between the recording medium for hologram 130 and the light inlet block 137B. The conditions for the liquid interposed between the light inlet block 137B and the recording medium for hologram 130 are the same as those explained in connection with the first embodiment of the image recording method and device.

By arranging the sponge 161, it becomes possible to supply the liquid to a spacing between the recording medium for hologram 130 and the light inlet block 137B at all times in order to have the liquid interposed therein. Since this enables the light inlet block 137B and the recording medium for hologram 130 to be contacted intimately with each other without voids, vibrations of the recording medium for hologram 130 can be suppressed sufficiently.

Moreover, since the liquid supplied to the space between the recording medium for hologram 130 and the light inlet block 137B performs index matching, the reference light transmitted through the light inlet block 137B so as to fall on the recording medium for hologram 130 is not reflected by total reflection within the light inlet block 137B. The result is the holographic stereogram of superior image quality.

Moreover, if the liquid is interposed between the recording medium for hologram 130 and the light inlet block 137B, the recording medium for hologram 130 can be fed intermittently without the necessity of moving the light inlet block 137B in an opposite direction. This renders it possible to omit a driving mechanism for moving the light inlet block 137B towards and away from the recording medium for hologram 130 to simplify the structure of the image recording device.

For having the liquid interposed between the recording medium for hologram 130 and the light inlet block 137B, it is also possible to arrange the recording medium for hologram 130 and the light inlet block 137B in a liquid. However, in the instant embodiment, since the recording medium for hologram 130 and the light inlet block 137B are both arranged in air and the liquid is held by surface tension, it becomes possible to simplify the image recording device in structure, while facilitating the maintenance.

In the printer head 150-3, since the structure downstream of the intermittent feed rolls 153A, 153B is similar to that of the printer head 150-1 shown in FIG. 22 and the printer head 150-2 shown in FIG. 23, the corresponding description is omitted for avoiding redundancy.

For illustrating the picture recording method according to the present embodiment, the operation of the holographic stereogram printer device having the above-mentioned printer head 150-3 is explained in detail.

For producing a holographic stereogram, using the above-described holographic stereogram printer device 103, the hologram recording medium 130 is coiled around the roll 152 and the resulting assembly is housed within the film cartridge 151. The hologram recording medium 130 is then loaded between the film cartridge 151 and the intermittent feed rolls 153A, 153B and the light inlet block 137B is set in contact with the recording medium for hologram 130. The sponge 161 as liquid supplying means is sufficiently impregnated with a liquid.

Before actually recording the image on the recording medium for hologram 130, the control signal S12 is issued from the control computer 102 to the stepping motor of the printer head 150-3 and to the feed-out roll mechanism for driving the stepping motor and the feed-out roll mechanism for feeding the recording medium for hologram 130 a distance for establishing the contact between the recording medium for hologram 130 and the light inlet block 137B.

Since the liquid is supplied from the sponge 161 to the recording medium for hologram 130 at a position at which the recording medium for hologram 130 starts to be contacted with the light inlet block 137B and the light inlet block 137B is contacted with the recording medium for hologram 130 already holding the liquid, the liquid can be interposed between the recording medium for hologram 130 and the light inlet block 137B.

The control computer 102 then sends the image data D15 corresponding to the respective images of the parallax image a string for driving the LCD 141 for displaying an image corresponding to the image data D15.

The control computer 102 also sends out the control signal S12 to the shutter 132 for opening it in order to cause the laser light L11 emitted by the laser light source 131 to fall on the recording medium for hologram 130 via LCD 141. The laser light beam L11, outgoing from the laser light source 131, is passed through the shutter 132, half mirror 133, mirror 138, spatial filter 139 and the collimator lens 140, as explained previously, to fall on the recording medium for hologram 130 as object light (projecting light). One-half of the laser light beam L11 radiated from the laser light source 131 to fall on the half-mirror 13 via shutter 132 is reflected to fall as reference light beam on the back side of the recording medium for hologram 130 via cylindrical lens 134, collimator lens 135 and mirror 136.

By having the object light beam interfere with the reference light beam on the recording medium for hologram 130 so as to be used for light exposure, an image displayed on the LCD 141 is recorded in a strip-shape as interference fringes on the recording medium for hologram 130.

When the recording of this image comes to a close, the shutter 132 is closed under control by the control computer 102 to interrupt the laser light beam L11 radiated from the laser light source 131 to stop the driving of the LCD 141.

By sending out the control signal S12 from the control computer 102 to the stepping motor of the printer head 150-3 and to the feed-out roll driving mechanism for driving the two components, the recording medium for hologram 130 is fed by one hologram element. For intermittent feeding of the recording medium for hologram 130, there is no necessity of spacing the optical component 137B away from the recording medium for hologram 130.

By repeating the operations of displaying an image corresponding to the image data D15 on the LCD 141, opening the shutter 132 for having the object light beam interfere with the reference light beam on the recording medium for hologram 130 for light exposure and feeding the recording medium for hologram 130 by the stepping motor and the feed-out roll driving mechanism by one hologram element, the image data D15 corresponding to the respective images on the parallax image string supplied from the data processor 11 are sequentially recorded in a strip-like form on the recording medium for hologram 130.

Downstream of the portion of the printer head 150-3 where the recording medium for hologram 130 is exposed to the object light and the reference light, the entire surface of the intermittently fed recording medium for hologram 130 is illuminated by the light beam L13 from the UV lamp 157. This completes polymerization of the monomer M in the exposed portion of the photopolymer layer of the recording medium for hologram 130.

Downstream of the UV lamp 157, the recording medium for hologram 130 is heated by the heat toll 158. This increases the refractive index modulation degree of the photopolymer layer for fixing the recorded image.

Downstream of the heat roll 48, the cutter driving mechanism is driven based on the control signal S12 supplied from the control computer 102 so that the completed holographic stereogram is cut to a desired size by the cutter 50 so as to be discharged to outside.

By continuously supplying the liquid to a space between the recording medium for hologram 130 and the light inlet block 137B for having the liquid interposed therebetween at all times, for recording a desired image on the recording medium for hologram 130, the light inlet block 137B and the recording medium for hologram 130 can be tightly contacted with each other without producing an intervening space thus sufficiently suppressing vibrations of the recording medium for hologram 19.

Also, since the liquid supplied to the space between the recording medium for hologram 130 and the light inlet block 137B performs index matching, the reference light beam transmitted through the light inlet block 137B to fall on the recording medium for hologram 130 is not reflected by total reflection within the light inlet block 137B thus producing a holographic stereogram of superior image quality.

By having the liquid interposed between the recording medium for hologram 130 and the light inlet block 137B, as described above, the recording medium for hologram 130 can be intermittently fed without the necessity of moving the light inlet block 137B in the opposite direction.

Moreover, since the recording medium for hologram 130 and the light inlet block 137B are both arranged in air and the liquid is held by surface tension, it becomes possible to simplify the image recording device in structure, while facilitating the maintenance.

For carrying out reproduction by the edge-lit system, an illuminating light inlet block having optical properties similar to those of the light inlet block 137B is contacted with the holographic stereogram and an illuminating light beam is caused to fall on the illuminating light inlet block at the same angle as the angle of incidence of the reference light beam to the surface of the recording medium for hologram 130, the illuminating light beam is diffracted by the interference fringes formed on the recording medium for hologram 130 to produce a diffracted light beam similar to that produced by the object light beam thus producing a reproduced image.

Thus, for fabricating the transmission type holographic stereogram by the edge-lit system, it is necessary to have the reference light beam fall on the recording medium for hologram via a reference light inlet block from the object light incident side. To this end, the reference light inlet block is arranged between the cylindrical lens configured for converging the object light and the recording medium for hologram. However, because of spatial limitations, it is extremely difficult to arrange the reference light inlet block between the cylindrical lens and the recording medium for hologram. Moreover, the one-dimensional diffusion plate cannot be inserted in position with ease.

Figure 24:
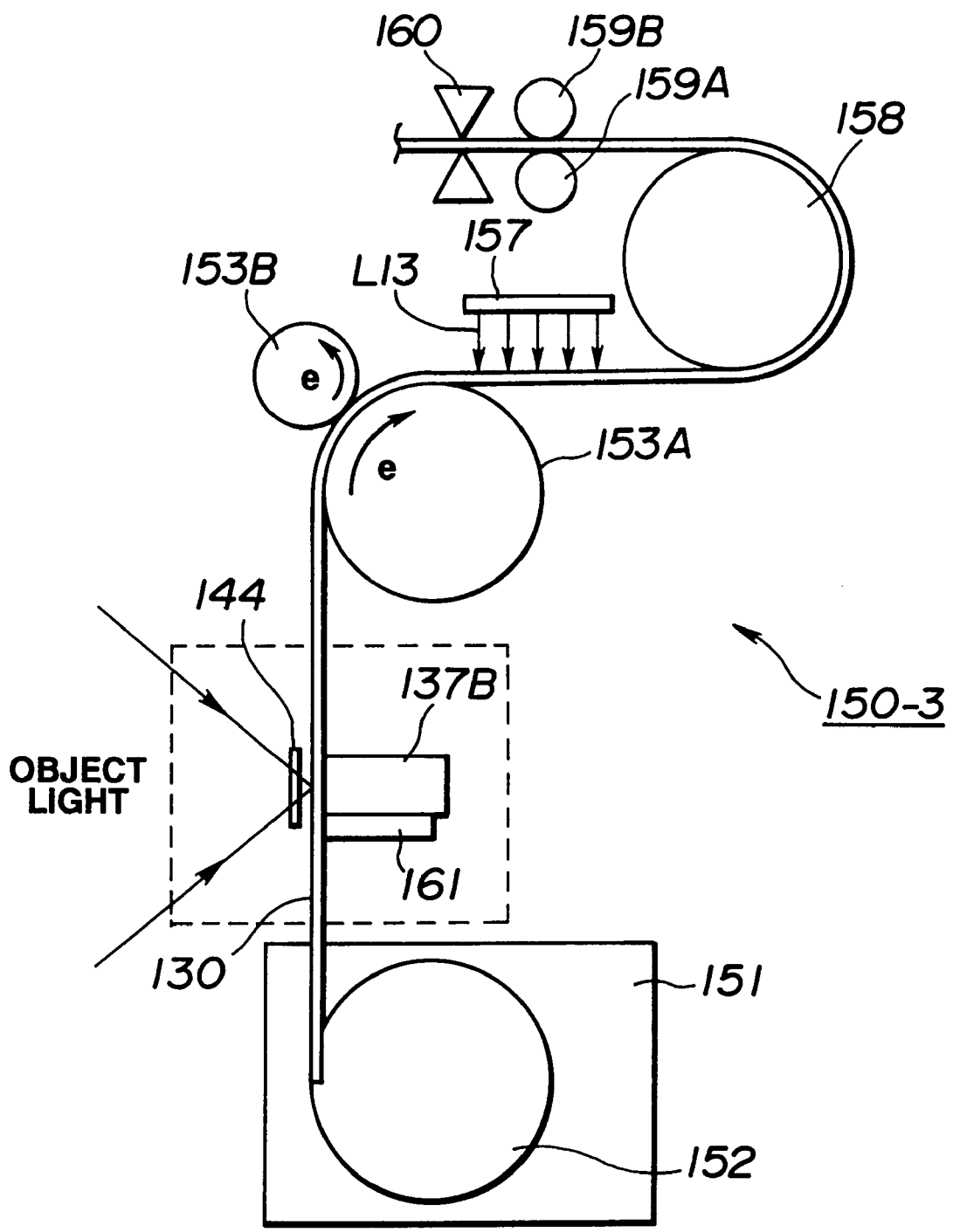
FIG. 24 is a schematic view showing an illustrative structure of the vicinity of a printer head of a holographic stereogram printer device of the type in which a liquid is interposed between the recording medium for hologram and the light inlet block.

Conversely, with the holographic stereogram printer device 103 having the printer head 150-3 as shown in FIG. 24, the holographic stereogram of the edge-lit system is fabricated with the reflection type, so that it suffices if the object light and the reference light are caused to fall on one and the opposite surfaces of the recording medium for hologram 130, respectively. Thus, with the present embodiment, it suffices if the cylindrical lens 143 for converging the object light and the one-dimensional diffusion plate 144 are arranged on one surface of the recording medium for hologram 130 and the reference light inlet block 137B is arranged on the opposite surface thereof to enable the optical system to be constructed easily without spatial limitations.

As a matter of fact, it is possible with the holographic stereogram, fabricated as the reflection type, to reproduce a three-dimensional image as the reflection type. That is, a holographic stereogram 172 is bonded via a liquid 170 on an illuminating light inlet block 171 and a reproducing illuminating light beam 173 is caused to fall from an end 171a of the illuminating light inlet block 171 towards the holographic stereogram 172. The holographic stereogram 172 is bonded to a surface 171b of the illuminating light inlet block 171 remote from a viewer 174.

In this case, a reproduced image 176 generated by a diffracted light beam 175 diffracted from the holographic stereogram 172 by the reflection mode is observed by the viewer 174. Thus, when a three-dimensional image is reproduced, a reproduced image 176 appears as if the object were behind the illuminating light inlet block 171 as viewed by the viewer 174.

It is also possible for the holographic stereogram fabricated as the reflection type as described above, to reproduce a three-dimensional image as a transmission type.

That is, with a holographic stereogram 182 bonded via a liquid 180 to an illuminating light inlet block 181, a reproducing illuminating light beam 183 is caused to fall at an end 181a of the illuminating light inlet block 181 towards the holographic stereogram 182. It is noted that the holographic stereogram 182 is bonded to a surface 181c of the reproducing light inlet block 181 closer to a viewer 184.

Figure 25:
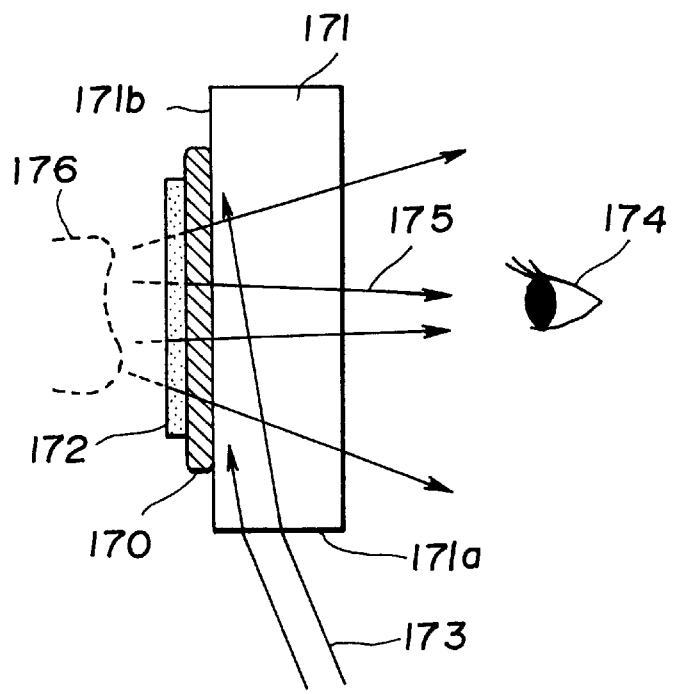
FIG. 25 is a schematic view showing a reproducing method of a holographic stereogram by a reflection type.
Figure 26:
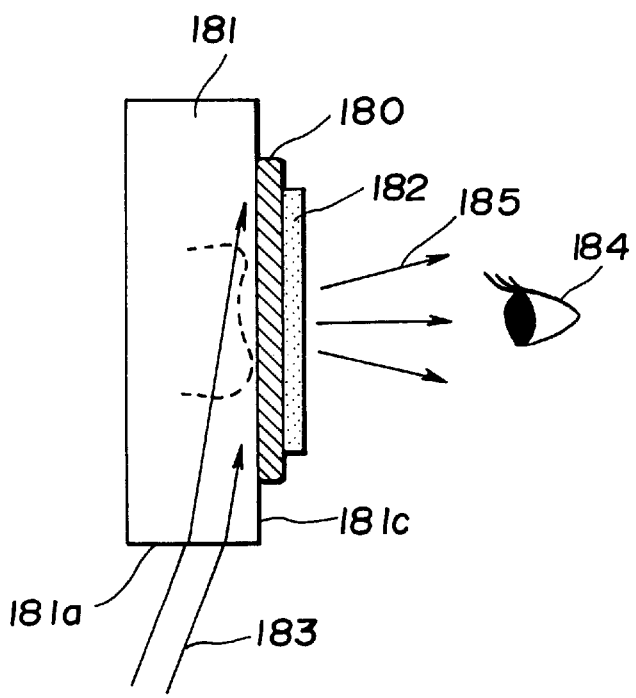
FIG. 26 is a schematic view showing a reproducing method of a holographic stereogram by a transmission type.

At this time, a reproduced image 186 generated by a diffracted light beam 185 diffracted from the holographic stereogram 182 with the transmission mode is viewed by the viewer 184. Thus, if a three-dimensional image is reproduced, a reproduced image 186 appears as if it were located closer to the viewer than with the reproducing method shown in FIG. 25. Thus, by reproducing the three-dimensional image shown in FIG. 26, the stereoscopic feeling can be emphasized for improving the display effect.

Meanwhile, the shape of the illuminating light inlet blocks 171, 181 need not be parallelepipedic and may be optionally selected on the condition that the angle of incidence of the illuminating reproducing light beams 173, 183 with respect to the holographic stereograms 172, 182 is coincident with that of the reference light beam incident on the recording medium for hologram 130 during recording.

In the present embodiment, the wavelength of the laser light used for fabricating the holographic stereogram is approximately 532 nm, while the angle $\theta$ the reference light makes with the object light is approximately 75°. The film thickness of a photosensitive portion of the recording medium for hologram 130 is approximately 20 $\mu$m, with its refractive index being approximately 1.5. Therefore, the allowance of selection of the wavelength of the holographic stereogram is approximately 50 nm. Thus, for reproducing the holographic stereogram, an LED emitting a light beam having a center wavelength of approximately 525 nm and the wavelength width of approximately 50 nm is desirable as the light source of the reproducing illuminating light beams 173, 183. Thus it becomes possible to obtain the driving power of the image reproducing device from, for example, a battery, thereby enabling the size and the cost of the device to be lowered.

For reproducing a holographic stereogram as the reflection type, a reproduced image can be usually obtained, even if the white light is used as the reproducing illumination, due to higher wavelength selectivity. Conversely, for regenerating a holographic stereogram as the transmission type, it becomes difficult to reproduce the holographic stereogram with the white light because the wavelength selectivity becomes weaker than if the holographic stereogram is reproduced as the reflection type. Therefore, if a holographic stereogram is reproduced as the transmission type, a light source with a higher color purity is preferably used as a reproducing light source. Specifically, if a LED emitting the light of high color purity is used as a reproducing light source, it becomes possible to compensate for weak wavelength selectivity in order to obtain a clear reproduced image. The LED also has merits that it is closer in nature to a point light source, and hence is effective to prevent the reproduced image from becoming blurred due to spreading of the light source, and that it scarcely generates heat.

However, the light source for the reproducing illuminating light is not limited to LEDs. If a light source capable of emitting the light of high color purity such as a semiconductor laser is used, a reproduced image can be produced in similar manner. The light raised in color purity by a wavelength selective filter or a narrow band reflection mirror may also be used as the reproducing illuminating light.

2-4 Modification

Although the second embodiment of the image recording method and apparatus according to the present invention has been described above, the present invention is not limited to these particular embodiments. For example, although sponge 161 is used as liquid supplying means, liquid supplying means may be of any suitable structure may be used if it can supply liquid to a space between the recording medium for hologram 130 and the light inlet block 137B. The liquid supplying means may be designed as a die coater or a coater employing a roll for applying a liquid to the recording medium for hologram 130.

In the above-described embodiments, the present invention is applied to fabrication of a holographic stereogram having the parallax information only in the transverse direction. The present invention is, however, not limited to these embodiments, but may also be applied to fabrication of a holographic stereogram having the parallax information only in the longitudinal direction or to a holographic stereogram having the parallax information in both the transverse direction and the longitudinal direction.

In addition, although the above embodiments are directed to fabrication of a monochromatic holographic stereogram, the present invention may similarly be applied to fabrication of a colored holographic stereogram. For producing the colored holographic stereogram, three light beams corresponding to the three prime colors of light may be used as the recording light. For reproducing a colored holographic stereogram recorded with use of three light beams corresponding to the three prime colors of light, three light sources are provided in an image reproducing device for emitting three prime colors of light so that light beams from the light sources will be illuminated simultaneously on the holographic stereogram as reproducing illuminating light beams. For reproducing the white holographic stereogram, light sources with high color purity are preferably used as the light sources because reproduction with the transmission type suffers from weak wavelength selectivity. This renders it possible to reproduce the colored holographic stereogram clearly even as the transmission type.

The structure of the light inlet block also is not limited to that shown in the previous embodiments. For example, the object light beam converged and incident on a recording medium for hologram is likely to be transmitted through the recording medium for hologram to be incident on a light inlet block, with the incident light being partially reflected on an opposite lateral surface of the light inlet block to return to the light inlet block. If this occurs, unneeded interference fringes tend to be formed in the light exposed portion to lower the contrast of the reproduced image. Also, if an unexposed portion of the recording medium for hologram is illuminated by light, the unexposed portion is likely to be sensitized before light exposure to render it impossible to effect regular recording. Thus it is possible to form the light inlet block as a cylinder in the hollow inner portion of which is arranged a light absorbing member. The light absorbing member is arranged at a position of not obstructing inlet of the reference light. This eliminates unneeded reflection in the interior of the light inlet block.

It is desirable that air, for example, be not present in a space between the light inlet block and the light absorbing member. Also, the refractive index is desirably close to that of the light absorbing member. Specifically, a black adhesive tape having an adhesive the refractive index of which is close to that of the light absorbing member may be used. Alternatively, clay or a black liquid may be enclosed in a hollow portion of the light inlet block.

The same holds if a square prismatic light inlet block is used in place of the cylindrical block. That is, a black adhesive tape, for example, may be arranged at a position around the light inlet block not obstructing introduction of the reference light beam for preventing unneeded reflection in the light inlet block for improving the image quality.

Figure 27:
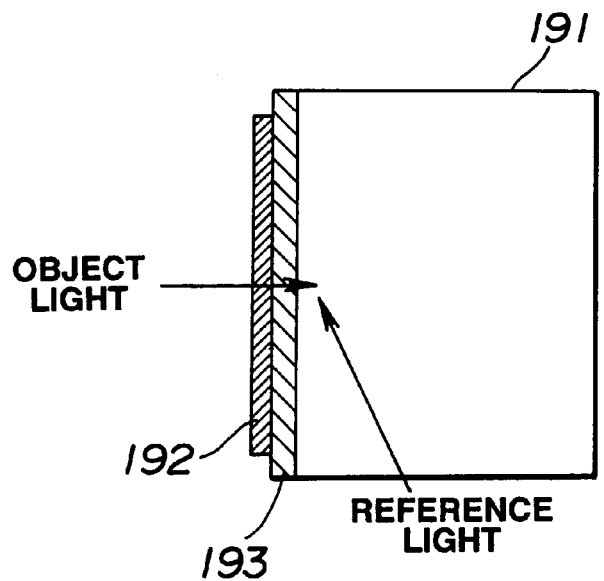
FIG. 27 is a cross-sectional view showing an instance in which a louver film is inserted between a light inlet block and a recording medium for hologram.
Figure 28:
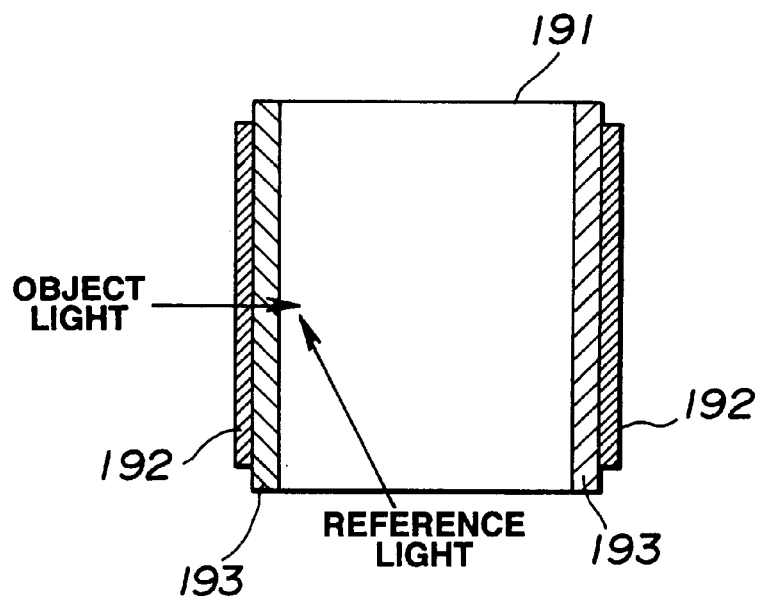
FIG. 28 is a cross-sectional view showing another instance in which a louver film is inserted between a light inlet block and a recording medium for hologram.

In an image recording device, a louver film 193 may be arranged between a light inlet block 191 and a recording medium for hologram 192, as shown in FIGS. 27 or 28. FIG. 27 shows an instance of a prismatic light inlet block 191, while FIG. 28 shows an instance of a cylindrical or columnar light inlet block 191.

The louver film 193 is made up of a large number of louvers, at a pre-set interval from each other, as physical blinds, having an angle of the order of the reference light incident angle relative to its surface, and has characteristics of not passing the light entering the surface at a right angle.

If such louver film 193 is arranged optically between the light inlet block 191 and the recording medium for hologram 192, without interposition of air or the like, the light radiated through the light inlet block 191 at an acute angle to the recording medium for hologram 192 is transmitted through the louver film 193 to reach the recording medium for hologram 192, while the object light incident at a right angle on the surface of the louver film 193 is absorbed by the louver film 193 after passing through the recording medium for hologram 192 and hence cannot reach the light inlet block 191. This eliminates unneeded reflection to improve the image quality.

In addition, the direction of incidence of the reference light or the number, type or combination of lenses in the holographic stereogram printer device is not limited to those of the previous embodiments and may comprise various modifications.

3. Image Reproducing Method and Device

Illustrative embodiments of the image reproducing method and apparatus according to the present invention will be hereinafter explained.

3-1 Holographic Stereogram Producing System

First, an illustrative structure of a system for producing a holographic stereogram in which an image is reproduced using an image reproducing method and an image reproducing device according to the present invention is explained. The present embodiment is directed to a holographic stereogram in which plural strip-shaped hologram elements are recorded on a recording medium for generating the parallax information in the transverse direction. However, the present invention is applicable to a holographic stereogram in which plural dot-shaped hologram elements are recorded on a sole recording medium for generating the parallax information in both the transverse and longitudinal directions.

Figure 29:
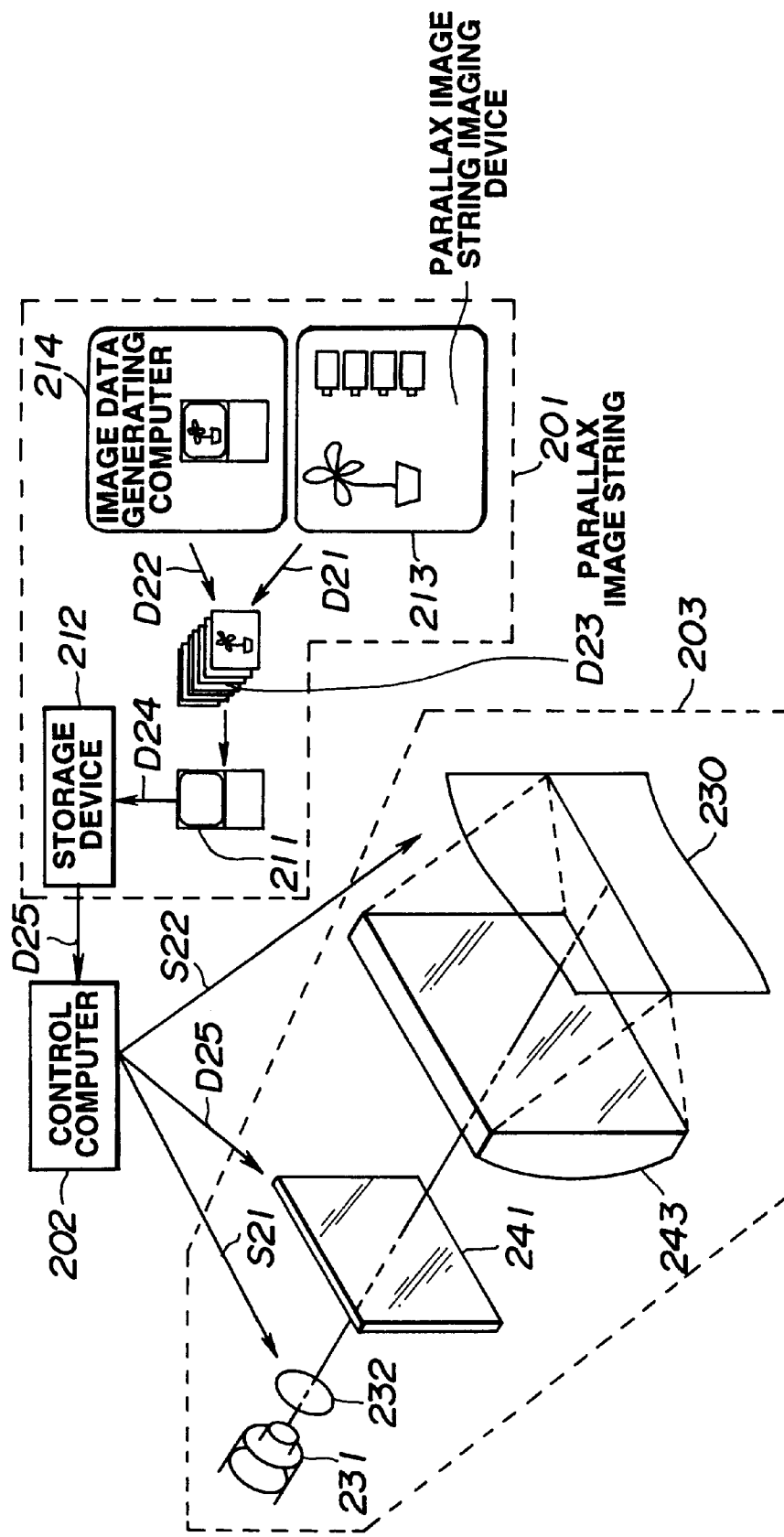
FIG. 29 is a schematic view showing an illustrative structure of a stereographic stereogram producing system.

The present holographic stereogram producing system is a system in which a recording medium for hologram, having recorded thereon interference fringes by the object light and the reference light to prove to be a holographic stereogram, or a so-called one-step holographic stereogram, is fabricated by an edge-lit system. The system includes a data processor 201 for processing image data to be recorded, a control computer 202 for controlling the entire system and a holographic stereogram printer device 203, as shown in FIG. 29.

The data processor 201 generates a parallax image string D23 based on plural image data D21 including the parallax information furnished by a parallax image string imaging device 213 having a multi-eye camera and a moving camera and plural image data D22 including the parallax information generated by an image data generating computer 214.

The plural image data D21, inclusive of the parallax information furnished by a parallax image string imaging device 213, are image data of plural images obtained on imaging an object from plural viewing points in the transverse direction by simultaneously imaging by a multi-eye camera or by continuous imaging by a moving camera.

The plural image data D22, inclusive of the parallax information generated by the image data generating computer 214, are image data, such as plural CAD (computer aided design) images or CG (computer graphics) images, produced on sequentially according the parallax in the transverse direction.

The data processor 201 performs pre-set image processing for holographic stereogram by an image processing computer on the parallax image string D23 and records the processed image data D24 on a storage device 212, such as a memory or a hard disc.

When recording an image on the recording medium for hologram, the data processor 201 sequentially reads out data on the image basis for sending the image data D25 to the control computer 202.

The control computer 202 drives the holographic stereogram printer device 203 for sequentially recording images corresponding to the image data D25 furnished from the data processor 201 on a recording medium for hologram 230 set in the holographic stereogram printer device 203 as strip-like hologram elements.

At this time, the control computer 202 controls a shutter 232, a display device 241 and a recording medium feed mechanism provided on the holographic stereogram printer device 203. That is, the control computer 202 sends out a control signal S21 to the shutter 232 for controlling the opening/closure of the shutter 232, while furnishing the image data D25 to the display device 241 for causing the display device 241 to display an image corresponding to the image data D25 and for sending out a control signal S22 to the recording medium feed mechanism for controlling the feed operation of the recording medium for hologram 230 by the recording medium feed mechanism.

Figure 30A:
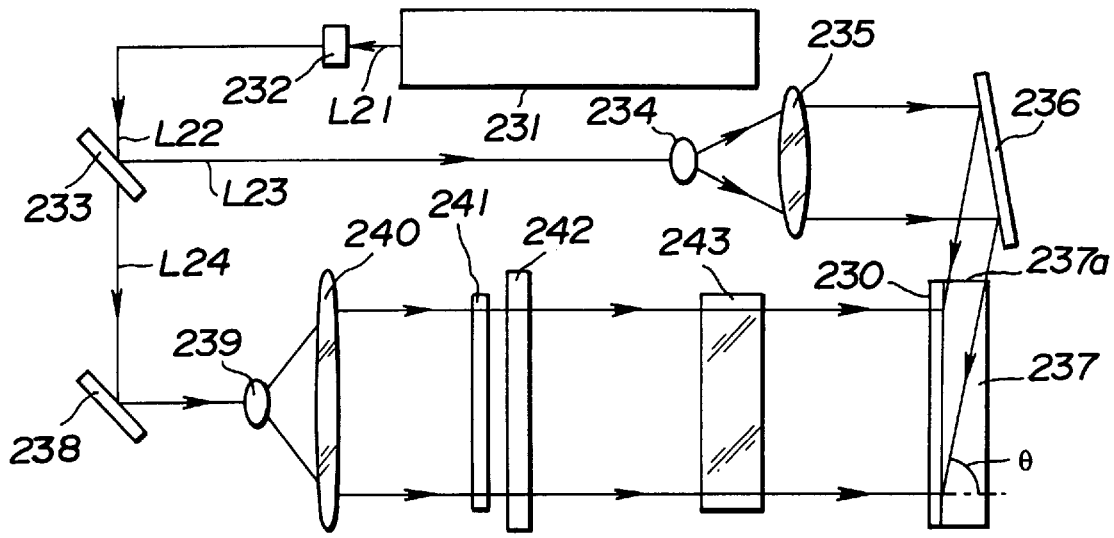
FIGS. 30A and 30B are schematic views showing an illustrative optical system of a holographic stereogram printer device.
Figure 30B:
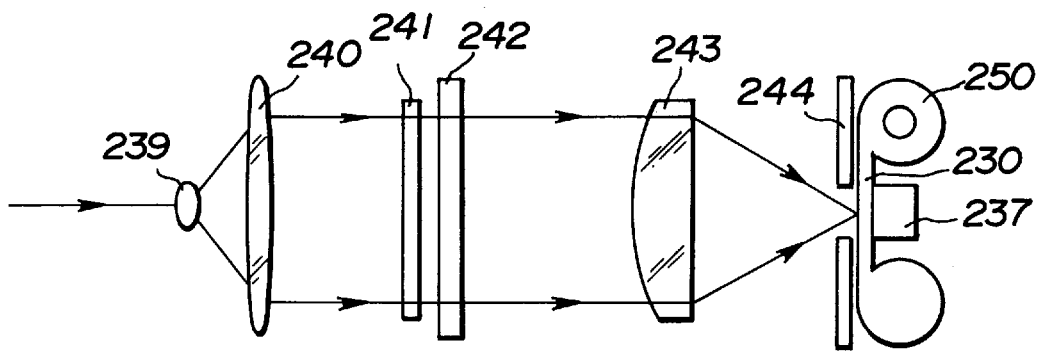

By referring to FIGS. 30A and 30B, the holographic stereogram printer device 203 will be explained in detail. FIG. 30A and FIG. 30B view the entire optical system of the holographic stereogram printer device 203 from above, and the portion of the optical system of the holographic stereogram printer device 203 associated with the object light, from a lateral side, respectively.

The holographic stereogram printer device 203 includes a laser light source 231 for radiating a laser light beam of a pre-set wavelength, and a shutter 232 and a half-mirror 233 arranged on the optical axis of the laser light beam L21 from the laser light source 231, as shown in FIG. 30A. In the instant embodiment, a laser light source emitting a laser light beam with a wavelength of approximately 532 nm is used as laser light source 231.

The shutter 232 is controlled by the control computer 202 and is closed or opened when the recording medium for hologram 230 is not exposed to light or is exposed to light, respectively. The half-mirror 233 has the function of separating the laser light beam L22 transmitted through the shutter 232 into a reference light beam and an object light beam, with the light beam L23 reflected by the half-mirror 233 and the laser light beam L24 transmitted through the half-mirror 233 proving to be the reference and object light beams, respectively.

On the optical axis of the light beam L23 reflected by the half-mirror 233 are arranged, as an optical system for the reference light, a cylindrical lens 234, a collimator lens 235 for collimating the reference light beam and a total reflection mirror 236 for reflecting the collimated light beam from the collimator lens 235.

The light reflected by the half-mirror 233 is first diffused by the cylindrical lens 234 and collimated by the collimator lens 235. The collimated light is then reflected by the total reflection mirror 236 so as to fall on the recording medium for hologram 230. The recording medium for hologram 230 is arranged in contact with a light inlet block 237 of transparent glass, via a matching liquid, for recording hologram elements by the edge-lit system. The reference light falls on the recording medium for hologram 230 from the side of the light inlet block 237.

That is, the reference light enters the inside of the light inlet block 237 from the end 237a of the light inlet block 237 so as to fall with a large angle of incidence on the recording medium for hologram 230 arranged for contacting the light inlet block 237 via matching liquid. In the present embodiment, the wavelength of the laser light used for fabricating the holographic stereogram is approximately 532 nm, while the angle θ the reference light makes with the object light is approximately 75°.

On the optical axis of the light beam L24 transmitted through the half-mirror 233 are arranged, as an optical system for the object light, a total reflection mirror 238 for reflecting the transmitted light from the half mirror 233, a spatial filter 239 combined from a convex lens and a pinhole, a collimator lens 240 for collimating the object light, a display device 241 for displaying an image of an object, a diffusion plate 242 for diffusing the light transmitted through the display device 241 and a cylindrical lens 243 for converging the object light on the recording medium for hologram 230, in this order, as shown in FIGS. 30A and 30B. In addition, a mask 244 having a strip-shaped opening is arranged directly ahead of the recording medium for hologram 230.

The light beam L24 transmitted through the half-mirror 233 is reflected by the total reflection mirror 238 and turned into a diffused light from a point light source by the spatial filter 239. The diffused light is then turned by the collimator lens 240 into collimated light which then falls on the display device 241. The display device 241 is a transmission type image display device formed by, for example, a liquid crystal display, and is configured for displaying an image corresponding to image data D25 sent from the control computer 220 under control by the control computer 202. The light transmitted through the display device 241 is modulated in accordance with the image displayed on the display device 241. The modulated light is diffused by the diffusion plate 242 to fall on the cylindrical lens 243. The diffusion plate 242 slightly diffuses the transmitted light from the display device 241 for contributing to improving the image quality of the produced holographic stereogram.

The light transmitted through the display device 241 is converged by the cylindrical lens 243 in the transverse direction. Of the converged light, the light transmitted through the strip-shaped opening of the mask 242 falls as object light on the recording medium for hologram 230. The object light falls on the recording medium for hologram 230 from the side thereof devoid of the light inlet block 237 so that its optical axis will be perpendicular to the surface of the recording medium for hologram 230.

In the above optical system, the light path length of the reference light reflected by the half-mirror 233 so as to fall via light inlet block 237 on the recording medium for hologram 230 is selected to be substantially equal to that of the object light transmitted through the half-mirror 233 to fall via display device 241 on the recording medium for hologram 230. This enhances interference characteristics between the reference light and the object light to enable the production of a holographic stereogram which gives a clearer reproduced image.

In the above-described holographic stereogram printer device 203, it is desirable to provide a mechanism for dripping an index matching liquid to a space between the light inlet block 237 and the recording medium for hologram 230 for index matching for the recording medium for hologram 230. Thus, in the present embodiment, a sponge impregnated with the index matching liquid is arranged in the vicinity of the contact portion between the light inlet block 237 and the recording medium for hologram 230. Thus, each time the recording medium for hologram 230 is fed, the index matching liquid is supplied from the sponge to the space between the light inlet block 237 and the recording medium for hologram 230 for index matching between the light inlet block 237 and the recording medium for hologram 230.

For fabricating the transmission type holographic stereogram, both the object light and the reference light are caused to fall on one surface of the recording medium for hologram 230. Thus, for fabricating the transmission type holographic stereogram by the edge-lit system, it is necessary for the reference light to fall via light inlet block on the recording medium for hologram 230 from the object light incident side. Thus the light inlet block is arranged in a space between the object light converging cylindrical lens and the recording medium for hologram. However, because of spatial limitations, it is extremely difficult to arrange the light inlet block between the cylindrical lens and the recording medium for hologram.

Conversely, with the holographic stereogram printer device 203 in which the holographic stereogram of the edge-lit system is fabricated as the reflection type, it suffices if the object light and the reference light are caused to fall on one and the opposite surface of the recording medium for hologram 230, respectively. Therefore, with the present embodiment, it suffices if the cylindrical lens 243 for converging the object light is arranged on one of the surfaces of the recording medium for hologram 230 and the light inlet block 237 is arranged on the opposite surface thereof to enable the optical system to be constructed easily without spatial constraints The holographic stereogram printer device 203 has a recording medium feed mechanism 250 for intermittently feeding the recording medium for hologram 230 by one hologram element responsive to a control signal from the control computer 202. This recording medium feed mechanism 250 is designed to feed the recording medium for hologram 230 intermittently under control by the control computer 202, as will be explained subsequently. For fabricating the holographic stereogram by the holographic stereogram printer device 203, images corresponding to image data of the parallax image string sequentially recorded, as strip-shaped hologram elements, on the recording medium for hologram 230 set under a pre-determined condition on the recording medium feed mechanism 250.

Referring to FIGS. 31 and 32A to 32C, the recording medium for hologram 230 used in the above-described holographic stereogram fabricating system is explained in detail.

Figure 31:
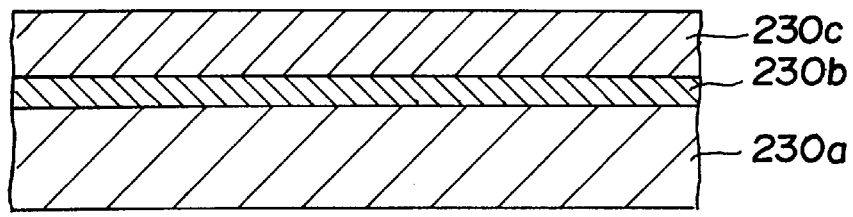
FIG. 31 is a cross-sectional view showing an illustrative recording medium for hologram.

The recording medium for hologram 230 is a so-called film coating type recording medium in which a photopolymer layer 230$b$ formed of a photopolymerizable photopolymer is formed on a tape-shaped film base material 230$a$ and a cover sheet 230$c$ is deposited on the photopolymer layer 230$b$, as shown in FIG. 31. In the present embodiment, a photopolymer layer of 'OMNI-DEX', manufactured by DU PONT Inc. is formed as a photopolymer layer 19$b$ as a photosensitive portion to a thickness of approximately 20 $\mu$m.

Figure 32A:
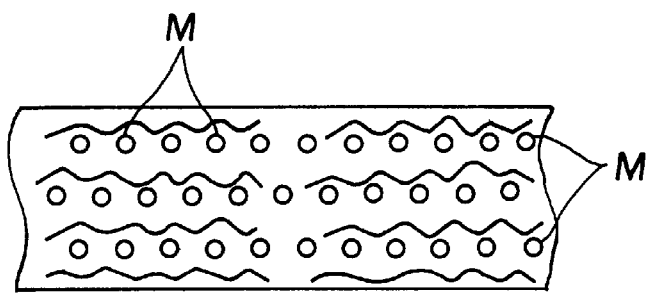
FIGS. 32A, 32B and 32C are schematic views showing a photosensitive process of a photopolymerization type photopolymer.
Figure 32B:
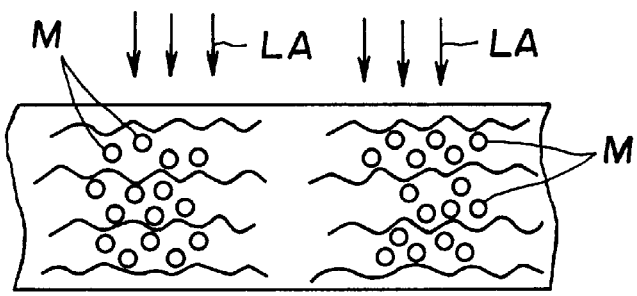
Figure 32C:
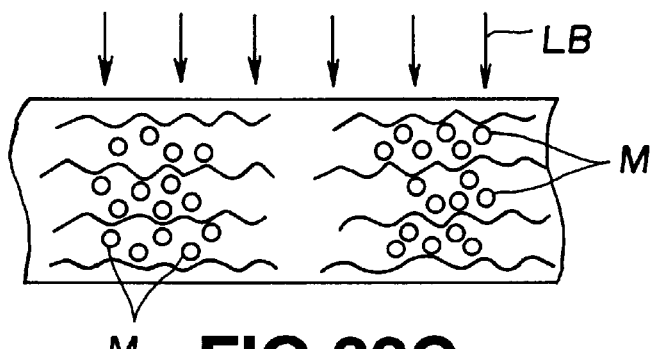

In the initial state of the photopolymerizable photopolymer, a monomer M is uniformly dispersed in a matrix polymer, as shown in FIG. 32A. If a light beam LA of the power of, for example, 10 to 400 mJ/cm$^2$, is illuminated, the monomer M is polymerized in a light-exposed portion. With progress in polymerization, the monomer M is migrated from ambient portions to cause local variation in the concentration in the monomer M to produce refractive index modulation. The polymerization of the monomer M then comes to a close by illuminating the UV light or the visible light LB with the power on the order of 1000 mJ/cm$^2$ as shown in FIG. 32C. Since the photopolymerizable photopolymer has its refractive index changed with the incident light beam, the interference fringes, brought about by interference between the reference light beam and the object light beam, can be recorded as changes in the refractive index.

The recording medium for hologram 230, employing the photopolymerizable photopolymer, need not be processed with particular development operations after light exposure. Thus the holographic stereogram printer device 203 employing the recording medium for hologram 230 having its photosensitive portion formed of a photopolymerizable photopolymer can be simplified in structure.

Figure 33:
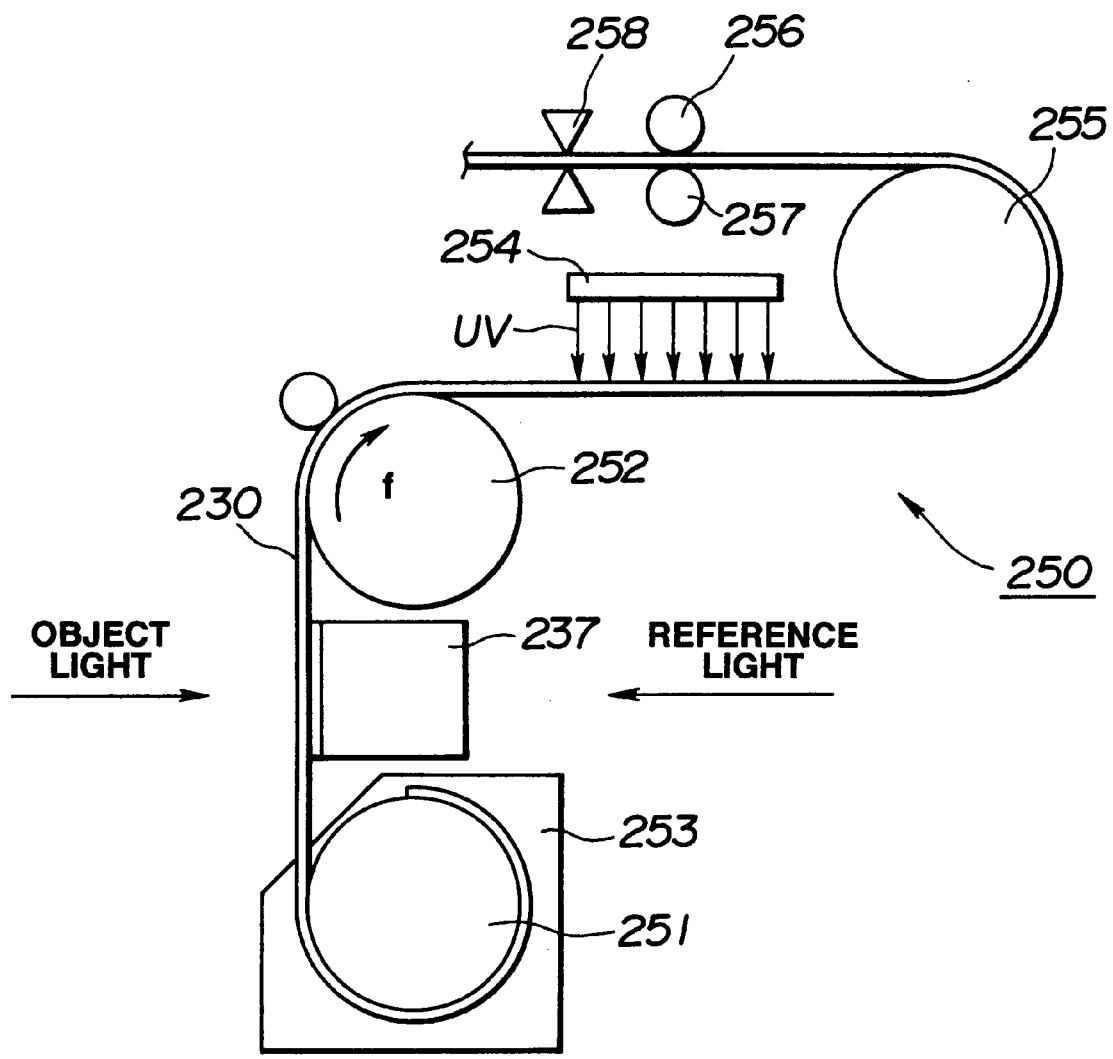
FIG. 33 is a schematic view showing an illustrative structure of an illustrative structure of a recording medium feed mechanism.

The recording medium feed mechanism 250 will be explained in detail by referring to FIG. 33. FIG. 33 is an enlarged view showing a portion of the recording medium feed mechanism 250 of the holographic stereogram printer device 203.

Referring to FIG. 33, the recording medium feed mechanism 250 has a roll 251 and an intermittent feed roll 252. The recording medium for hologram 230 is housed within the film cartridge 253 in the state of being coiled around the roll 251. The recording medium feed mechanism 250 rotatably fulcrums the roll 251 in the film cartridge 253 loaded in position with a re-set torque and holds the recording medium for hologram 230 pulled out of the film cartridge 253 by the roll 251 and the intermittent feed roll 252. The recording medium feed mechanism 250 holds the recording medium for hologram 230 so that the surface of the recording medium for hologram 230 will be substantially at right angles to the object light between the roll 251 and the intermittent feed roll 252. The roll 251 and the intermittent feed roll 252 are biased by a torsion spring in a direction away from each other for applying a pre-set tension on the recording medium for hologram 230 loaded for extending between the roll 251 and the intermittent feed roll 252.

The intermittent feed roll 252 of the recording medium feed mechanism 250 is connected to a stepping motor, not shown, and is adapted for being rotated in a direction indicated by arrow f in FIG. 33 under the force of rotation of the stepping motor. Based on the control signal S22 supplied form the control computer 202, the stepping motor sequentially rotates the intermittent feed roll 252 a pre-set angle corresponding to a hologram element each time the light exposure for one image is terminated. This causes the recording medium for hologram 230 to be fed one hologram element each time an image is exposed.

Downstream of the intermittent feed roll 252 in the travel path of the recording medium for hologram 230 is arranged a UV lamp 254 along the travel path. This UV lamp 254 has the function of competing the polymerization of the monomer M of the recording medium for hologram 230 exposed to light and is adapted for radiating UV light of a pre-set power on the recording medium for hologram 230 fed by the intermittent feed roll 252.

Downstream of the UV lamp 254 in the travel path of the recording medium for hologram 230 are sequentially arranged a rotatably fulcrumed heat roll 255, a pair of feed-out rolls 256, 257 and a cutter 258.

The feed-out rolls 256, 257 are adapted for feeding the recording medium for hologram 230 so that the cover sheet side of the recording medium for hologram 230 will be placed over 180° in tight contact with the periphery of the heat roll 255. Based on the control signal S22 supplied form the control computer 202, this stepping motor sequentially rotates the feed-out rolls 256, 257 in synchronism with the rotation of the intermittent feed roll 252 by a pre-set angle corresponding to one hologram element each time the light exposure for one image is terminated. This enables the recording medium for hologram 230 to be kept tightly contacted with the peripheral surface of the heat roll 255 without becoming slacked between the intermittent feed roll 252 and the feed-out rolls 256, 257.

The heat roll 255 has internal heating means, such as heaters, whereby the peripheral surface of the heat roll 255 is maintained at a temperature of the order of 120° C. This heat roll 255 heats the photopolymer layer 230b of the recording medium for hologram 230 fed thereto via cover sheet 230c for increasing the refractive index modulation factor of the photopolymer layer 230b for fixing the recording image on the recording medium for hologram 230. The outer diameter of the heat roll 255 is selected so that the time since the recording medium for hologram 230 starts to be contacted with the outer peripheral surface of the heat roll 255 until it is detached therefrom is substantially equal to the time required for fixing the recorded image.

The cutter 258 includes a cutter driving mechanism, not shown, and drives this cuter driving mechanism for severing the recording medium for hologram 230 fed thereto. Based on the control signal S22, supplied from the control computer 202, the cutter driving mechanism drives the cutter 258 when all image-bearing portions of the recording medium for hologram 230 are discharged outwardly from the cutter 258 after the images corresponding to the image data of the parallax image string have been recorded on the recording medium for hologram 230. This severs the image data bearing portions from the remaining portions so as to be discharged to outside as a sole holographic stereogram.

The operation for fabricating a holographic stereogram by the above-described holographic stereogram producing system is hereinafter explained.

For fabricating a holographic stereogram, the control computer 202 drives the display device 241 based on image data D25 supplied thereto from the data processor 201 for displaying an image on the display device 241. The control computer 202 then sends out the control signal S21 to the shutter 232 for opening the shutter 232 for a pre-set time for exposing the recording medium for hologram 230 to light. Of the laser light beam L22 radiated at this time from the laser light source 231 so as to be transmitted through the shutter 232, the light beam 123 reflected by the mirror 233 falls at this time as a reference light beam on the recording medium for hologram 230 via light inlet block 237. The light beam L24 transmitted through the half-mirror 233 proves to be a projecting light having an image displayed on the display device 241 projected therein. This projecting light is incident as an object light beam on the recording medium for hologram 230. This records an image displayed on the display device 241 as a strip-shaped hologram element on the recording medium for hologram 230.

When an image has been recorded on the recording medium for hologram 230, the control computer 202 sends out the control signal S22 to the stepping motor connected to the intermittent feed roll 252 and to the stepping motor connected to the feed-out rolls 256, 257 for driving these rolls for feeding the recording medium for hologram 230 by one hologram element.

Based on the next image data D25 supplied from the data processor 201, the control computer 202 drives the display device 241 for displaying the next image thereon. The above sequence of operations is then repeated for sequentially recording the images corresponding to the image data D25 from the data processor 201 as strip-shaped hologram elements on the recording medium for hologram 230. Since the recording medium for hologram 230 is fed by one hologram element from one image to another, the hologram elements are arrayed in succession in the transverse direction. Thus, plural images inclusive of the parallax information in the transverse direction are recorded on the recording medium for hologram 230 for producing a holographic stereogram having the parallax in the transverse direction.

The recording medium for hologram 230, having the hologram elements recorded thereon as described above, is illuminated by UV light from the UV lamp 254. This completes polymerization of the monomer M. The recording medium for hologram 230 then is heated by the heat roll 255 for fixing the recorded image.

When the entire image-bearing portion of the recording medium for hologram 230 has been sent out, the control computer 202 sends the control signal S22 to the cutter driving mechanism for driving it so that the image bearing portion of the recording medium for hologram 230 is severed by the cutter 258 so as to be discharged to outside as a sole holographic stereogram.

The above-described process competes the reflection type holographic stereogram of the edge-lit system having the parallax in the transverse direction.

3-2 Reproduction of Holographic Stereogram

The reproduction of the holographic stereogram, fabricated as described above, is hereinafter explained.

Figure 34:
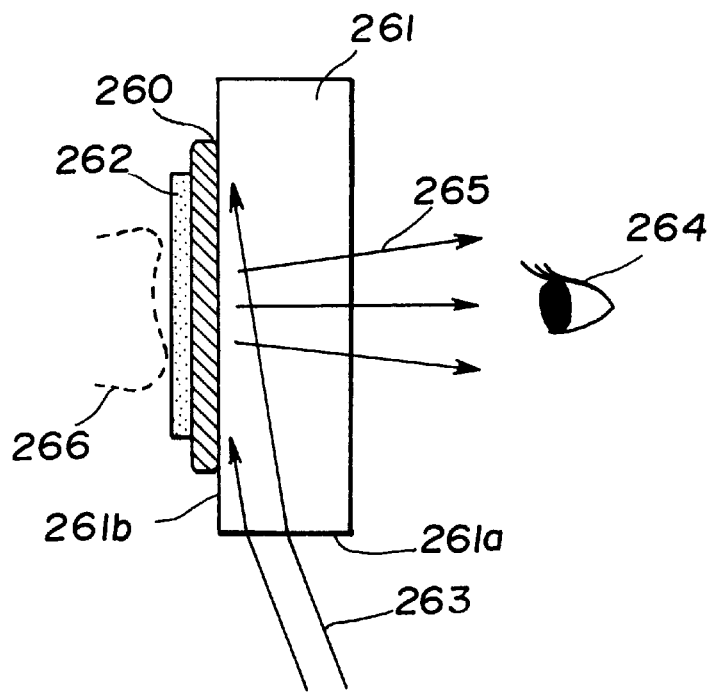
FIG. 34 is a schematic view showing the method for a holographic stereogram with a reflection type hologram.

For reproducing a three-dimensional image from the holographic stereogram as the reflection type, fabricated as described above, a holographic stereogram 262 is bonded to a light inlet block 261 via an index matching liquid 260, as shown in FIG. 34, and a reproducing illuminating light beam 263 is caused to fall from the end 261a of the light inlet block 261 to the holographic stereogram 262. The holographic stereogram 262 is bonded to a surface 261b of the light inlet block 261 remote from the viewer 264. At this time, a reproduced image 266 generated by a light beam 265 diffracted with the reflection mode from the holographic stereogram 262 is viewed by the viewer 264. However, when a three-dimensional image is reproduced with the reflection mode in this manner, a reproduced image 266 is reproduced as if the object were behind the illuminating light inlet block 261 as viewed by the viewer 264.

With the present invention, the three-dimensional image from the reflection type holographic stereogram of the edge-lit system, fabricated as described above, is reproduced as the transmission type. That is, with the reproducing method according to the present invention, after a holographic stereogram 272 is bonded via index matching liquid 270 on the light inlet block 271, a reproducing illuminating light beam 273 is caused to fall at an end 271a of the light inlet block 271 towards the holographic stereogram 272. The holographic stereogram 272 is bonded to the surface 271a of the light inlet block 271 closer to a viewer 274.

Figure 35:
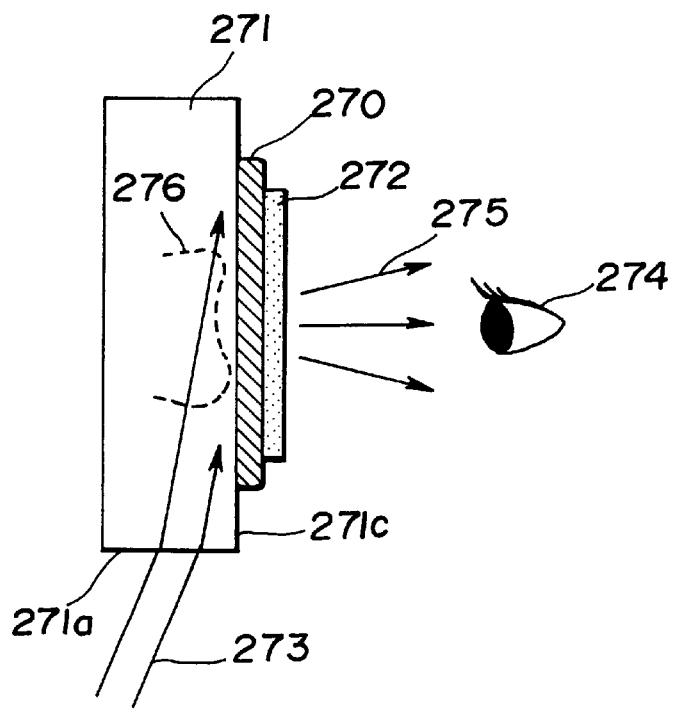
FIG. 35 is a schematic view showing the method for a holographic stereogram with a transmission type hologram.

At this time, a reproduced image 276, generated by the diffracted light beam 275 diffracted with the transmission mode from the holographic stereogram 272, is viewed by the viewer 274. If a three-dimensional image is reproduced in this manner, the reproduced image 276 appears as though the object were closer to the viewer than with the reproducing method explained with reference to FIG. 34. Thus, by reproducing the three-dimensional image as shown in FIG. 35, the stereoscopic feeling can be emphasized for improving the display effect.

Figure 36:
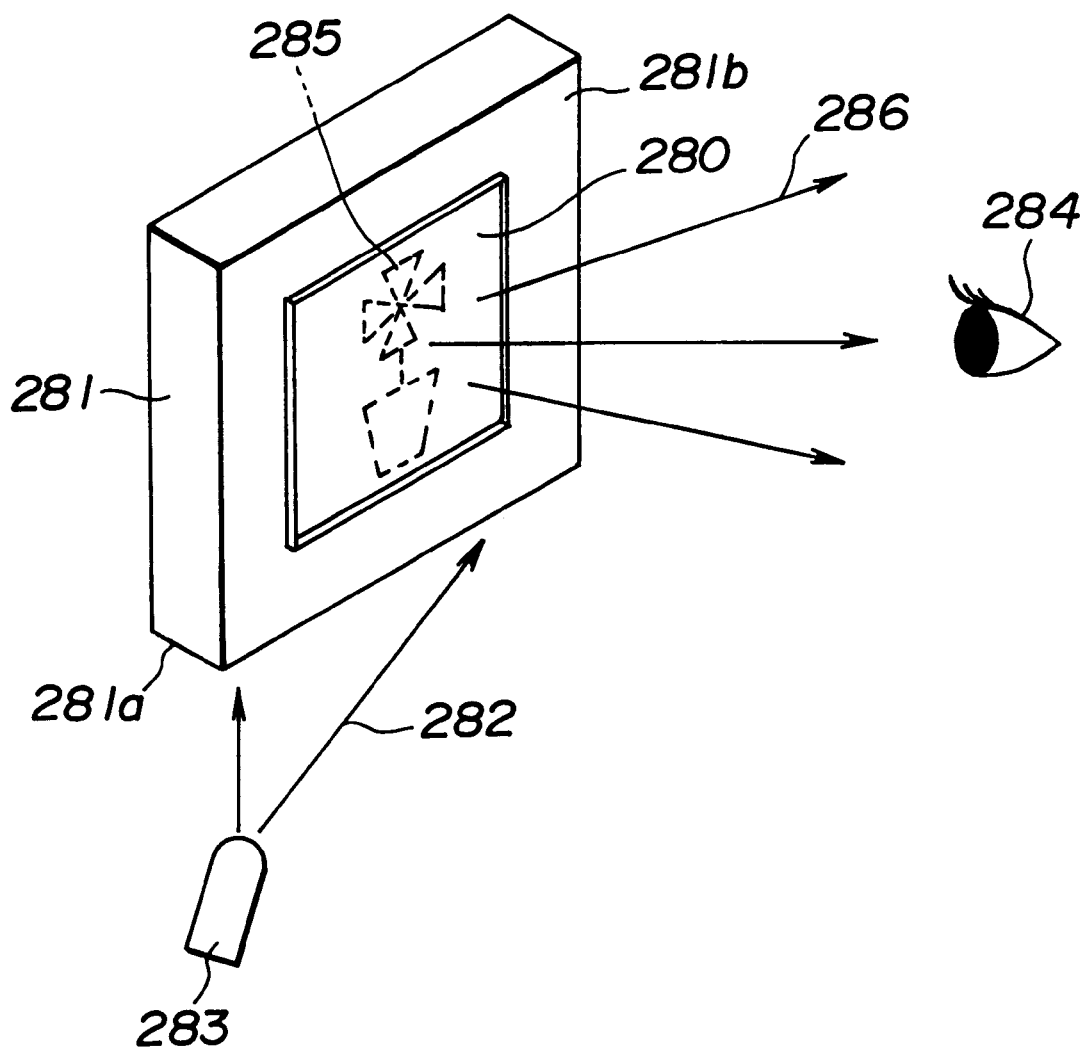
FIG. 36 is a schematic view showing an illustrative structure of an image reproducing apparatus embodying the present invention.

Referring to FIG. 36, an illustrative structure of an image reproducing device by the transmission type is hereinafter explained.

The image reproducing device is of the edge-lit system and includes a light inlet block 281 on which is bonded a holographic stereogram 280 and a light source 283 for illuminating a reproducing illuminating light beam from an end face 281a of the light inlet block 281. The holographic stereogram 280 of an object is a holographic stereogram of the edge lit system on which the three-dimensional image information is recorded by causing the object light and the reference light to fall on one and the other of the surfaces of the recording medium for hologram, respectively.

The light inlet block 281 is used for introducing the reproducing illuminating light beam 282 into the holographic stereogram 280 and is a parallelepipedic block of transparent glass similar to that used for recording. The holographic stereogram 280 to be reproduced is bonded to the light inlet block 281 via an index matching liquid. It is noted that the holographic stereogram 280 is bonded to a surface 281b of the light inlet block 281 closer to a viewer 284.

Meanwhile, the shape of the illuminating light inlet block 281 need not be parallelepipedic and may be optionally selected on the condition that the angle of incidence of the illuminating reproducing light beam 282 will be incident at a pre-set angle on the holographic stereogram 280. That is, the light inlet block 281 may be of any suitable shape if, during recording, the angle of incidence of the reference light on the recording medium for hologram during recording is set so as to coincide with that of the reproducing illuminating light 282 for the holographic stereogram 280.

On the other hand, the light source 283 is an LED arranged for illuminating the reproducing illuminating light beam 282 on the holographic stereogram 280. Since the LED used as the light source 283 has extremely high light emitting efficiency, a battery, for example, may be used for a practically sufficient time interval. Thus the driving power source of the image reproducing device may be furnished from the battery or the like for reducing the size and cost of the device.

In the above-described image reproducing device, the light source 283 of the reproducing illuminating light beam 282 may be integrated with the light inlet block 281 for simplifying and reducing the size of the optical system. Morever, by integrating the light source 283 of the illuminating light beam 282 with the light inlet block 281, the angle of incidence of the reproducing illuminating light beam 282 to the holographic stereogram 280 may be perpetually set to an optimum value for producing a high-quality reproduced image 285.

In the present embodiment, the wavelength of the laser light used for fabricating the holographic stereogram is approximately 532 nm, while the angle $\theta$ the reference light makes with the object light is approximately 75°. The film thickness of a photosensitive portion of the recording medium for hologram 230 is approximately 20 $\mu$m, with its refractive index being approximately 1.5. Therefore, the allowance of selection of the wavelength of the holographic stereogram is approximately 50 nm. Thus, in the above image reproducing device, a LED emitting the light with the wavelength of approximately 525 nm and the wavelength width of approximately 50 nm is optimum.

For reproducing a three-dimensional image from the holographic stereogram 280 by the above image reproducing device, the holographic stereogram 280 is bonded to the light inlet block 281 via index matching liquid. At this time, the holographic. stereogram 280 is arranged on the side of a viewer 284. The illuminating light beam 282 is illuminated from the light source 283 via light inlet bock 281 to the holographic stereogram 280. A reproduced image 285 is generated by a light beam 286 diffracted when the illuminating light beam 282 is transmitted through the holographic stereogram 280. This reproduced image 285 is formed as if the object were at a position closer to the viewer to give an extremely stereoscopic image.

For reproducing a holographic stereogram by the reflection type, a reproduced image can be usually obtained even if the white light is used as the reproducing illumination due to higher wavelength selectivity. Conversely, for regenerating a holographic stereogram by the transmission type, it becomes difficult to reproduce the holographic stereogram with the white light because the wavelength selectivity becomes weaker than if the holographic stereogram is reproduced as the reflection type. Therefore, if a holographic stereogram is reproduced as the transmission type, a light source with a higher color purity is preferably used as a reproducing light source. Specifically, if a LED emitting the light of high color purity is used as a reproducing light source, it becomes possible to compensate for weak wavelength selectivity in order to obtain a clear reproduced image. The LED also has merits that it is closer in nature to a point light source and hence is effective to prevent blurring of the reproduced image 285 due to spreading of the light source, while scarcely generating heat, However, the light source 283 for the reproducing illuminating light 282 is not limited to LEDs. If a light source capable of emitting the light of high color purity such as a semiconductor laser is used, a reproduced image 285 can be produced in similar manner. The light raised in color purity by a wavelength selective filter or a narrow band reflection mirror may also be used as the reproducing illuminating light 282.

In addition, although the above embodiments are directed to fabrication of a monochromatic holographic stereogram, the present invention may similarly be applied to fabrication of a colored holographic stereogram. For producing the colored holographic stereogram, three light beams corresponding to the three prime colors of light may be used as the recording light. For reproducing a colored holographic stereogram recorded using three light beams corresponding to the three prime colors of light, three light sources are provided in an image reproducing device for emitting three prime colors of light so that light beams from the light sources will be illuminated simultaneously on the holographic stereogram as reproducing illuminating light beams. For reproducing the white holographic stereogram, light sources with high color purity are preferably used as the light sources because reproduction as the transmission type suffers from weak wavelength selectivity. This renders it possible to reproduce the colored holographic stereogram clearly even as the transmission type.

It is seen from above that, with the first image recording method and device according to the present invention, vibrations can be suppressed sufficiently during recording on the recording medium for hologram. This enables accurate recording for improving the diffraction efficiency during reproduction. That is, with the first image recording method and device according to the present invention, a holographic stereogram producing a bright clear reproduced image may be produced. Moreover, the queuing time until attenuation of the vibrations after transfer of the recording medium for hologram may be significantly reduced thus enabling reduction in the process time in fabricating a holographic stereogram by transferring the recording medium for hologram each time a hologram element is recorded. Moreover, the queuing time which elapses after transfer of the recording medium for hologram until attenuation of the oscillations can be significantly reduced thus significantly reducing the queuing time in fabrication of the holographic stereogram by transferring the recording medium for hologram each time a hologram element is recorded. Also, by using, as a liquid interposed between the recording medium for hologram and the optical component, an index matching liquid having an optimized refractive index, recording by the edge-lit system can be carried out in a state in which total reflection of the reference light in the light inlet block is prohibited and the intensity reflectance is suppressed, thus assuring fabrication of the edge-lit holographic stereogram having improved image quality.

With the second image recording method and device according to the present invention, an edge-lit holographic stereogram that can be reproduced as the transmission type can be fabricated easily. Moreover, oscillations during recording on the recording medium for hologram can be suppressed sufficiently. This enables correct recording and improves the diffraction efficiency during reproduction. That is, in the second image recording method and device according to the present invention, an edge-lit holographic stereogram which gives a clear and bright reproduced image can be produced. In addition, the queuing time which elapses since the end of transfer of the recording medium for hologram until attenuation of oscillations again can be reduced significantly, thus significantly shortening the processing time in fabricating the holographic stereogram by transferring the recording medium for hologram each time a hologram element is recorded.

With the image recording method and apparatus according to the present invention, since the edge-lit holographic stereogram recorded as the reflection type having high degree of freedom of the optical system is reproduced as the transmission type, the reproduced image appears as if it were situated close to the viewer. Thus, with the image recording method and device according to the present invention, an extremely stereoscopic image with excellent display effect can be reproduced. That is, in the image recording method and device according to the present invention, a three-dimensional image which appears as if it were situated close to the viewer can be reproduced from en edge-lit holographic stereogram recorded using an optical system having a high degree of freedom and that may be fabricates easily.

Thus, the present invention provides an image recording method and device for recording an image on a holographic stereogram in such a manner as to generate an optimum reproduced image, and an image reproducing method and device for generating an optimum reproduced image from the holographic stereogram.

What is claimed is:

1. An image recording apparatus for sequentially recording images corresponding to image data of a parallax image string as strip- or dot-shaped hologram elements, wherein parallax image data is sequentially generated and projected onto a recording medium for hologram, comprising:

an optical component in contact with at least one surface of the recording medium for hologram, wherein a liquid is continuously supplied and interposed between said at least one surface of the recording medium for hologram and said optical component;

a sponge for continuously supplying said liquid; and said sequentially generated parallax image data being projected as one of an object light beam and a reference light beam onto one surface of the recording medium for hologram, wherein said object light beam and said reference light beam are projected onto opposite surfaces of said recording medium for hologram.

2. The image recording apparatus of claim 1, wherein said liquid is an index matching liquid.

3. The image recording apparatus as in claim 2, wherein said optical component contacts the recording medium for hologram on the object light beam surface, and said sequentially generated parallax image data is projected by said object light beam.

4. The image recording apparatus as in claim 3, wherein said optical component is a set of a one-dimensional diffusion plate and a louver film.

5. The image recording apparatus as in claim 2, wherein said optical component contacts the recording medium for hologram on the reference light beam surface, and said sequentially generated parallax image data is projected by said reference light beam.

6. The image recording apparatus as in claim 5, wherein said optical component is a light inlet block.

7. The image recording apparatus as in claim 6, wherein said reference light beam is projected at an acute angle to the surface of said recording medium for hologram.

8. An image recording apparatus for sequentially recording images corresponding to image data of a parallax image string as strip- or dot-shaped hologram elements, wherein parallax image data is sequentially generated and projected onto a recording medium for hologram, comprising:

an optical component in contact with at least one surface of the recording medium for hologram;

a sponge for continuously supplying a liquid between said at least one surface of the recording medium for hologram and said optical component; and said sequentially generated parallax image data being projected as one of an object light beam and a reference light beam onto one surface of the recording medium for hologram, wherein said object light beam and said reference light beam are projected onto opposite surfaces of said recording medium for hologram.

9. The image recording apparatus of claim 8, wherein said liquid is an index matching liquid for index matching between said recording medium for hologram and said optical device.

10. The image recording apparatus of claim 9, wherein said sponge has a width less than the width of said recording medium for hologram.

11. The image recording apparatus as in claim 8, wherein said optical component contacts the recording medium for hologram on the object light beam surface, and said sequentially generated parallax image data is projected by said object light beam.

12. The image recording apparatus as in claim 11, wherein said optical component is a set of a one-dimensional diffusion plate and a louver film.

13. The image recording apparatus as in claim 8, wherein said optical component contacts the recording medium for hologram on the reference light beam surface, and said sequentially generated parallax image data is projected by said reference light beam.

14. The image recording apparatus as in claim 13, wherein said optical component is a light inlet block.

15. The image recording apparatus as in claim 14, wherein said reference light beam is projected at an acute angle to the surface of said recording medium for hologram.

* * * * *